US012809100B2

(12) United States Patent
Soldano et al.

(10) Patent No.: US 12,809,100 B2
(45) Date of Patent: Nov. 24, 2026

(54) REFLECTOR STRUCTURE HAVING THREE-DIMENSIONAL CURVATURE

(71) Applicant: POET Technologies, Inc., Allentown, PA (US)

(72) Inventors: Lucas Soldano, San Jose, CA (US); Jing Yang, Singapore (SG); Yong Meng Lee, San Jose, CA (US); Suresh Venkatesan, Los Gatos, CA (US)

(73) Assignee: POET Technologies, Inc., Petaluma, CA (US)

( * ) Notice: Subject to any disclaimer, the term of this patent is extended or adjusted under 35 U.S.C. 154(b) by 580 days.

(21) Appl. No.: 18/217,415

(22) Filed: Jun. 30, 2023

(65) Prior Publication Data

US 2024/0004148 A1 Jan. 4, 2024

Related U.S. Application Data

(60) Provisional application No. 63/357,775, filed on Jul. 1, 2022.

(51) Int. Cl.

*G02B 6/42* (2006.01)
*G02B 5/08* (2006.01)
*G02B 5/10* (2006.01)
*G02B 6/43* (2006.01)

(52) U.S. Cl.

CPC ............ *G02B 6/4214* (2013.01); *G02B 5/10* (2013.01); *G02B 6/4206* (2013.01); *G02B 6/4228* (2013.01); *G02B 6/423* (2013.01); *G02B 6/4244* (2013.01); *G02B 6/4245* (2013.01); *G02B 6/4274* (2013.01); *G02B 6/43* (2013.01); *G02B 5/0808* (2013.01)

(58) Field of Classification Search

CPC .................... G02B 6/4214; G02B 6/43; G02B 2006/12104; G02B 6/4249; G02B 6/4246; G02B 6/136; G02B 6/3692; G02B 6/125; G02B 6/13

See application file for complete search history.

(56) References Cited

U.S. PATENT DOCUMENTS 4,718,070 A * 1/1988 Liau ........................ H01S 5/185 372/50.12
4,784,722 A * 11/1988 Liau .......................... H01S 5/42 438/42
5,335,243 A * 8/1994 Kubena .................... G02B 6/42 372/99
5,835,646 A * 11/1998 Yoshimura .............. H01L 24/73 385/83
8,639,067 B2 * 1/2014 Matsuoka ............ H05K 1/0274 385/39

(Continued)

FOREIGN PATENT DOCUMENTS

EP 0804323 B1 * 11/1998 ........... G02B 6/4214

OTHER PUBLICATIONS

Gruenwald, Werner, Machine Translation of EP 0804323 B1, Nov. 4, 1998. (Year: 1998).*

*Primary Examiner* — Michelle R Connelly

(57) ABSTRACT

A structure and method for the formation of a reflector structure having three-dimensional surface curvature is disclosed. Beam narrowing upon reflection from the three-dimensionally curved surface in embodiments can provide improved coupling efficiency in addition to the directional change provided by the reflector.

19 Claims, 54 Drawing Sheets

(56) References Cited

U.S. PATENT DOCUMENTS

| | | | | |
|---|---|---|---|---|
| 9,110,224 | B2 * | 8/2015 | Yip | H01Q 19/12 |
| 9,692,202 | B2 * | 6/2017 | Behfar | H01S 5/0071 |
| 10,830,951 | B2 * | 11/2020 | Noriki | G02B 6/122 |
| 2003/0142896 | A1 * | 7/2003 | Kikuchi | G02B 6/42<br>385/14 |
| 2005/0201694 | A1 * | 9/2005 | Rosinski | G02B 6/4214<br>385/92 |
| 2019/0391345 | A1 * | 12/2019 | Li | G02B 6/4263 |
| 2020/0326491 | A1 * | 10/2020 | Psaila | G02B 6/12004 |
| 2022/0365280 | A1 * | 11/2022 | Faraji-Dana | G02B 6/12002 |
| 2023/0066363 | A1 * | 3/2023 | Hsu | G02B 6/4214 |

* cited by examiner

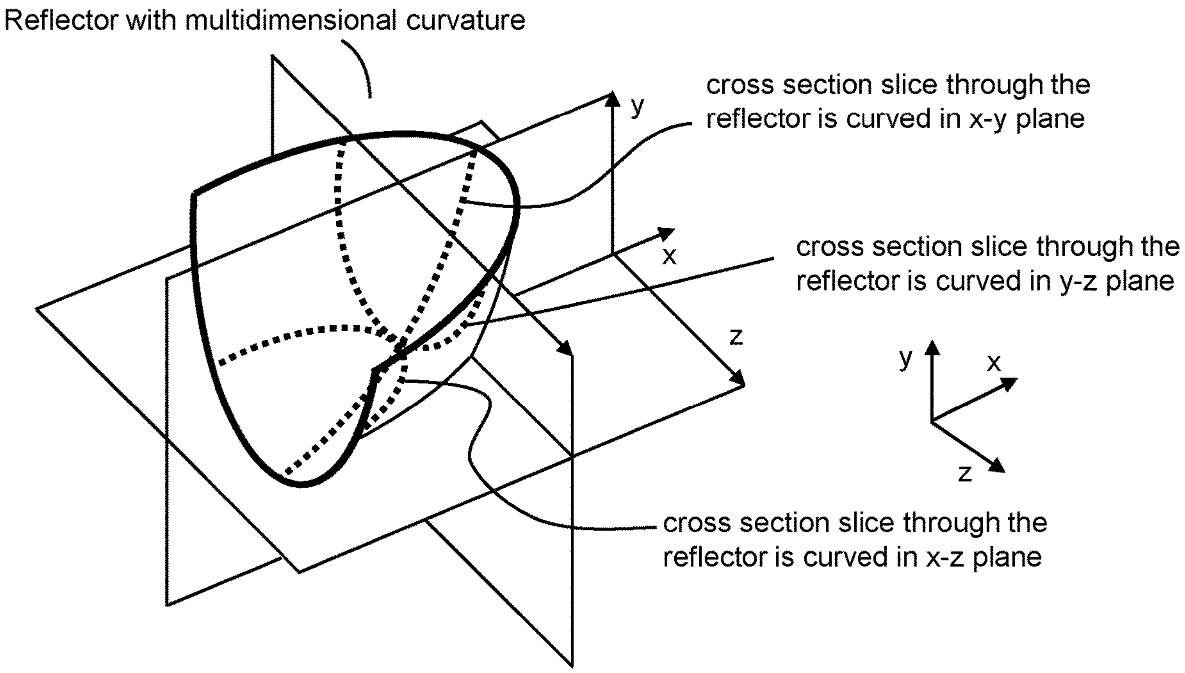
(a)
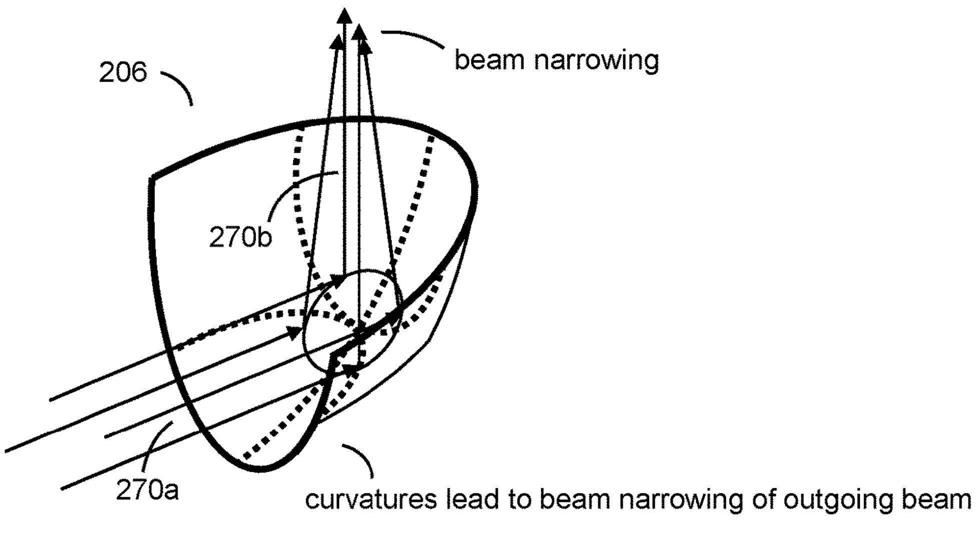
(b)
FIG. 2F (Step 610s1, 810s1, 1010s1)

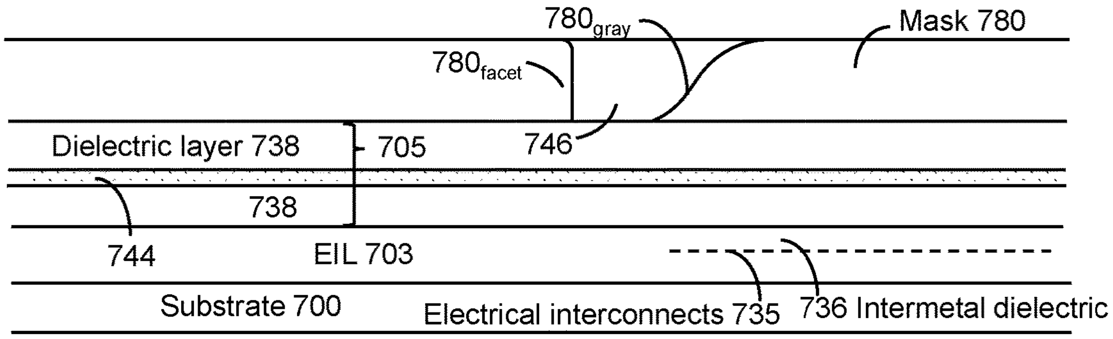
(a) Section A-A’
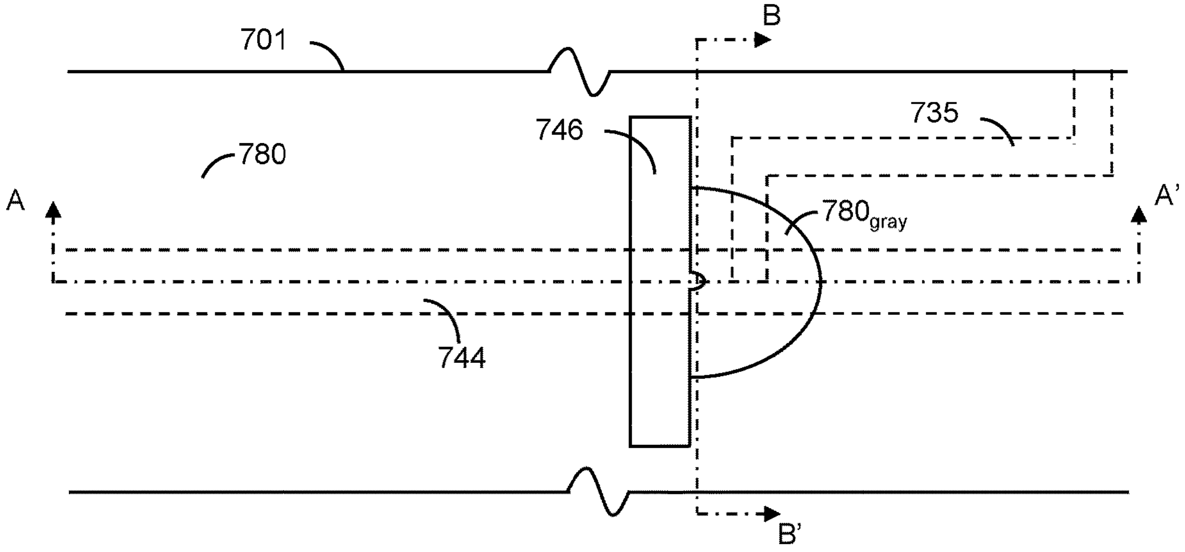
(b) Top View
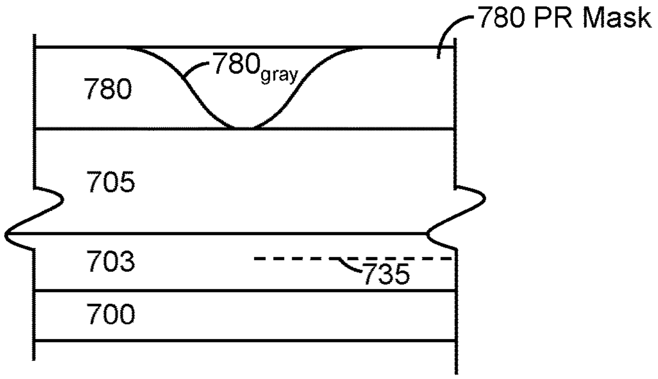
(c) Section B-B’
FIG. 7B
(Step 610s2)

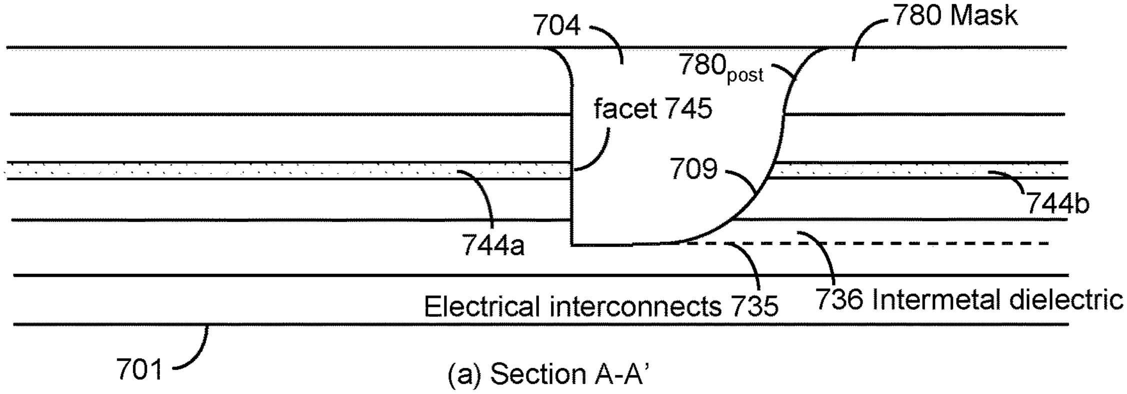
(a) Section A-A'
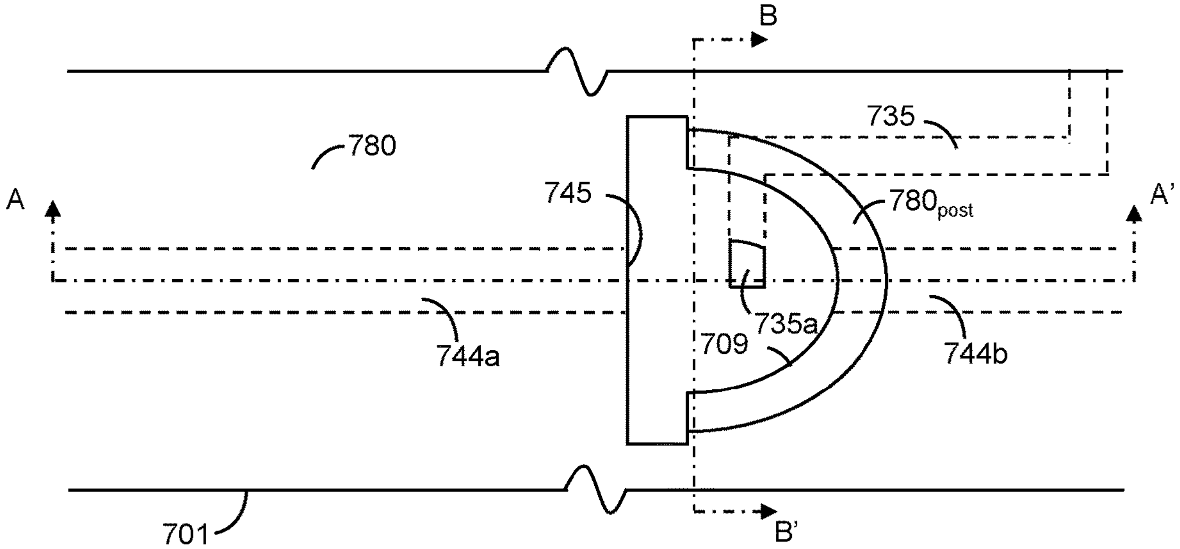
(b) Top View
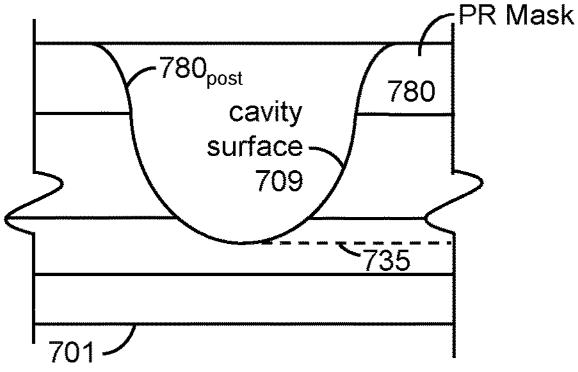
(c) Section B-B'
FIG. 7C
(Step 610s3)

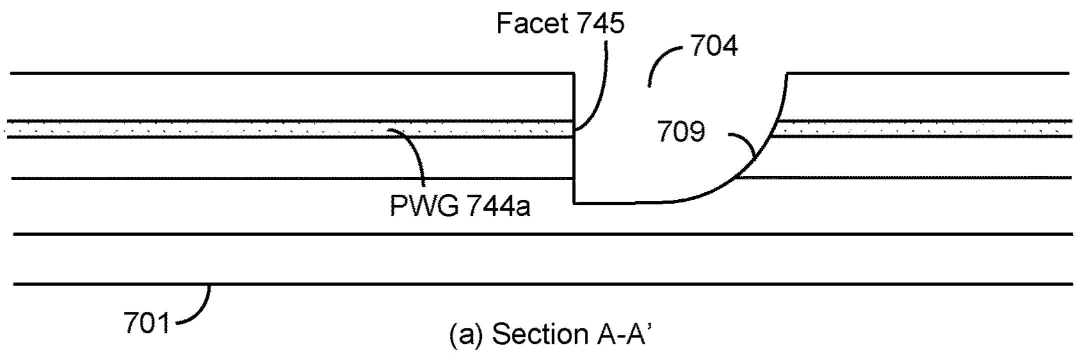
(a) Section A-A'
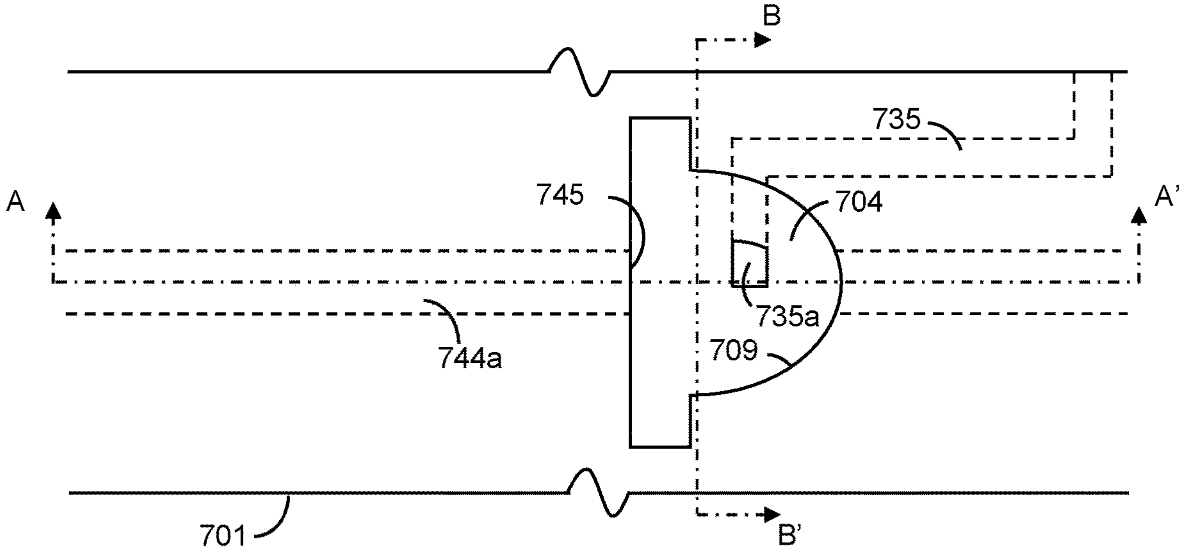
(b) Top View
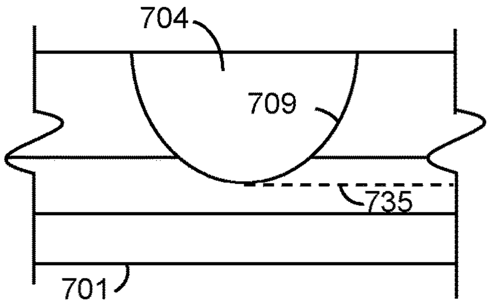
(c) Section B-B'
FIG. 7D
(Step 610s4)

(Step 610s5)

(Step 810s2)

(Step 810s3)

(Step 810s4)

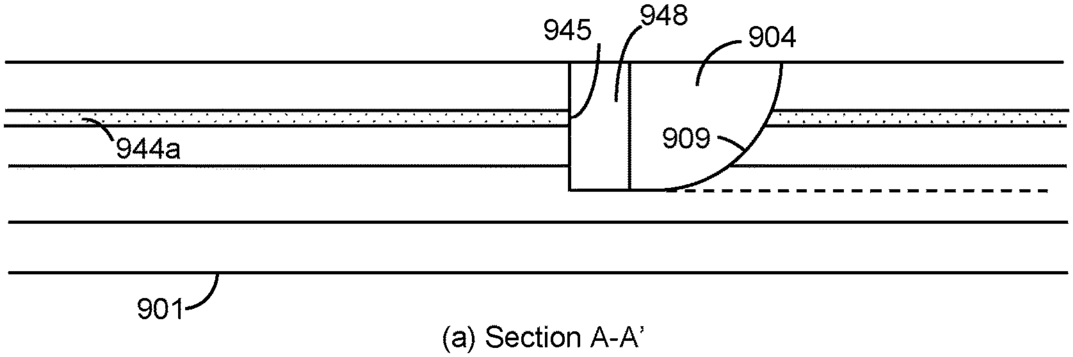
(a) Section A-A'
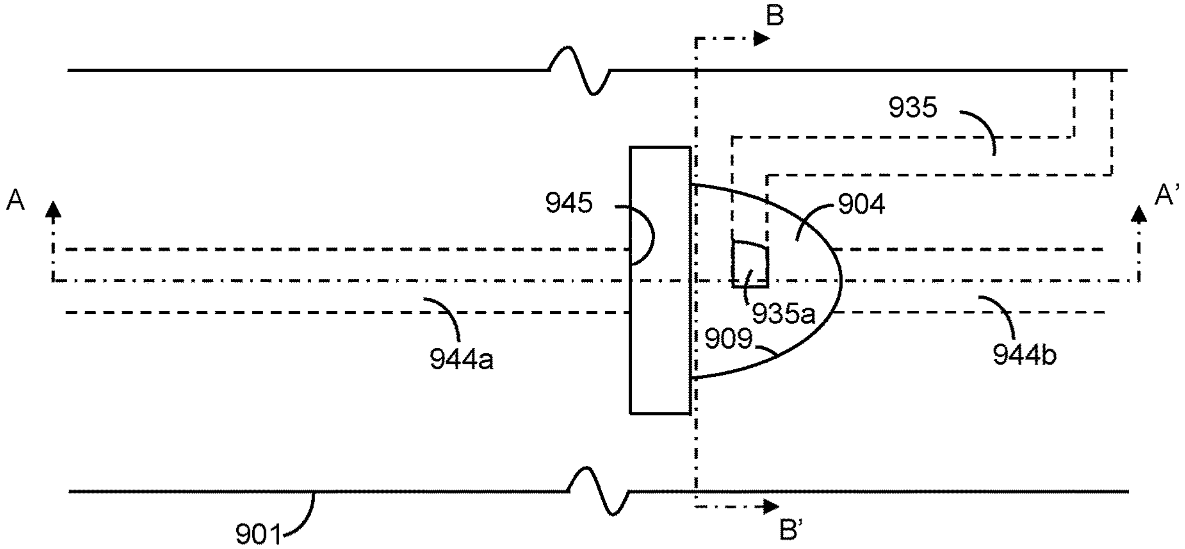
(b) Top View
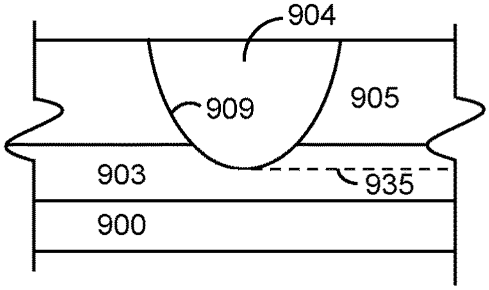
(c) Section B-B'
FIG. 9D
(Step 810s5)

(Step 810s6)

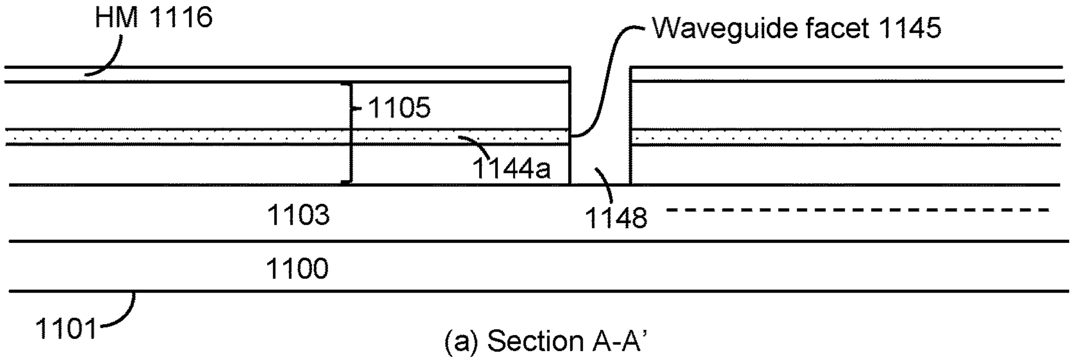
(a) Section A-A'
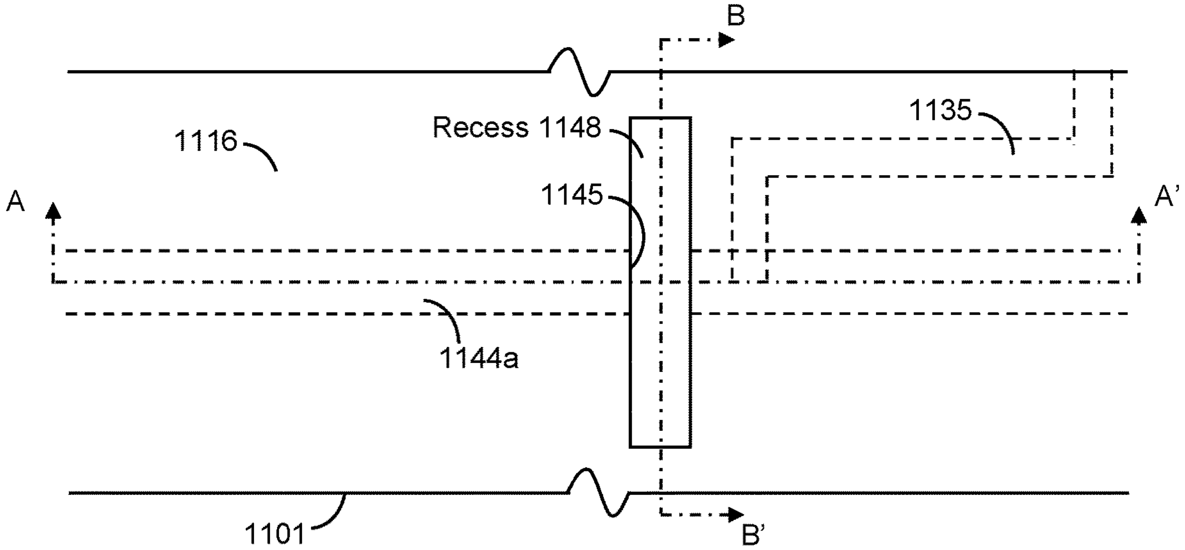
(b) Top View
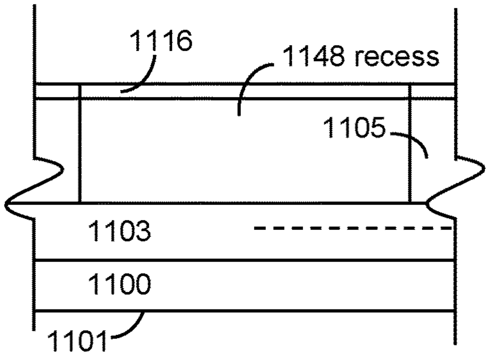
(c) Section B-B'
FIG. 11A
(Step 1010s3)

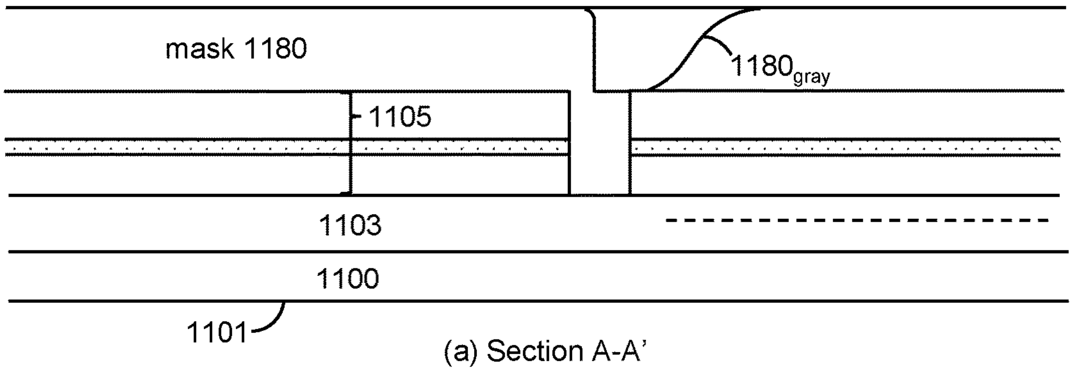
(a) Section A-A'
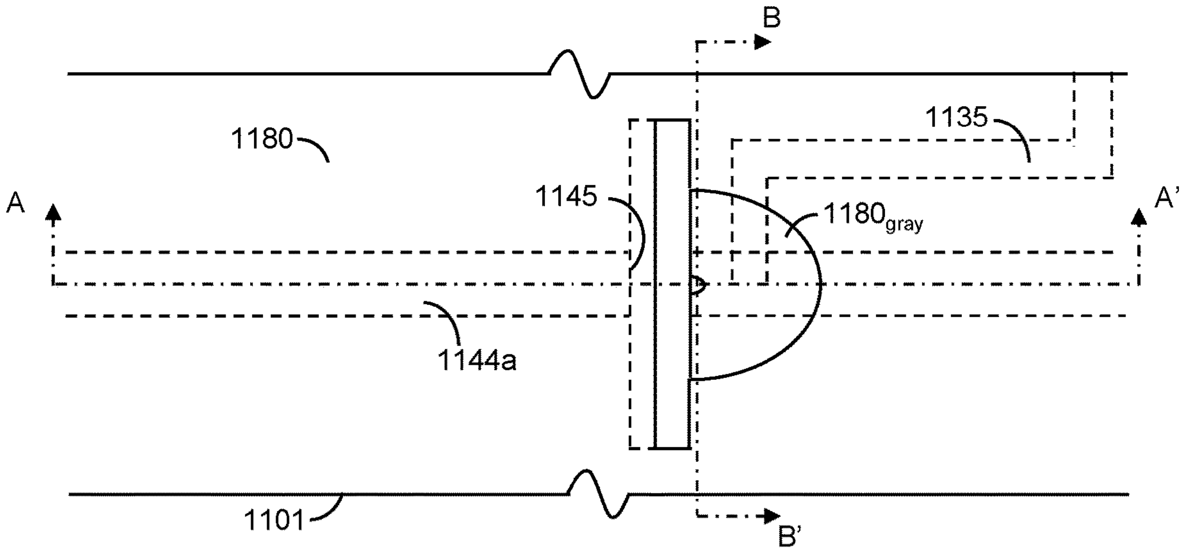
(b) Top View
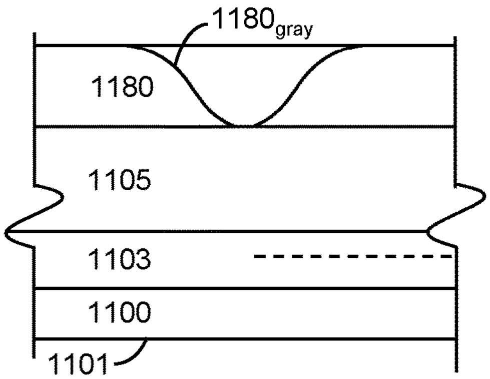
(c) Section B-B'
FIG. 11B
(Step 1010s5)

(Step 1010s6)

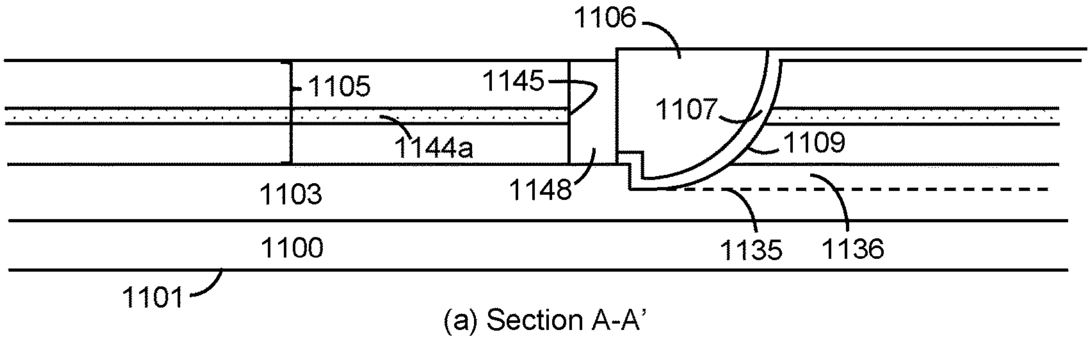
(a) Section A-A'
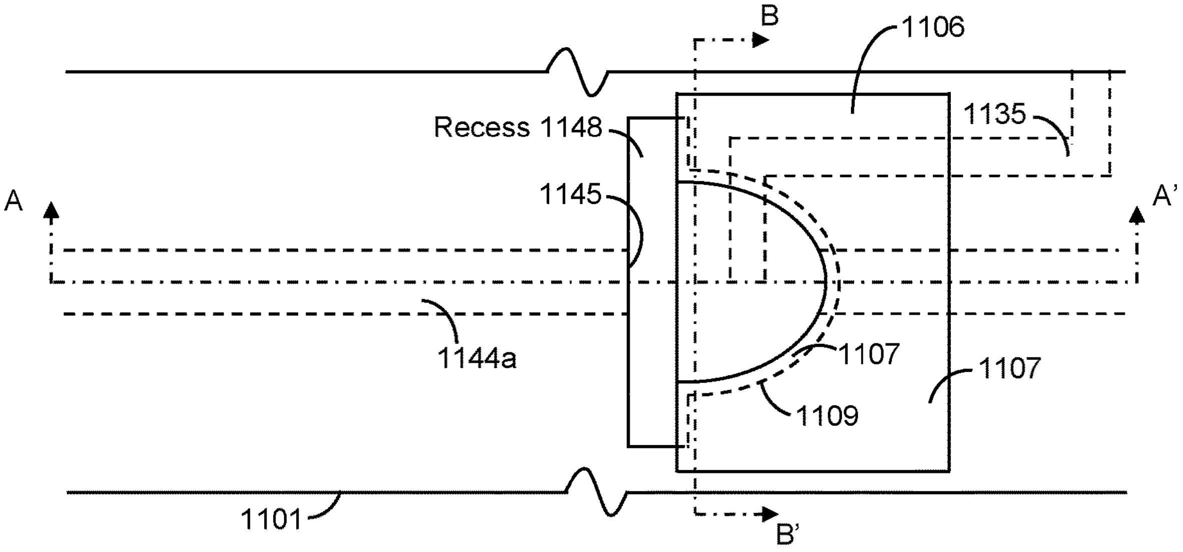
(b) Top View
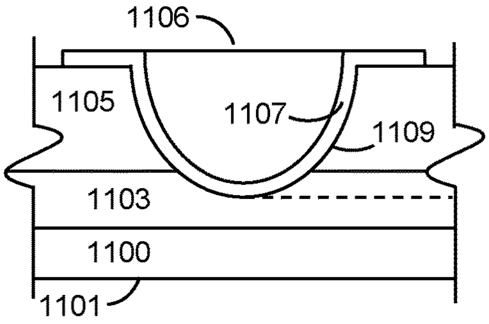
(c) Section B-B'
FIG. 11D
(Step 1010s8)

(Step 1310s2)

(a) Section A-A'

(b) Top View (c) Section B-B'

(Step 1310s3)

(Step 1310s8)

(Step 1310s3)

(Step 1310s8)

(Step 1310s3)

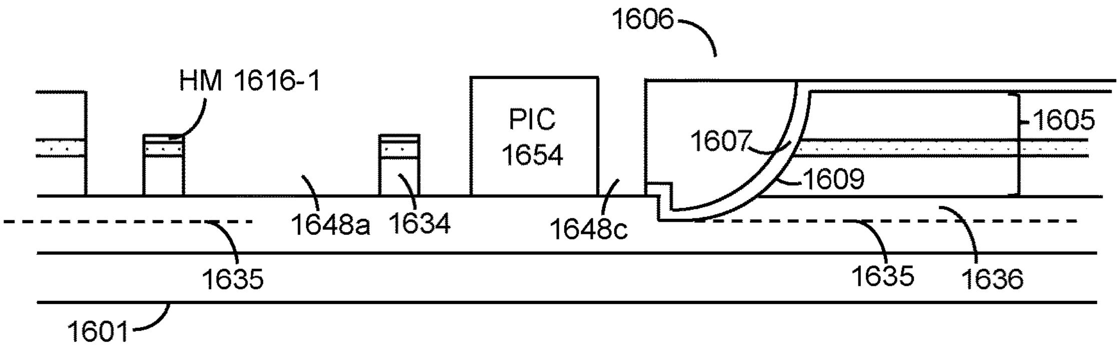
(a) Section A-A’
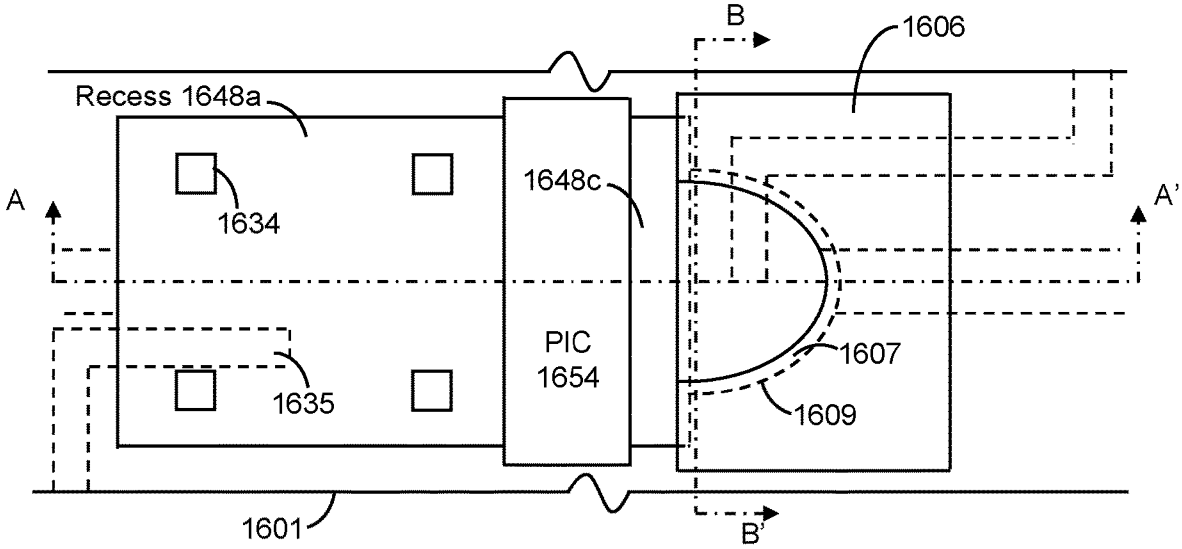
(b) Top View
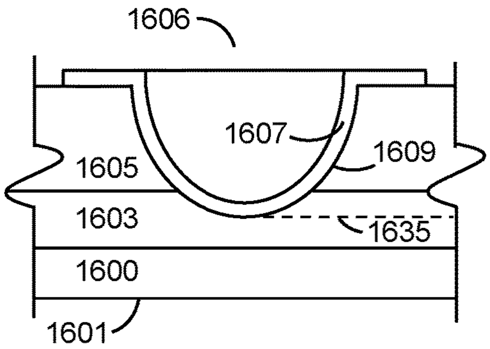
(c) Section B-B’
FIG. 16B
(Step 1310s8)

Example of an Aperture on an example receiving device such as a Photodiode

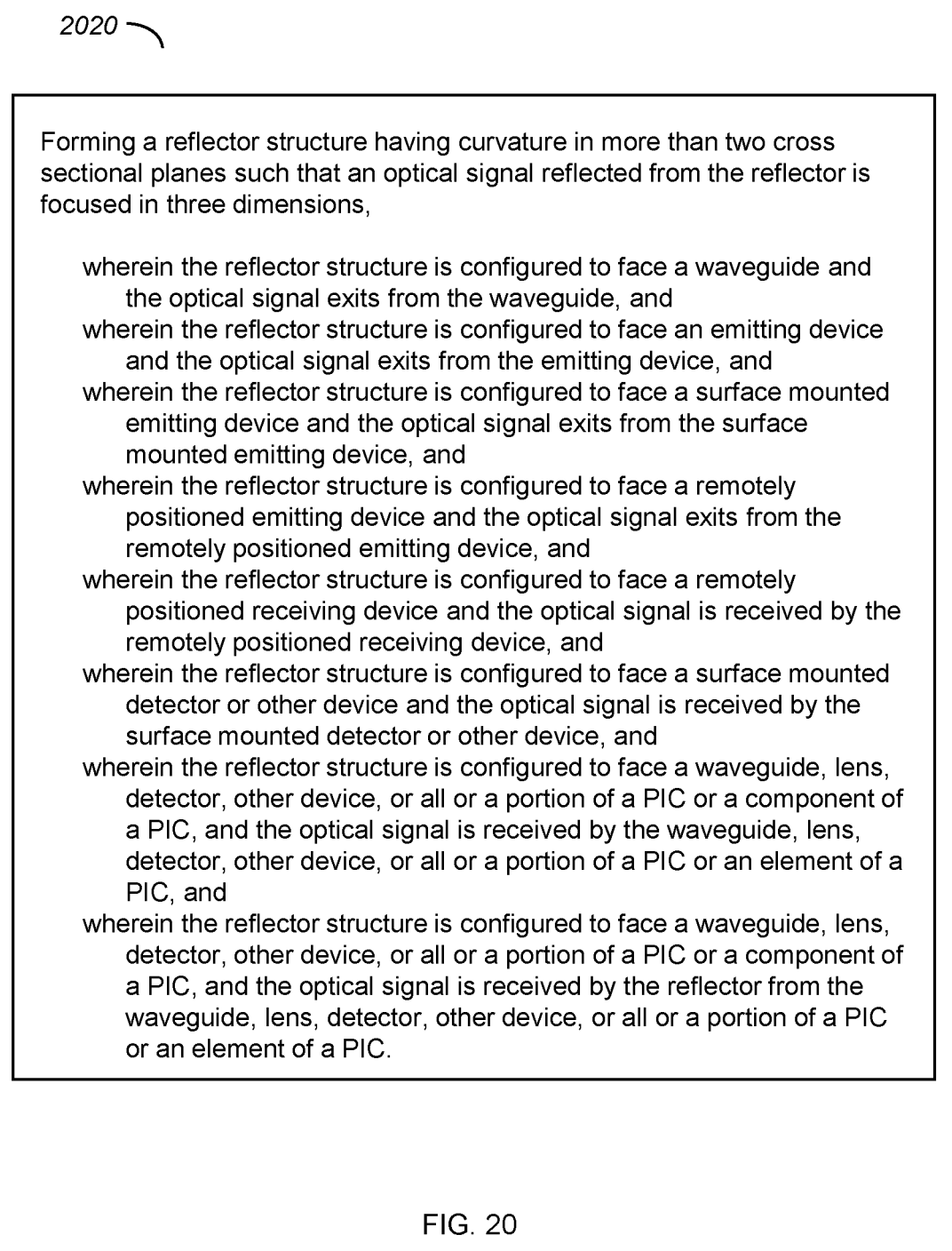

2020

Forming a reflector structure having curvature in more than two cross sectional planes such that an optical signal reflected from the reflector is focused in three dimensions, wherein the reflector structure is configured to face a waveguide and the optical signal exits from the waveguide, and
wherein the reflector structure is configured to face an emitting device and the optical signal exits from the emitting device, and
wherein the reflector structure is configured to face a surface mounted emitting device and the optical signal exits from the surface mounted emitting device, and
wherein the reflector structure is configured to face a remotely positioned emitting device and the optical signal exits from the remotely positioned emitting device, and
wherein the reflector structure is configured to face a remotely positioned receiving device and the optical signal is received by the remotely positioned receiving device, and
wherein the reflector structure is configured to face a surface mounted detector or other device and the optical signal is received by the surface mounted detector or other device, and
wherein the reflector structure is configured to face a waveguide, lens, detector, other device, or all or a portion of a PIC or a component of a PIC, and the optical signal is received by the waveguide, lens, detector, other device, or all or a portion of a PIC or an element of a PIC, and
wherein the reflector structure is configured to face a waveguide, lens, detector, other device, or all or a portion of a PIC or a component of a PIC, and the optical signal is received by the reflector from the waveguide, lens, detector, other device, or all or a portion of a PIC or an element of a PIC.

FIG. 20

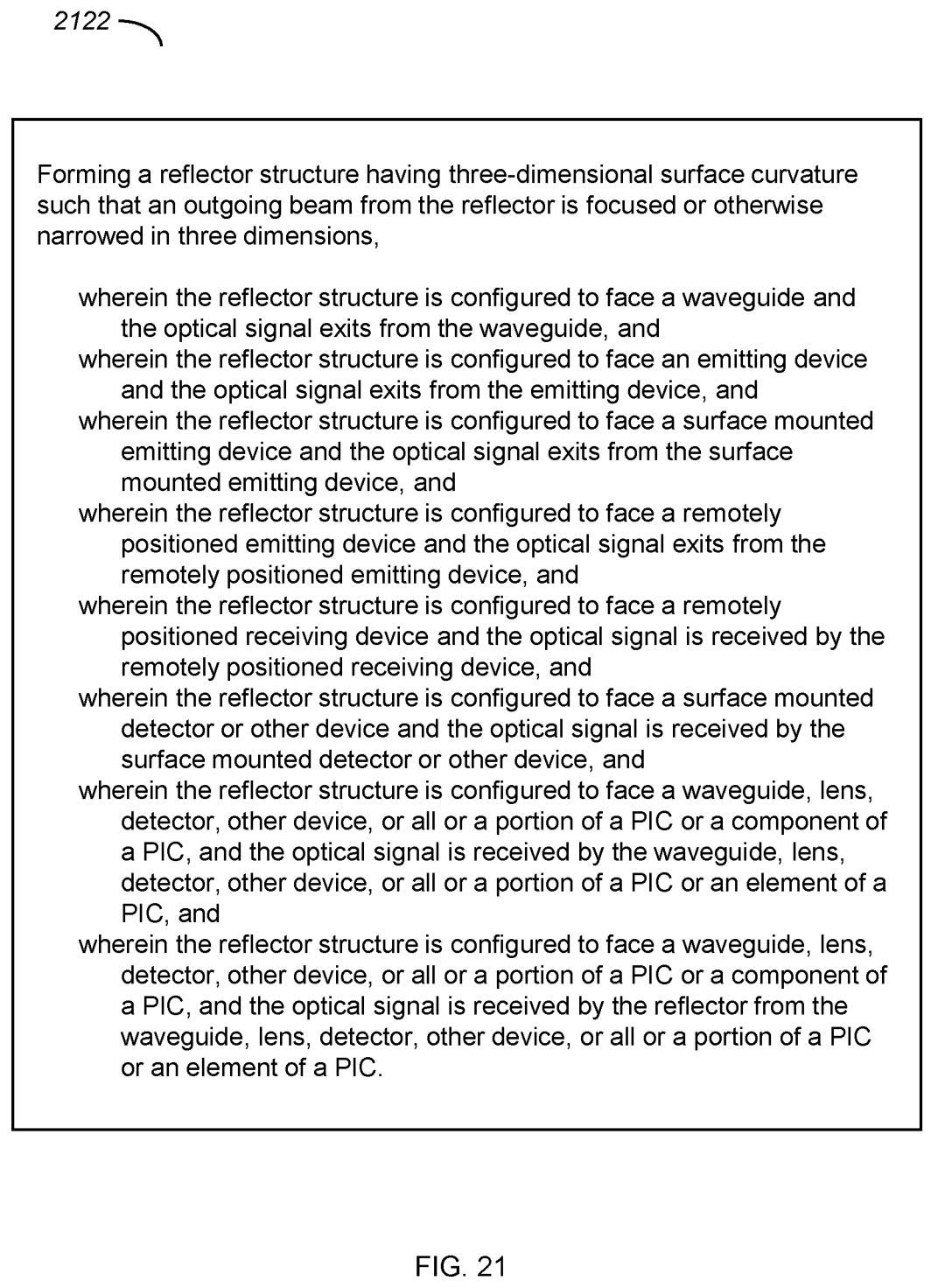

2122

Forming a reflector structure having three-dimensional surface curvature such that an outgoing beam from the reflector is focused or otherwise narrowed in three dimensions, wherein the reflector structure is configured to face a waveguide and the optical signal exits from the waveguide, and
wherein the reflector structure is configured to face an emitting device and the optical signal exits from the emitting device, and
wherein the reflector structure is configured to face a surface mounted emitting device and the optical signal exits from the surface mounted emitting device, and
wherein the reflector structure is configured to face a remotely positioned emitting device and the optical signal exits from the remotely positioned emitting device, and
wherein the reflector structure is configured to face a remotely positioned receiving device and the optical signal is received by the remotely positioned receiving device, and
wherein the reflector structure is configured to face a surface mounted detector or other device and the optical signal is received by the surface mounted detector or other device, and
wherein the reflector structure is configured to face a waveguide, lens, detector, other device, or all or a portion of a PIC or a component of a PIC, and the optical signal is received by the waveguide, lens, detector, other device, or all or a portion of a PIC or an element of a PIC, and
wherein the reflector structure is configured to face a waveguide, lens, detector, other device, or all or a portion of a PIC or a component of a PIC, and the optical signal is received by the reflector from the waveguide, lens, detector, other device, or all or a portion of a PIC or an element of a PIC.

FIG. 21

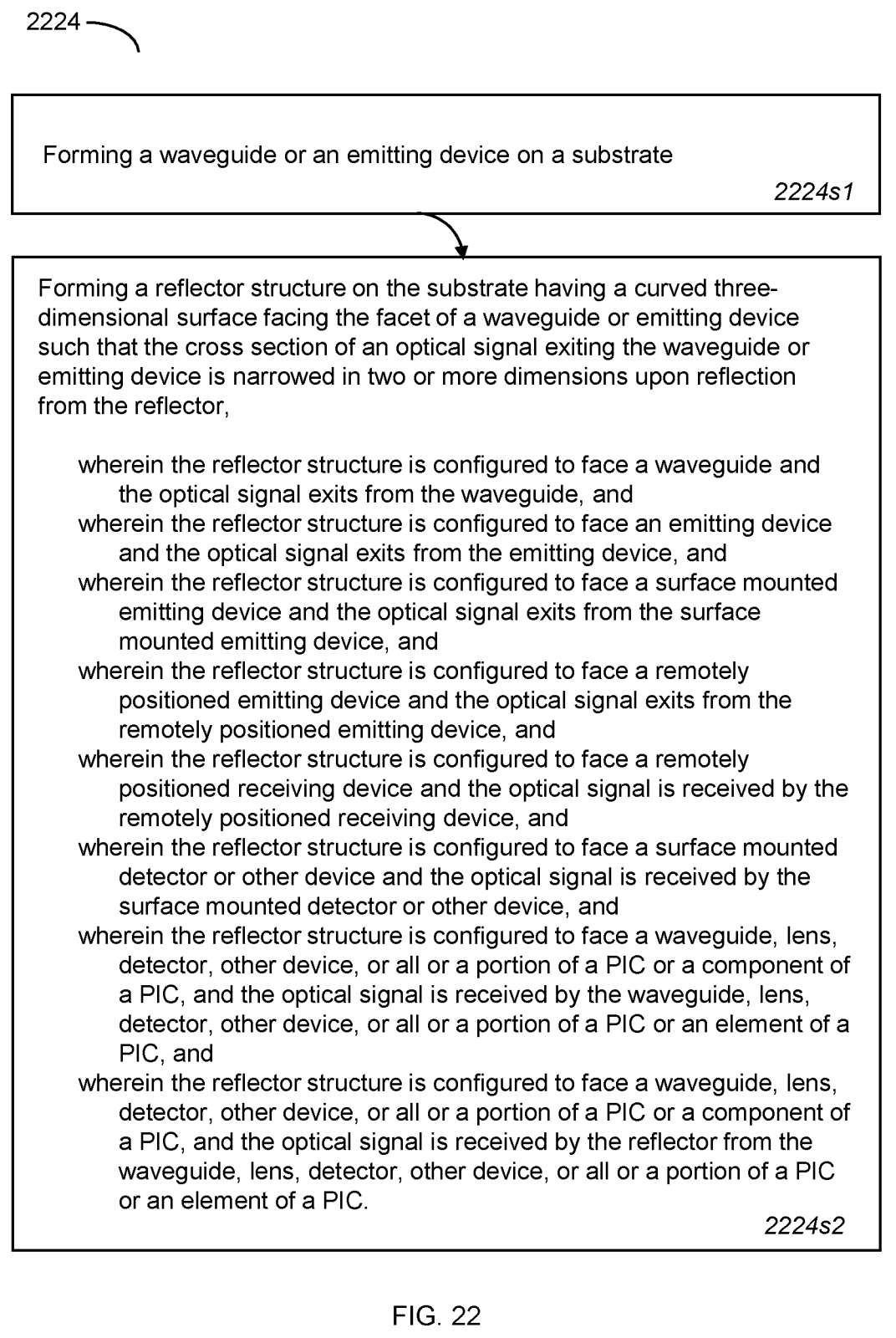

2224

Forming a waveguide or an emitting device on a substrate

*2224s1*

Forming a reflector structure on the substrate having a curved three-dimensional surface facing the facet of a waveguide or emitting device such that the cross section of an optical signal exiting the waveguide or emitting device is narrowed in two or more dimensions upon reflection from the reflector, wherein the reflector structure is configured to face a waveguide and the optical signal exits from the waveguide, and
wherein the reflector structure is configured to face an emitting device and the optical signal exits from the emitting device, and
wherein the reflector structure is configured to face a surface mounted emitting device and the optical signal exits from the surface mounted emitting device, and
wherein the reflector structure is configured to face a remotely positioned emitting device and the optical signal exits from the remotely positioned emitting device, and
wherein the reflector structure is configured to face a remotely positioned receiving device and the optical signal is received by the remotely positioned receiving device, and
wherein the reflector structure is configured to face a surface mounted detector or other device and the optical signal is received by the surface mounted detector or other device, and
wherein the reflector structure is configured to face a waveguide, lens, detector, other device, or all or a portion of a PIC or a component of a PIC, and the optical signal is received by the waveguide, lens, detector, other device, or all or a portion of a PIC or an element of a PIC, and
wherein the reflector structure is configured to face a waveguide, lens, detector, other device, or all or a portion of a PIC or a component of a PIC, and the optical signal is received by the reflector from the waveguide, lens, detector, other device, or all or a portion of a PIC or an element of a PIC.

*2224s2*

FIG. 22

2326

Forming a substrate having a reflector structure facing a waveguide or emitting device such that an optical signal from the waveguide or emitting device and incident on the reflector structure is narrowed in two or more dimensions upon reflection from the reflector structure, wherein the reflector structure is configured to face a waveguide and the optical signal exits from the waveguide, and
wherein the reflector structure is configured to face an emitting device and the optical signal exits from the emitting device, and
wherein the reflector structure is configured to face a surface mounted emitting device and the optical signal exits from the surface mounted emitting device, and
wherein the reflector structure is configured to face a remotely positioned emitting device and the optical signal exits from the remotely positioned emitting device, and
wherein the reflector structure is configured to face a remotely positioned receiving device and the optical signal is received by the remotely positioned receiving device, and
wherein the reflector structure is configured to face a surface mounted detector or other device and the optical signal is received by the surface mounted detector or other device, and
wherein the reflector structure is configured to face a waveguide, lens, detector, other device, or all or a portion of a PIC or a component of a PIC, and the optical signal is received by the waveguide, lens, detector, other device, or all or a portion of a PIC or an element of a PIC, and
wherein the reflector structure is configured to face a waveguide, lens, detector, other device, or all or a portion of a PIC or a component of a PIC, and the optical signal is received by the reflector from the waveguide, lens, detector, other device, or all or a portion of a PIC or an element of a PIC.

FIG. 23

2428

Forming an interposer having a reflector structure such that an optical signal reflected from the reflector structure is narrowed in two or more dimensions upon reflection from the reflector structure, wherein the reflector structure is configured to face a waveguide and the optical signal exits from the waveguide, and
wherein the reflector structure is configured to face an emitting device and the optical signal exits from the emitting device, and
wherein the reflector structure is configured to face a surface mounted emitting device and the optical signal exits from the surface mounted emitting device, and
wherein the reflector structure is configured to face a remotely positioned emitting device and the optical signal exits from the remotely positioned emitting device, and
wherein the reflector structure is configured to face a remotely positioned receiving device and the optical signal is received by the remotely positioned receiving device, and
wherein the reflector structure is configured to face a surface mounted detector or other device and the optical signal is received by the surface mounted detector or other device, and
wherein the reflector structure is configured to face a waveguide, lens, detector, other device, or all or a portion of a PIC or a component of a PIC, and the optical signal is received by the waveguide, lens, detector, other device, or all or a portion of a PIC or an element of a PIC, and
wherein the reflector structure is configured to face a waveguide, lens, detector, other device, or all or a portion of a PIC or a component of a PIC, and the optical signal is received by the reflector from the waveguide, lens, detector, other device, or all or a portion of a PIC or an element of a PIC.

FIG. 24

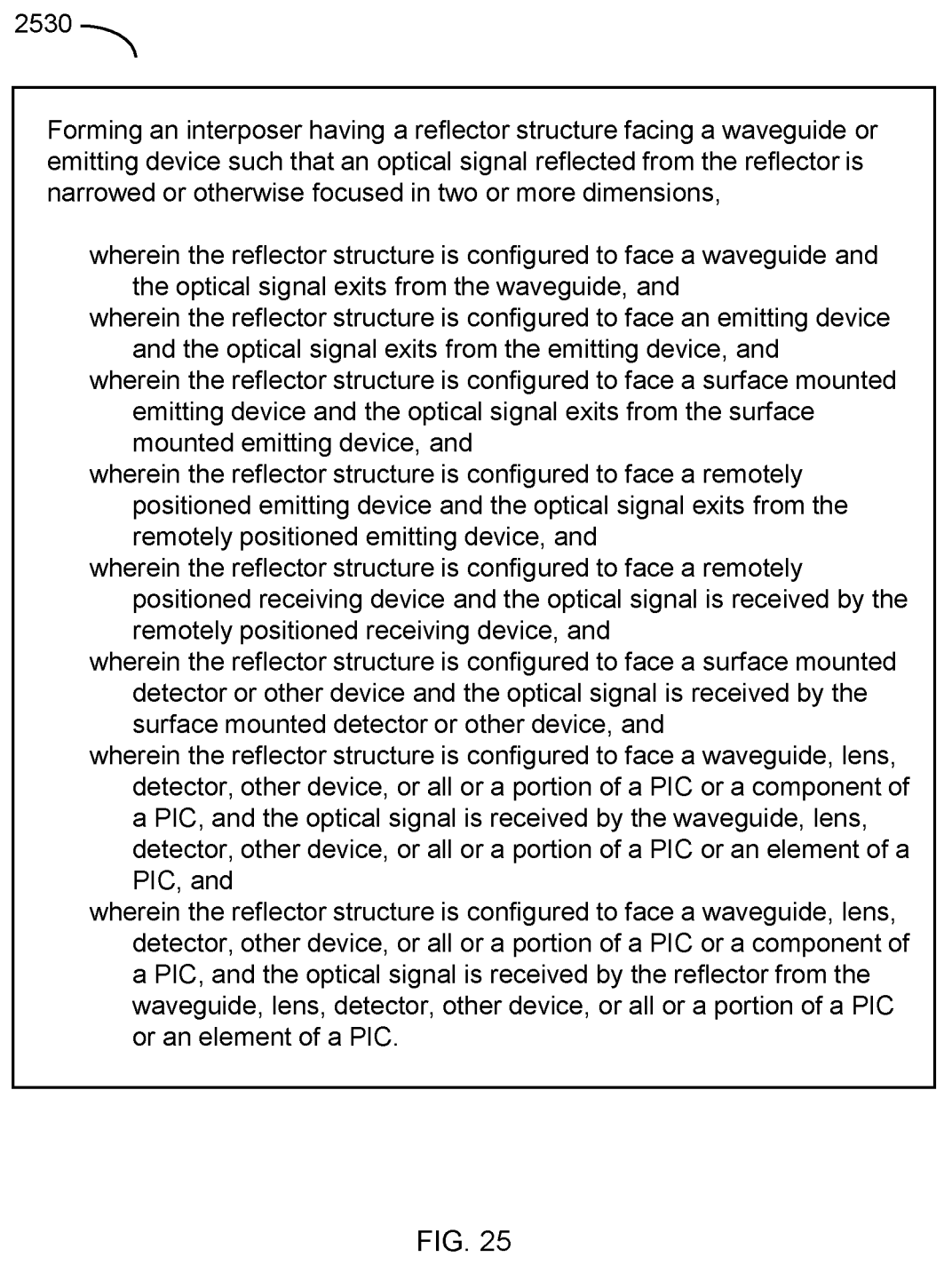

2530

Forming an interposer having a reflector structure facing a waveguide or emitting device such that an optical signal reflected from the reflector is narrowed or otherwise focused in two or more dimensions,

- wherein the reflector structure is configured to face a waveguide and the optical signal exits from the waveguide, and
- wherein the reflector structure is configured to face an emitting device and the optical signal exits from the emitting device, and
- wherein the reflector structure is configured to face a surface mounted emitting device and the optical signal exits from the surface mounted emitting device, and
- wherein the reflector structure is configured to face a remotely positioned emitting device and the optical signal exits from the remotely positioned emitting device, and
- wherein the reflector structure is configured to face a remotely positioned receiving device and the optical signal is received by the remotely positioned receiving device, and
- wherein the reflector structure is configured to face a surface mounted detector or other device and the optical signal is received by the surface mounted detector or other device, and
- wherein the reflector structure is configured to face a waveguide, lens, detector, other device, or all or a portion of a PIC or a component of a PIC, and the optical signal is received by the waveguide, lens, detector, other device, or all or a portion of a PIC or an element of a PIC, and
- wherein the reflector structure is configured to face a waveguide, lens, detector, other device, or all or a portion of a PIC or a component of a PIC, and the optical signal is received by the reflector from the waveguide, lens, detector, other device, or all or a portion of a PIC or an element of a PIC.

FIG. 25

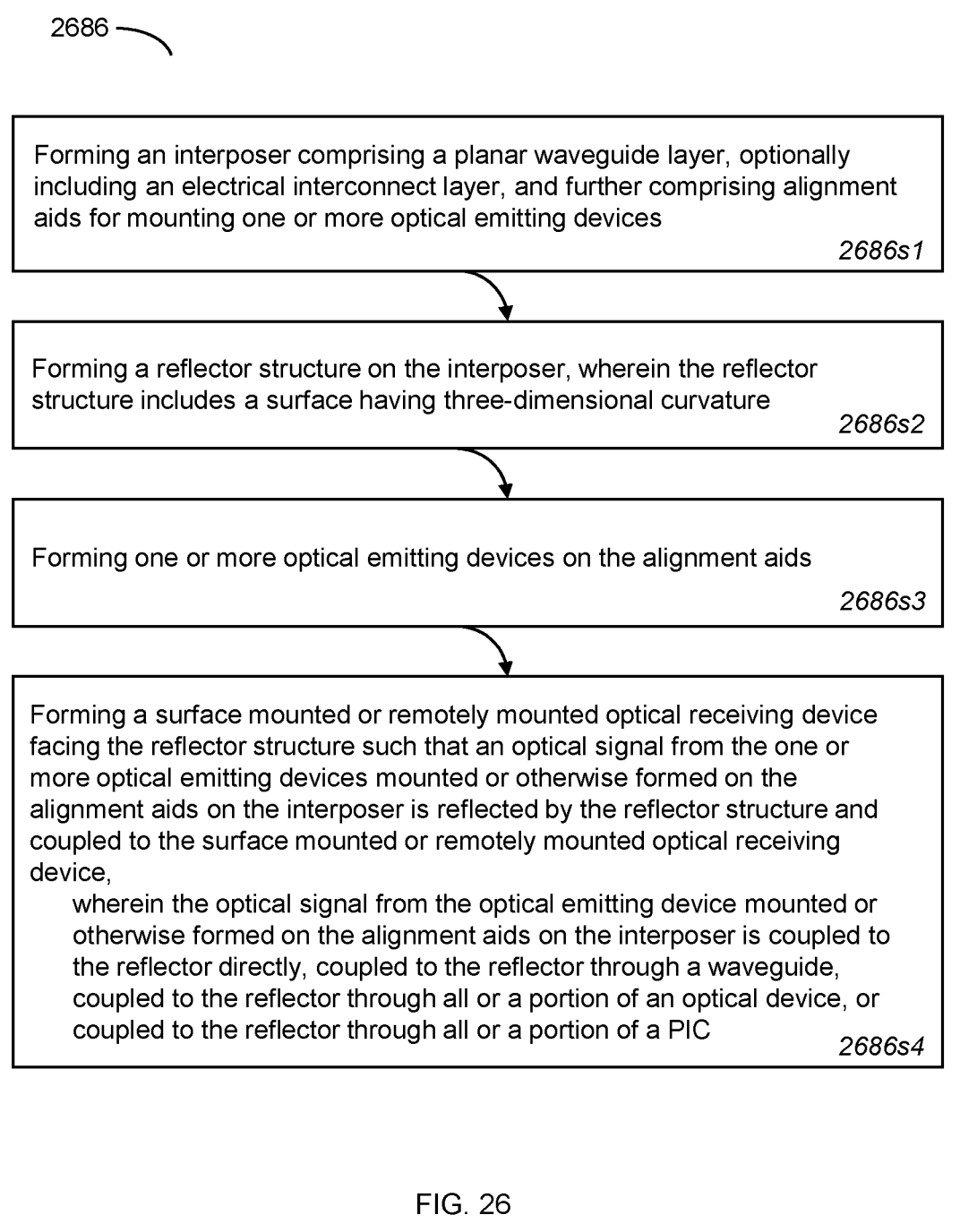

2686

Forming an interposer comprising a planar waveguide layer, optionally including an electrical interconnect layer, and further comprising alignment aids for mounting one or more optical emitting devices

*2686s1*

Forming a reflector structure on the interposer, wherein the reflector structure includes a surface having three-dimensional curvature

*2686s2*

Forming one or more optical emitting devices on the alignment aids

*2686s3*

Forming a surface mounted or remotely mounted optical receiving device facing the reflector structure such that an optical signal from the one or more optical emitting devices mounted or otherwise formed on the alignment aids on the interposer is reflected by the reflector structure and coupled to the surface mounted or remotely mounted optical receiving device, wherein the optical signal from the optical emitting device mounted or otherwise formed on the alignment aids on the interposer is coupled to the reflector directly, coupled to the reflector through a waveguide, coupled to the reflector through all or a portion of an optical device, or coupled to the reflector through all or a portion of a PIC

*2686s4*

FIG. 26

REFLECTOR STRUCTURE HAVING THREE-DIMENSIONAL CURVATURE

This application claims priority from U.S. Provisional Patent Application Ser. No. 63/357,775, filed on Jul. 1, 2022, entitled "Reflector Structure Having Three-Dimensional Curvature", hereby incorporated by reference in its entirety.

FIELD OF THE INVENTION

The disclosure relates to photonic integrated circuits, and more particularly to a structure and method for routing optical signals into and from planar waveguides in photonic integrated circuits.

BACKGROUND

Photonic integrated circuits (PICs) are used in optical communications networks and other applications that utilize optical signals for encoding and transporting information. Planar waveguides are used in PICs for guiding the optical signals between the various optical and optoelectrical components within the circuit. Coupling losses, however, between waveguides and other optical components can limit the performance of PICs.

Optical devices used in PICs can be formed from the same planar waveguide layer as that used in the formation of patterned planar waveguides, as in the case of an arrayed waveguide, for example. Optical devices can also be formed elsewhere and mounted on the interposer or other form of substrate upon which a PIC may be fabricated. The optical plane of mounted optical devices is commonly aligned with the same optical plane as the planar waveguide layer. Optical devices can also be mounted or otherwise formed out of the plane of the planar waveguide, as in the case, for example, of surface-mounted devices that can receive optical signals perpendicular to the path of propagation in the planar waveguides patterned from a planar waveguide layer.

Coupling losses between the various forms of optical devices can result from a number of factors such as, for example, the losses resulting from optical reflections at the junctions of misaligned devices, the losses due to divergence as a signal emerges from a device aperture, and the losses due to mismatches between the spot size of a signal output from one optical device and the aperture through which the signal is coupled to another optical device.

Thus, a need in the art exists for structures and methods that can enable efficient optical signal transfer between optical devices in PICs.

SUMMARY

Embodiments of a reflector structure with three-dimensional curvature and methods for the formation of the reflector structure are disclosed herein.

Embodiments described herein disclose a structure and methodology for the formation of a reflector structure having surface curvature in multiple dimensions that enables an incoming optical signal to the reflector to be focused to a smaller area upon reflection. An outgoing signal reflected from a reflector structure with a reduced cross-sectional area is beneficial in applications in photonic integrated circuits for which perpendicular coupling of a focused beam between optical devices in a photonic circuit is preferred over the coupling of an unfocused signal. Focused signals may be preferred, for example, in applications in which a reduction in spot size is beneficial, for applications in which an optical signal is coupled to an aperture or other device feature, and in applications in which the control or elimination of beam divergence is pertinent.

In embodiments, an optical signal, incident on a reflector having a three-dimensionally curved surface, is reduced in cross-sectional area after reflection. The reduction in cross-sectional area of the outgoing signal, after reflection, arises from a combination of reflector curvatures in multiple planes that narrows the optical signal correspondingly within each plane of curvature. In a preferred embodiment, the focusing of an outgoing signal from a reflector to a focal point, for example, enables improved coupling with the placement of an aperture of a mounted receiving device or other coupling target at the focal point of the reflected signal. In other embodiments, narrowing of the incoming signal can lead to improved coupling of the outgoing signal after reflection and is achieved with the multi-dimensional surface curvature provided in embodiments.

In embodiments, a reflective structure is formed having a curved surface in three-dimensions such that an incoming signal incident upon, and reflected from, the three-dimensionally curved surface is reduced in cross sectional area upon reflection such that the area of incidence is less than the surface area of the ingoing beam to the reflector over a range of distance from the reflector.

In another embodiment, a reflective structure having a three-dimensionally curved surface is formed on a substrate comprised of a cavity and a reflective layer. The cavity is formed on the substrate with three-dimensional curvature such that upon formation of a reflective layer on the cavity, an optical signal reflected from the reflective structure can be reduced in size. In embodiments, the surface curvature of the reflective structure, and the reduction in signal area that results from the surface curvature, is a combination of the surface curvature of the cavity and the surface curvature of the reflective layer.

In yet another embodiment, a reflective structure having a three-dimensionally curved surface is formed on a substrate comprised of a cavity, a reflective layer, and a planar waveguide having an end facet. The cavity is formed in the substrate in proximity to the end facet of the planar waveguide and a reflective layer is formed on the cavity facing the end facet of the waveguide such that optical signals propagating from the end facet of the waveguide and coupled to the reflector are focused to a smaller cross-sectional area upon reflection than the area of the ingoing beam to the reflector. A detector may be positioned in proximity to the reflector, in embodiments, at a location to receive the smaller area signal, wherein the narrowed signal improves the coupling of the signal to the detector.

In yet another embodiment, a reflective structure having a three-dimensionally curved surface is formed on an interposer having a planar waveguide layer and an electrical interconnect layer, wherein the reflective structure is comprised of a cavity, a reflective layer, and a planar waveguide having an end facet. The cavity is formed in all or a portion of the planar waveguide layer such that a reflector layer formed on the curved surface of the cavity is coupled to the end facet of the planar waveguide also formed from the planar waveguide layer of the interposer. Optical signals propagating from the end facet of the waveguide and coupled to the reflective curved cavity are focused to a smaller area upon reflection than the area of the ingoing signal to the reflector. A detector may be positioned in proximity to the reflector at a location to receive the smaller area signal, wherein the narrowed signal improves the coupling of the signal to the detector. The reflector structure provides access to the optical signals propagating from the end facet of the planar waveguide at a position perpendicular or substantially perpendicular to the longitudinal axis of the planar waveguide for receiving optical signals from, and for coupling optical signals to, the planar waveguides formed from the planar waveguide layer. Optical signals, for example, that originate from a PIC to which the planar waveguide is coupled, can be coupled from the end facet of the planar waveguide to the curved reflector layer and further coupled to a detector located on or above the substrate to receive the reflected signal from the reflector.

In yet another embodiment, a cavity with a three-dimensional curved surface is formed on a substrate having a planar waveguide layer, and a reflector layer is formed on the curved surface of the cavity. The cavity with the reflector layer is formed in proximity to an end facet of a waveguide formed from the planar waveguide layer such that light exiting the waveguide is coupled to the reflective layer on the curved surface of the cavity. The surface curvature of the reflector, in embodiments, is such that coupled light exiting the end facet of the waveguide and incident on the reflector is reflected to a focal point on an axis that is substantially perpendicular to the longitudinal axis of the waveguide. In an embodiment, the focused light is directed to an optical device, such as a surface-mounted photodetector or other optical device, receptive to the reflected signal.

In yet other embodiments, a cavity with three-dimensional surface curvature is formed on a substrate, and a reflector layer is formed on the curved surface of the cavity. The cavity with the reflector layer is formed in proximity to an emission facet of an optical device such that an optical signal exiting the emission facet is coupled to the reflective layer on the curved surface of the cavity. The surface curvature of the reflector, in embodiments, is such that a coupled optical signal exiting the emission facet of the optical device and incident on the reflector is reflected to a focal point on an axis that is substantially perpendicular to the longitudinal axis of the emitting device. In an embodiment, the focused signal is directed to an optical device receptive to the reflected signal.

In yet other embodiments, a cavity with three-dimensional surface curvature is formed on a substrate, and a reflector layer is formed on the curved surface of the cavity. The cavity with the reflector layer is formed in proximity to a receiving facet of an optical device such that an optical signal from the reflector is coupled to the reflective layer on the curved surface of the cavity. The surface curvature of the reflector, in embodiments, is such that a coupled optical signal reflected from the reflector is narrowed or otherwise focused and incident on the receiving facet of the optical device.

Methods of forming embodiments of beam narrowing reflectors are disclosed herein. In an example method of formation of an embodiment, an interposer is formed having a planar waveguide layer, and a patterned gray scale mask layer is formed on the interposer. The planar waveguide structure on the interposer is patterned using the gray scale mask to form one or more cavities having three-dimensional curved surfaces and having planar waveguide facets coupled to reflective layers formed on these curved surfaces. The three-dimensional curvature of the cavities formed on the interposer, in embodiments, results from the gray scale lithographic exposure of the photoresist layer and the subsequent etch or patterning process and particularly from the tapered portion of the gray scale mask layer. The resulting curvature of the reflector is such that optical signals exiting the waveguide facet coupled to, and incident upon, a reflective layer formed on the curved surface of the cavity are substantially focused or otherwise reduced in size.

Other embodiments, and other aspects and features of embodiments, will become apparent to those skilled in the art upon review of the following detailed description in conjunction with the accompanying figures.

BRIEF DESCRIPTION OF THE DRAWINGS

FIG. 2F shows an embodiment of a reflector having three-dimensional curvature (a) with orthogonal planes showing the slices having curvature in each of the slices, and (b) beam narrowing that results from an embodiment of a reflector having curvature in three dimensions.

FIG. 7B shows an interposer as in FIG. 7A with the addition of a patterned gray scale mask layer: (a) Section A-A', (b) top view, and (c) Section B-B'.

FIG. 7C shows an interposer as in FIG. 7B after the patterning of the planar waveguide layer: (a) Section A-A', (b) top view, and (c) Section B-B'.

FIG. 7D shows an interposer as in FIG. 7C after removal of the patterned gray scale mask layer: (a) Section A-A', (b) top view, and (c) Section B-B'.

FIG. 9D shows an interposer as in FIG. 9C after removal of the patterned hard mask and gray mask layers: (a) Section A-A', (b) top view, and (c) Section B-B'.

FIG. 11A shows an interposer as in FIG. 7A after the formation of a hard mask layer and patterning of the planar waveguide layer to form a waveguide facet: (a) Section A-A', (b) top view, and (c) Section B-B'.

FIG. 11B shows an interposer as in FIG. 11A after removal of the hard mask layer and with the formation of a patterned gray scale mask layer: (a) Section A-A', (b) top view, and (c) Section B-B'.

FIG. 11D shows an interposer as in FIG. 11C after removal of the gray scale mask layer the formation of a reflector layer on a reflector cavity: (a) Section A-A', (b) top view, and (c) Section B-B'.

FIG. 16B shows an interposer as in FIG. 16A after formation of reflector cavity and the formation of a reflector layer on a reflector cavity shown facing all or a portion of a PIC: (a) Section A-A', (b) top view, and (c) Section B-B'.

FIG. 20 shows a flowchart for a method of forming embodiments of a reflector having curvature in more than one cross-sectional plane.

FIG. 21 shows a flowchart for a method of forming a reflector having three-dimensional curvature such that an outgoing beam from the reflector is focused or otherwise narrowed in three dimensions.

FIG. 22 shows a flowchart for a method of forming embodiments of a reflector having a curved three-dimensional surface facing the facet of waveguide or emitting device such that the cross section of an optical signal exiting the waveguide or emitting device is narrowed in two or more dimensions upon reflection from the reflector.

FIG. 23 shows a flowchart for a method of forming a substrate having a reflective structure facing a waveguide or emitting device so that an optical signal from the waveguide or emitting device and incident on the reflective structure is narrowed in two or more dimensions upon reflection from the reflector structure.

FIG. 24 shows a flowchart for a method of forming an interposer having a reflector structure such that an optical signal reflected from the reflector structure is narrowed in two or more dimensions upon reflection from the reflector structure FIG. 25 shows a flowchart for a method of forming an interposer having a reflector structure facing a waveguide or emitting device such that optical signals reflected from the reflector are narrowed or otherwise focused in two or more dimensions.

FIG. 26 shows a flowchart for a method of forming an assembly that includes an interposer having alignment aids, a reflector having three-dimensional curvature, a receiving device mounted or otherwise formed on the alignment aids, and a surface-mounted or remotely mounted emitting device.

Figure 1A:
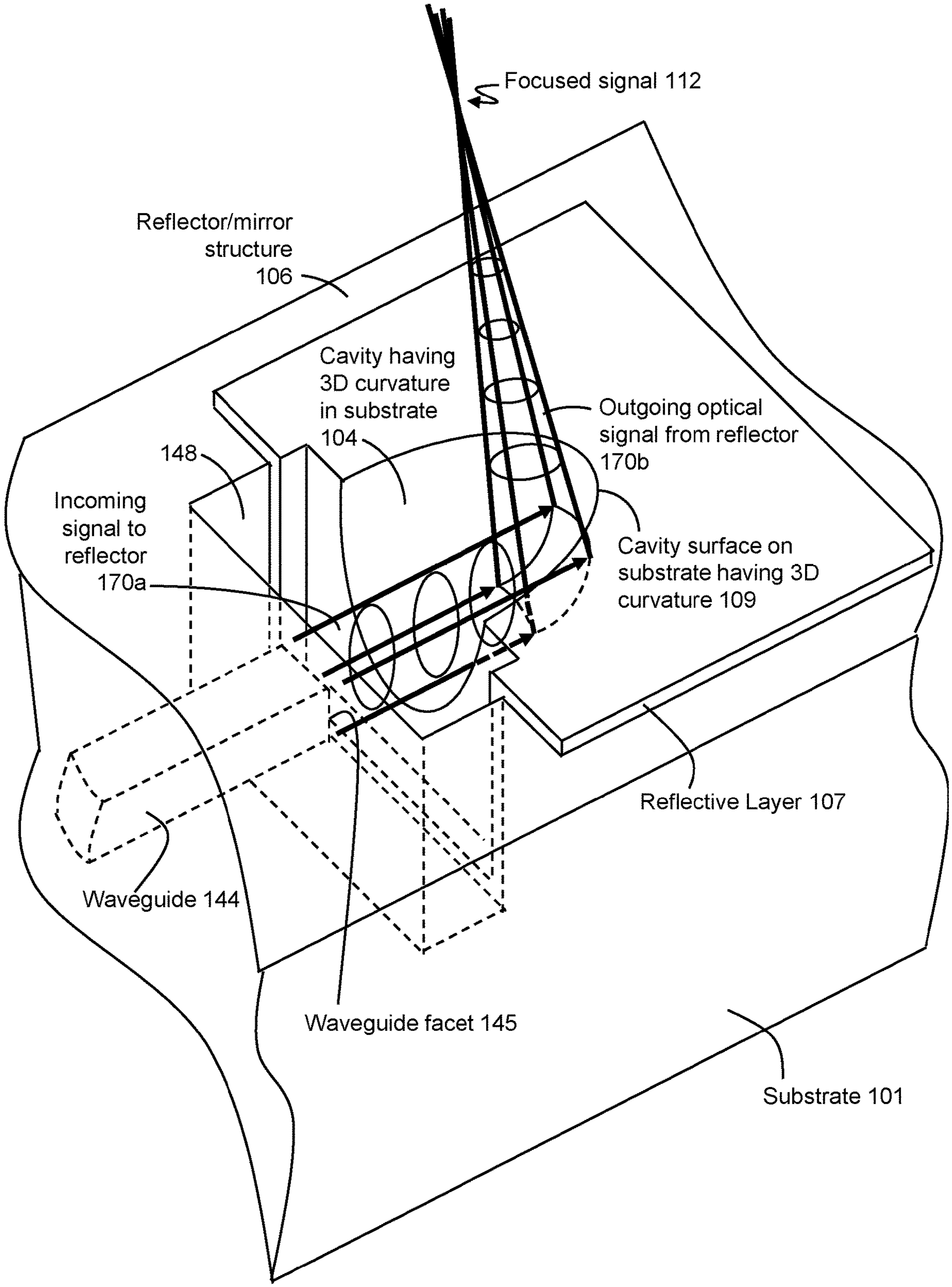
FIG. 1A shows a perspective drawing of an embodiment of a beam-width-reducing reflector having three-dimensional surface curvature shown coupled to a planar waveguide.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

Embodiments described herein disclose a reflector structure and methodology for the formation of a reflector structure that enables optical signals to be provided to, and received from, planar waveguides or other components in photonic integrated circuits that are formed, for example, on an interposer structure or other substrate.

The embodiments described herein further disclose a reflector structure and methodology for the formation of a reflector structure having surface curvature in multiple dimensions that enables an ingoing optical signal to the reflector to be focused to a smaller area upon reflection. An outgoing signal reflected from a reflector structure with a reduced cross-sectional area is beneficial in applications in photonic integrated circuits for which perpendicular coupling of a focused beam between optical devices in a photonic circuit is preferred over the coupling of an unfocused signal. Focused signals may be preferred, for example, in applications in which a reduction in spot size is beneficial, for applications in which an optical signal is coupled to an aperture or other device feature, and in applications in which the control or elimination of beam divergence is pertinent.

Definitions

A “reflector structure” and “reflector,” as used herein refers to a structure comprised of a base support and an optional reflective surface layer. A base support with regard to the base support of a reflector structure, as used herein, is a structure formed in or on a substrate that is shaped and aligned to enable a redirection of an optical signal. A reflective surface layer, as used herein, refers to a reflective surface layer formed on a base support of a reflector to provide reflection of an optical signal incident on the reflector layer. Base supports, as described herein, are often formed from optically transparent materials and the reflective properties of the base supports can be substantially improved with the formation of a reflective layer on the base support.

A “waveguide facet,” as used herein, refers to a termination of a waveguide. Waveguide facets described herein are formed, for example, by etching vertically through a planar waveguide. The termination of a waveguide is used in embodiments, for example, to couple optical devices to planar waveguides at the termination, and for coupling of planar waveguides to optical devices, such as, for example, a reflector. In embodiments, a waveguide facet is formed with a vertical etch through a plane that is perpendicular to the longitudinal axis of a planar waveguide, wherein the longitudinal axis is typically the axis of propagation for optical signals in the waveguide.

A “substrate” as used herein refers to, but is not limited to, a mechanical support such as a semiconductor, an insulator, or a metal, or a combination of layers of one or more of a semiconductor, insulator, and metal upon which devices and structures such as planar waveguide structures, semiconductor devices, optical devices, photonic devices, optoelectronic devices, electronic devices, and the like can be deposited, grown, mounted, placed or otherwise formed and for which structures such as photonic integrated circuits (PICs) and embodiments may be formed. Substrates may include, but are not limited to, silicon, InP, GaAs, silica-on-silicon, silica, silica-on-polymer, glass, a metal, a ceramic, a polymer, or a combination thereof.

An "interposer" as used herein refers to a substrate with a planar waveguide layer and an optional electrical interconnect layer that are formed on a substrate as further described herein.

A "planar waveguide layer" as used herein refers to, but is not limited to, a material or combination of materials that has good optical transmission properties with low optical signal attenuation, and through which the direction of optical signal propagation is parallel, or substantially parallel to the surface of a substrate. Planar waveguide materials may include, but are not limited to, a wide range of dielectric films of Si, 0, and N in the form of silicon oxynitride, silicon nitride, and silicon oxide, and InP and alloys of InP among others. Polymer layers may also be used as planar waveguide layers and as cladding layers for other materials. Additionally, multilayer structures of silicon oxynitride and silicon oxide are included. "Waveguides," as used herein, include the core of the waveguide through which optical signal substantially propagates and may include one or more cladding layers that surround the core layer.

An "electrical interconnect" as used herein refers to, but is not limited to, a material having good electrical conductivity and includes structures formed from thin films, thick films, and plated films for example of materials including, but not limited to, metals such as aluminum, copper, gold, chromium, tantalum, tungsten, tin, silver, platinum, nickel, palladium, titanium, and combinations of such materials, among others. Electrical interconnects may be horizontal interconnects that form conductive lateral connections between lateral locations on or within an electrical interconnect layer. Electrical interconnects may be vertical interconnects that form conductive vertical connections between vertical locations between lateral interconnections. Vertical interconnections may be formed, for example, between lateral interconnections, between electrical interconnect layers, between the electrical contacts of surface-mounted devices and underlying electrical interconnect layers, among other types of vertical interconnections. Vertical interconnections are commonly referred to as vias.

An "electrical interconnect layer" as referred to herein refers to, but is not limited to a layer that includes electrical interconnects and the intermetal dielectric layers that may be required to electrically insulate and to provide mechanical support for the electrically conductive materials in the layer.

An "optical signal" as referred to herein refers to, but is not limited to, a signal that includes one or more wavelengths of light in the range of the visible and near infrared portions of the electromagnetic spectrum that include the range from 100 nm to 3000 nm. Particular applications are relevant to telecommunications applications, but not limited to, the ranges of the infrared spectrum from 1260 to 1565 nm.

A "semiconductor" as used herein refers to, but is not limited to, a material having an electrical conductivity value falling between that of a metal conductor and an insulator. The material may be an elemental material such as silicon and germanium, or a compound material such as from the III-V family of semiconductors, including those between indium (In), gallium (Ga), and aluminum (Al) with nitrogen (N), phosphorous (P), arsenic (As), including for example InP, GaAs, GaN, GaP, InAs, and AlAs, and further including InGaAsP, GaAlAs, and other multi-elemental semiconducting alloys commonly utilized in photonic structures. A "metal" as used herein and throughout this disclosure refers to, but is not limited to, a material (element, compound, and alloy) that has good electrical and thermal conductivity. This may include, but not be limited to, aluminum, copper, gold, chromium, titanium, tantalum, tungsten, tin, silver, platinum, nickel, palladium, and combinations of such materials.

References to "an embodiment," "another embodiment," "yet another embodiment," "one example," "another example," "yet another example," "for example," and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Structure Embodiments

FIG. 1A shows a perspective drawing of an embodiment of a reflector structure 106 formed on substrate 101. An incoming beam of light 170*a* from a planar waveguide 144 or other optical device in the embodiment is incident on a reflector layer 107 formed on the reflector structure 106. The surface curvature of the reflector structure 106 is such that the outgoing beam of light 170*b* is reduced in size upon reflection from the reflector layer 107, and is shown to have a minimum cross-sectional area at focal point 112 in FIG. 1A. The cross-sectional area of the incident beam 170*a* and the reflected beam 170*b* are represented in FIG. 1A by the sequence of ellipses and the reduction in the cross-sectional area for the focused reflected beam 170*b* is further represented by the progressively smaller area of the ellipses in FIG. 1A upon reflection from the reflector layer 107. A progressively increasing beam size is anticipated beyond the minimum beam area anticipated at location 112. Optional recess 148 is shown in FIG. 1A between end facet 145 of the planar waveguide 144 and the reflector structure 106 in the embodiment.

Reflector structure 106 is comprised of a cavity 104 having three-dimensional surface curvature formed on substrate 101, and a reflective layer 107 formed on the cavity surface 109. Optical signal 170*a* exiting the waveguide facet 145 of the waveguide 144 in the embodiment, is shown reflected from the curved reflector layer 107 of the reflector structure 106. In the embodiment, end facet 145 of the waveguide 144 terminates in recess 148. The three-dimensional curvature of the reflective surface layer 107 of the reflector structure 106 is such that a beam 170*a* exiting the waveguide facet 145 and reflected from the reflector surface layer 107 is reduced in cross sectional area at a location up to, including, and at some distance beyond the location of the minimum cross-section signal area at focal point 112.

Optical signals exiting the end facet 145 of planar waveguide 144 can be accessed upon reflection from the reflector structure 106 at locations above the reflector surface layer 107. These exiting optical signals 170*a* from waveguide 144 may originate from a device in a photonic circuit, for example, that is formed on or coupled to the substrate 101. These exiting optical signals 170*a* from the waveguide 144 can be processed or otherwise utilized upon reflection from the reflector structure 106. Placement of a photodetector or other device or device feature at, or in proximity to, the focal point 112, for example, can facilitate conversion of the outgoing signal optical signal 107*b* to an electrical signal. Other applications can be envisioned for the extraction and utilization of optical signals outside of a planar waveguide and the photonic circuits that are coupled to a planar waveguide to locations outside of the planar waveguide circuit. Some example applications are described further herein.

Reflector layer 107 on the reflector structure 106 can be a metal such as aluminum or gold, for example, or another reflective material. Reflector layer 107 may also be a composite structure comprised of one or more reflective layer and one or more passivation layer, for example, to prevent degradation of the reflective properties of the reflector layer 107.

FIG. 1A shows incoming optical signal 170*a*, an embodiment of reflector structure 106, and outgoing optical signal 170*b* after reflection. The incoming signal 170*a* may be, for example, an optical signal as used in a photonic integrated circuit (PIC). The incoming signal 170*a*, in the figure, is shown exiting waveguide facet 145 of patterned planar waveguide 144 to the reflector structure 106. The cross-sectional area of the incident incoming optical signal 107*a* is reduced in size upon reflection from the reflector structure 106 as a result of the curvature provided by the combination of the curvature of the surface 109 of the reflector cavity 104 and the reflector layer 107 formed on the curved surface 109 of the reflector structure 106. Reductions in cross sectional area of an optical signal after reflection from the reflector structure 106 can improve the efficacy of signal transfer between the source of the incoming signal 170*a* and the target of the outgoing signal 170*b* to which the optical signal is coupled. Improvements in efficacy can result, for example, from the reduction in the beam area and the improved collection efficiency that can result from the smaller beam area on the corresponding aperture to which the beam is coupled. Reductions in signal divergence that can occur as optical signals exit an end facet or aperture of an emitting device can also lead to improvements in the efficacy of signal transfer. FIG. 1A shows a focal point 112 of minimal cross-sectional signal area resulting from the beam narrowing effects of the curvature in the reflector structure 106. By coupling a receiving device, for example, at, or near to, the location 112, the efficiency of the coupling can be improved with the reduction in spot size, particularly for receiving devices with limited receiving area and for receiving devices that have receiving areas that are smaller in cross section area than that of the incoming beam size.

Figure 1B:
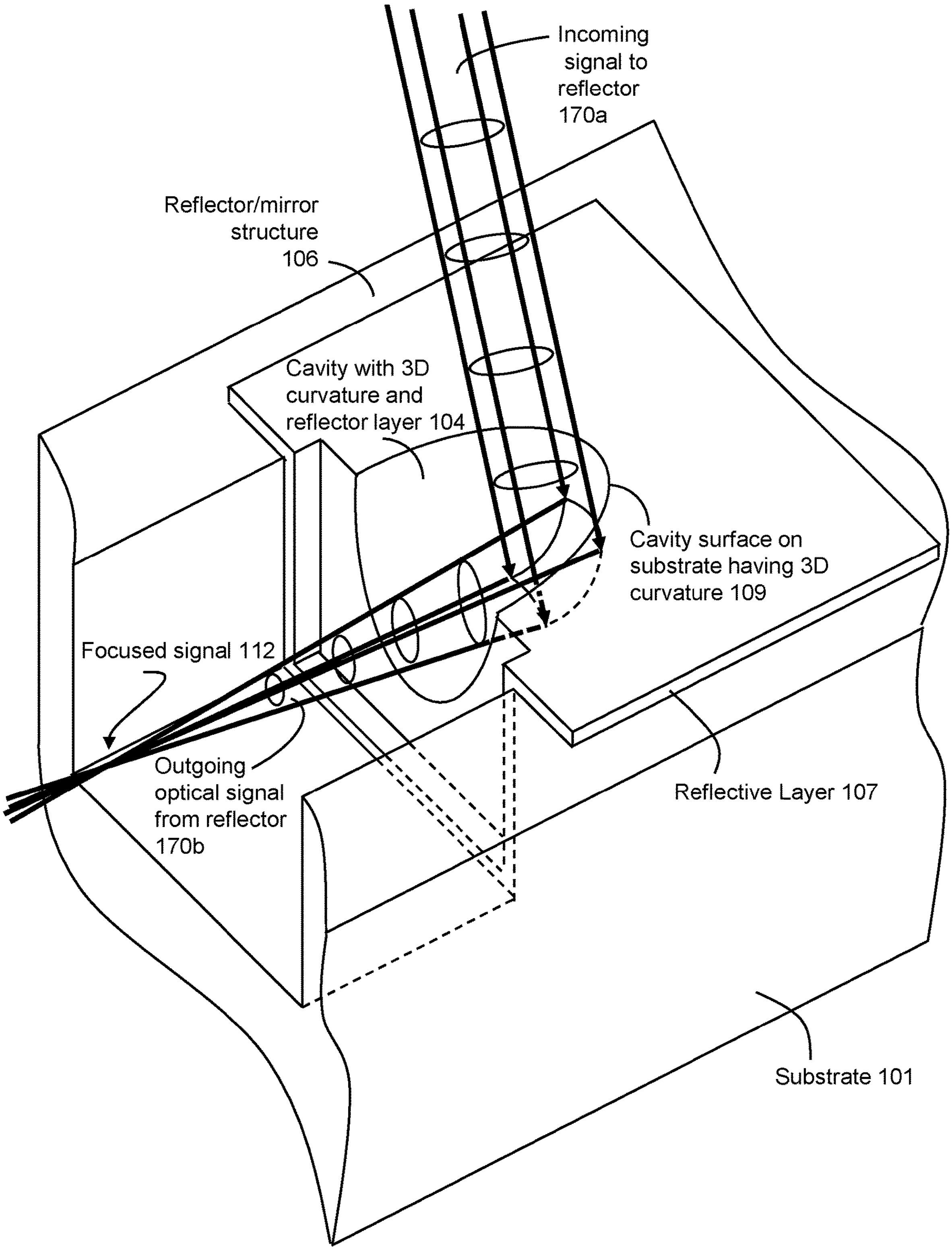
FIG. 1B shows a perspective drawing of another embodiment of a beam-width-reducing reflector having three-dimensional surface curvature.

FIG. 1B shows another embodiment of reflector structure 106 configured to receive incoming optical signal 170*a* from above the reflector and to reflect the optical signal into the longitudinal axis of a waveguide or other device on the substrate 101. In the embodiment shown in FIG. 1B, an incoming beam of light 170*a* is incident on a reflector layer 107 of the reflector structure 106 and the surface curvature of the reflector structure 106 is such that the outgoing beam of light 170*b* is reduced in cross-sectional area upon reflection, reaching a minimum at a focal point 112 in the beam path. In the embodiment shown in FIG. 1B, the outgoing beam 170*b* after the reflection is propagating in a direction that is parallel or substantially parallel to the propagation axis of the planar waveguide layer 144 shown in FIG. 1A. The embodiment shown in FIG. 1B shows the reflector layer 107 formed on the cavity surface 109 of the reflector cavity 104. Receiving apertures, for example, of optical devices for receiving or otherwise coupling to the optical signal 170*b* can be positioned, for example, at or in proximity to the location of the focused signal 112. All or a portion of a PIC, a waveguide, a lens, a device or a component or device of a PIC may also be positioned at, or in proximity to, the focal point 112 of the outgoing optical beam 170*b* in FIG. 1B in other embodiments.

The cross-sectional area of the incident beam 170*a* and the reflected beam 170*b* are represented in FIG. 1B by the sequence of ellipses and the reduction in the cross-sectional area for the focused reflected beam 170*b* is further represented by the progressively smaller areas of the ellipses in FIG. 1B upon reflection from the reflector layer 107. A progressively increasing beam size is anticipated beyond the location of the minimum beam area at focal point 112. Reflector layer 107 on the reflector structure 106 can be a metal such as aluminum or gold, for example, or another reflective material. Reflector layer 107 may also be a composite structure comprised of one or more reflective layer and one or more passivation layer, for example, to prevent oxidation or other form of degradation in the reflective properties of the reflector layer 107.

In the embodiment shown in FIG. 1B, an incoming signal 170*a* is incident onto the reflector layer 107 from a position normal or substantially normal to the substrate 101 as shown. The incident incoming signal 170*a* in FIG. 1B is reflected perpendicularly or substantially perpendicularly in the embodiment from the reflector layer 107. In other embodiments, the reflection angle may be different than a right angle or approximately a right angle. The curvature of the reflector structure 106 enables a reduction of the cross-sectional area of the reflected signal 170*b* from that of the incident incoming optical signal 170*a*, thereby providing a means for potential improvement in the coupling efficiency between the source of the incoming optical signal 170*a* and the target of the reflected outgoing optical signal 170*b*.

Reductions in the cross-sectional area of an optical signal after reflection from the reflector structure 106 can improve the efficacy of signal transfer between the source of the incoming signal 170*a* and the target of the outgoing signal 170*b* to which the incoming signal is coupled. These improvements in efficacy can result, for example, through the reduction in the beam area, through the reduction of signal divergence, and through the improved collection efficiency for devices with a fixed aperture or receiving surface, among other reasons. FIG. 1B shows a focal point 112 having a minimum cross-sectional signal area resulting from the beam narrowing effects of the curvature in the reflector structure 106 for the embodiment shown in FIG. 1B. By coupling a receiving device, for example, at the focal point 112, the efficiency of the coupling can be improved with the reduction in spot size, particularly for receiving devices with limited receiving area and for receiving devices that have receiving areas that are smaller in cross section area than that of the incoming beam 170*a*.

FIGS. 1A and 1B illustrate the effect of the three-dimensional curvature of embodiments of reflector structure 106 on two configurations of incoming beams 170*a*, and the beam-narrowing effect that this three-dimensional curvature has on the outgoing signal 170*b* from the reflector structure 106. The resulting beam-narrowing of the reflected signal can result in improved coupling efficiency in addition to the directional change provided by the reflector structure 106.

For reference to descriptions provided herein, propagation directions may be characterized as "in plane" propagation and "out-of-plane" propagation. "In-plane" propagation as described herein refers to lateral propagation within the thickness of the planar waveguide layer. Propagation within the thickness of a patterned planar waveguide may occur, for example, as signals propagate within the confines of the thickness of the core and cladding layers of the patterned planar waveguides formed from the patterned planar waveguide layer. Optical signals would propagate, for example, along an optical axis in a longitudinal direction in the patterned planar waveguide formed from the patterned planar waveguide layer.

For a planar optical waveguide formed on a flat substrate surface, the optical axis may align substantially parallel to the plane of the substrate surface. For the purpose of an example, the substrate may be a silicon substrate having a diameter of 200 mm and a thickness of 1 mm, thus forming a cylinder. The top surface of the cylindrical substrate, in this example, is formed in the geometric plane of the top circular surface of the cylindrical substrate. The optical axes of patterned planar waveguides, in such an example, is the plane of propagation within the core layer of the patterned planar waveguides formed on the cylinder.

In contrast, "out-of-plane" propagation, as described herein, refers to signal propagation that is directed perpendicularly, or substantially perpendicularly, to the "in-plane" directions. An optical signal, for example, propagating in a patterned planar waveguide formed from a planar waveguide layer may propagate in a horizontal direction (parallel to the large plane of the substrate). An "out of plane" propagation would then be perpendicular, or substantially perpendicular, to the in-plane propagation. "Perpendicular" refers to a direction of propagation that is at 90 degrees from the "in-plane" direction of propagation. In an embodiment, for example, an optical signal propagating from an end facet of a patterned planar waveguide and incident on an embodiment of a reflector structure, is narrowed in beam area and further incident on a receiving device positioned at 90 degrees from the "in-plane" propagation direction upon reflection from the reflector structure.

"Substantially perpendicular", in some embodiments, may refer to propagation after reflection of the optical signal from the in-plane direction to a direction that is at an angle of greater than 45 degrees from the in-plane direction such that the optical signal can be received by the receiving aperture of an optical detector positioned at a 45 degree angle or greater from the in-plane direction.

In other embodiments, "substantially perpendicular" may refer to propagation after reflection of the optical signal from the in-plane direction to a direction "out-of-plane" at an angle of greater than 60 degrees from an in-plane direction such that the narrowed spot size may be received by a the aperture or receiving facet of a detecting device positioned at an angle of 60 degrees or greater from the in-plane propagation direction.

Conversely, "perpendicular" may refer to the position of an emitting aperture or feature of an emitting device that is positioned at an angle of 90 degrees from the in-plane direction such that an optical signal emitted from the emitting device and reflected from an embodiment of the reflector structure is narrowed in beam area prior to incidence on the end facet of a waveguide or other optical device having an in-plane optical axis.

"Substantially perpendicular" may also refer to the position of an emitting device that is positioned at an angle within 60 degrees of the in-plane direction such that an optical signal emitted from the emitting device and reflected from an embodiment of the reflector structure is narrowed in beam area prior to incidence on the end facet of a waveguide or other optical device having an in-plane optical axis.

"Substantially perpendicular" may also refer to the position of an emitting device that is positioned at an angle within 45 degrees of the in-plane direction such that an optical signal emitted from the emitting device and reflected from an embodiment of the reflector structure is narrowed in beam area prior to incidence on the end facet of a waveguide or other optical device having an in-plane optical axis.

Figure 2A:
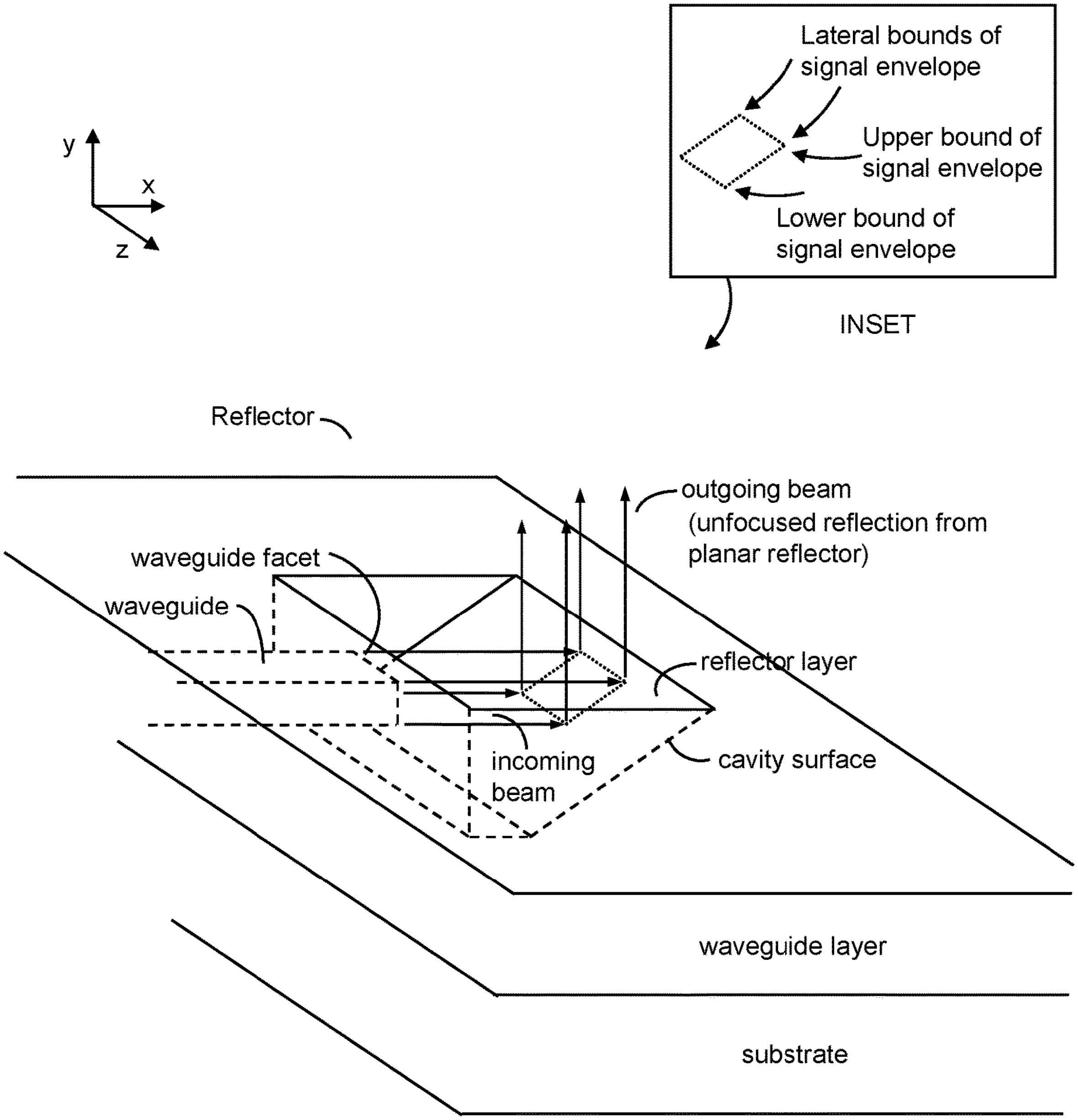
(PRIOR ART) FIG. 2A
FIG. 2A shows a prior art reflector structure with a linearly varying base. (INSET shows example boundaries of the reflected optical signal on the example linear reflector.)
Figure 2B:
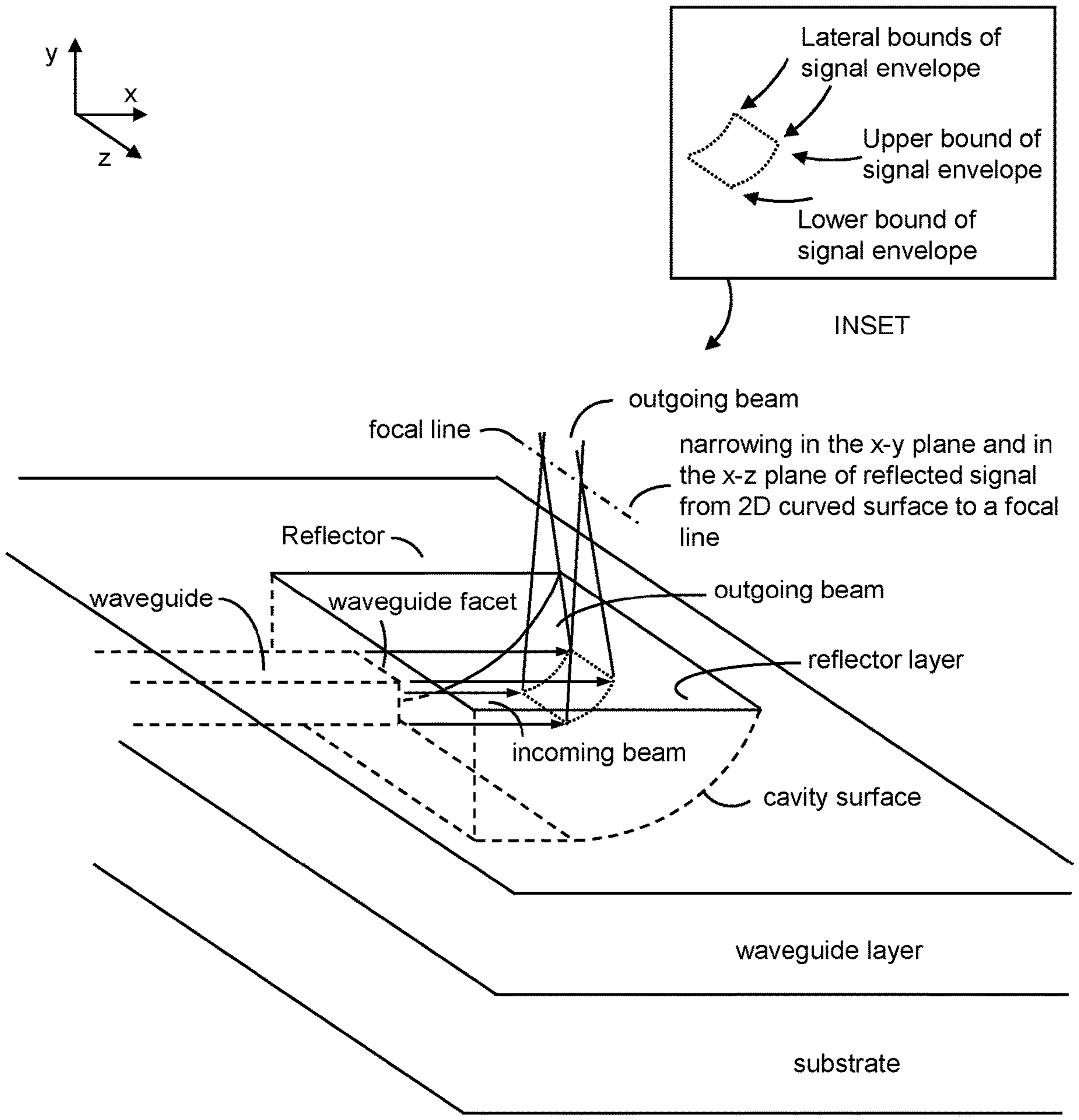
FIG. 2B shows a prior art reflector structure with two-dimensional curvature in the x-y plane as shown. (INSET shows example boundaries of the reflected optical signal on the example reflector with simple curvature.)
Figure 2C:
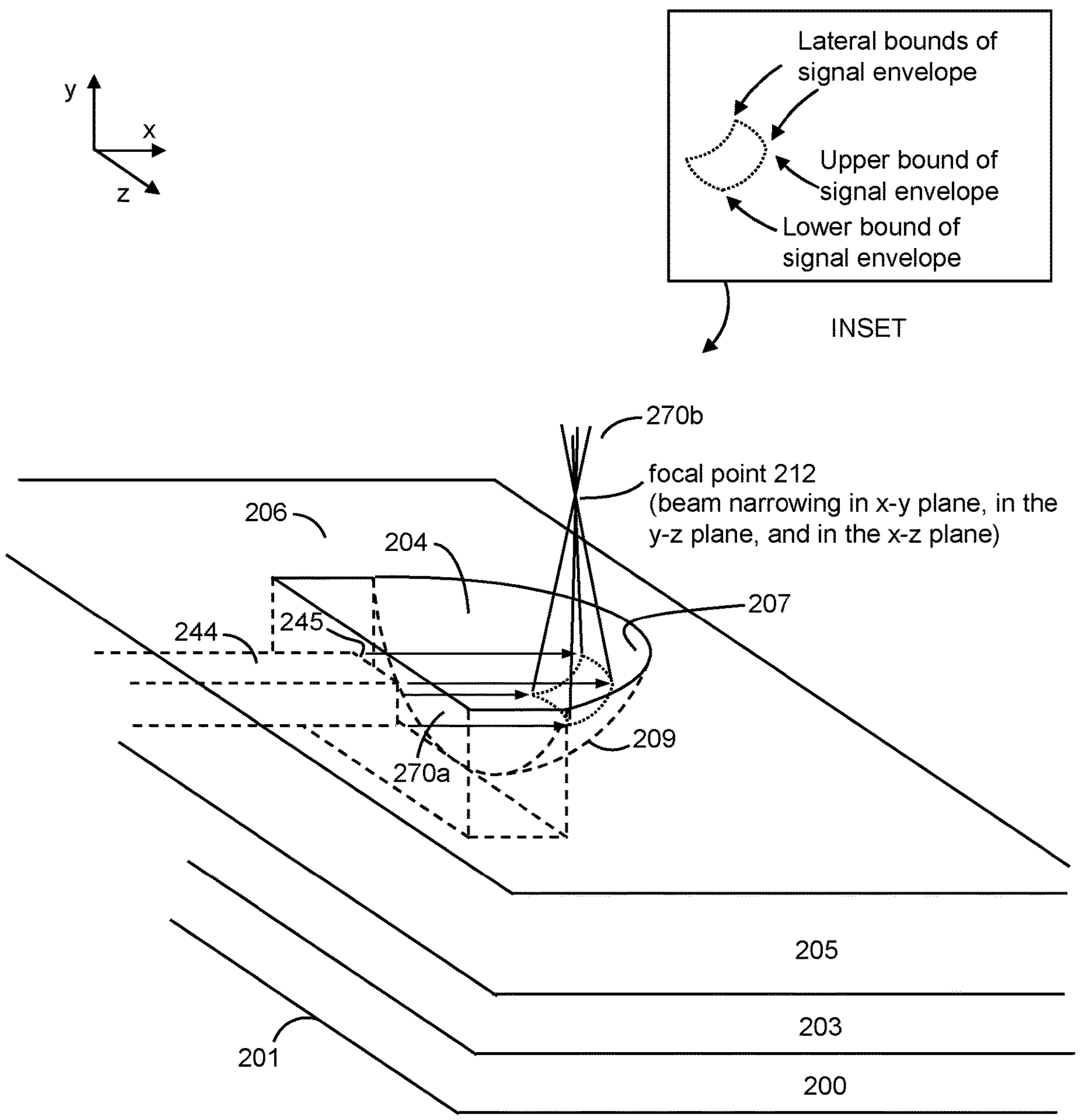
FIG. 2C shows an embodiment of a reflector structure with curvature in multiple planes. (INSET shows example boundaries of the reflected optical signal on the embodiment of the reflector having multidimensional curvature.)
Figure 2D:
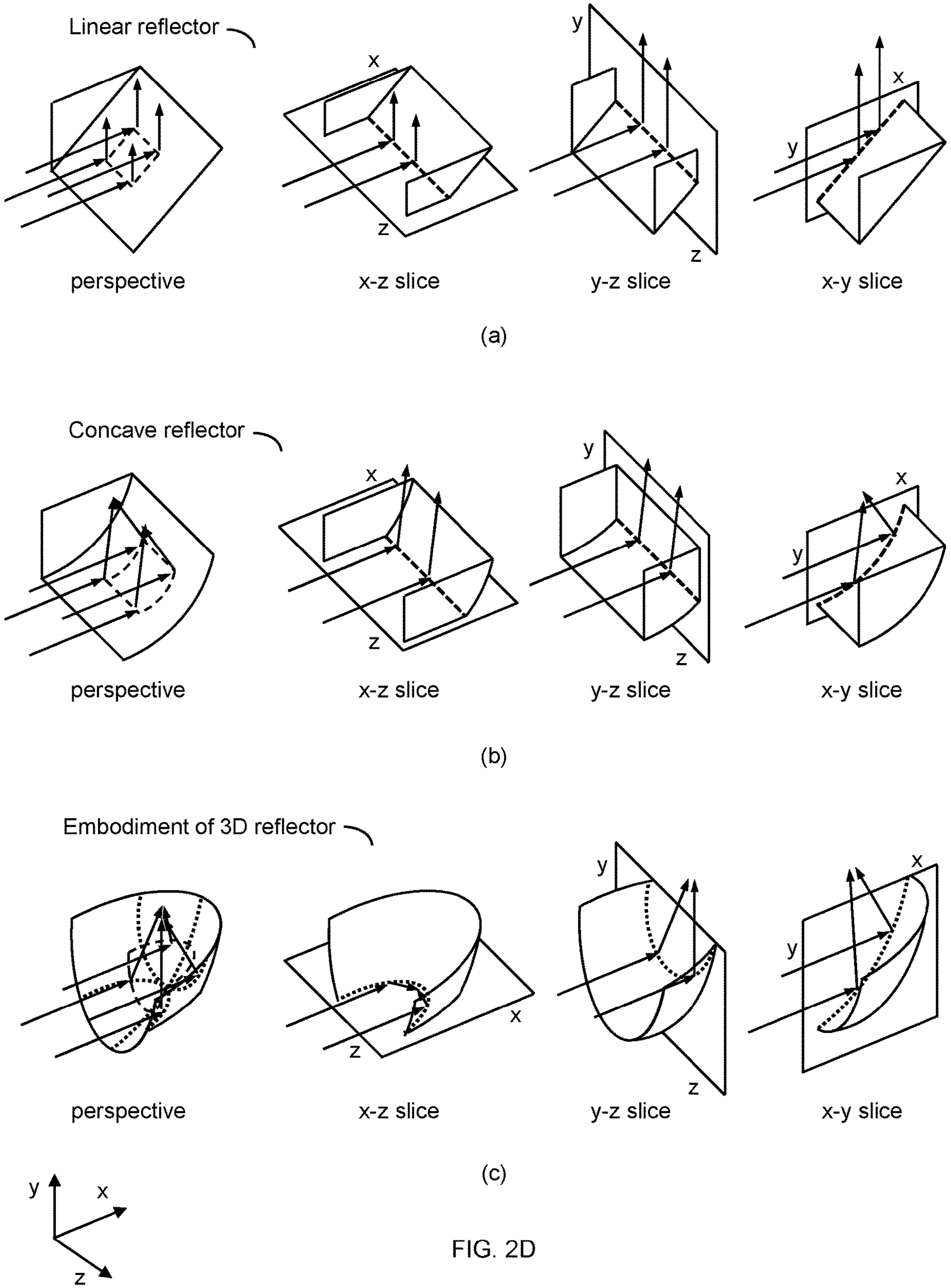
FIG. 2D shows orthogonal slices from (a) a linear reflector, (b) a reflector with simple curvature, and (c) an embodiment of a reflector having three-dimensional curvature.
Figure 2E:
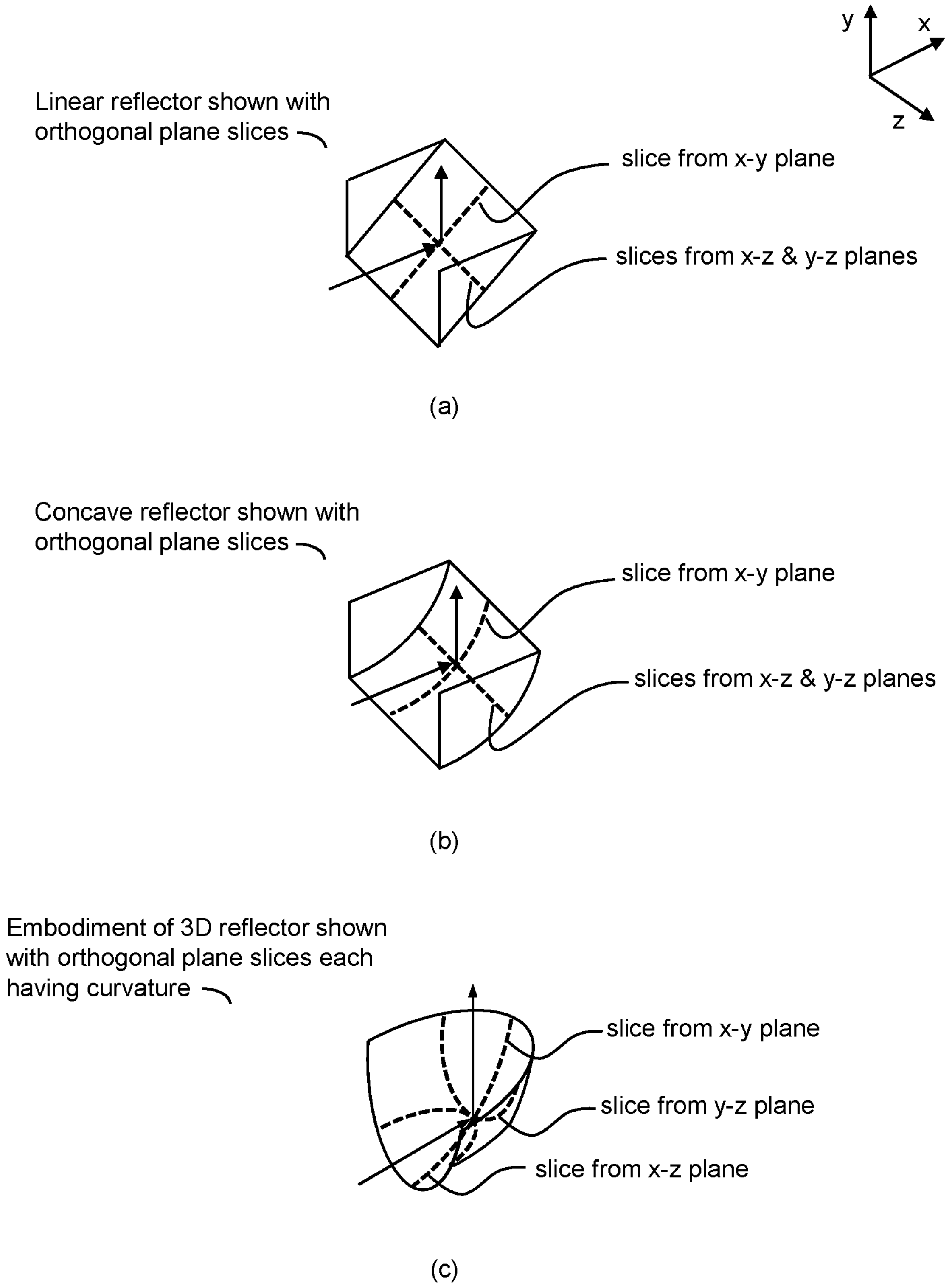
FIG. 2E shows projections of orthogonal slices onto (a) a linear reflector, (b) a reflector with simple curvature, and (c) an embodiment of a reflector having three-dimensional curvature.

As described herein, optical signals may be directed from in-plane to out of plane or from out of plane to in-plane The effects of reflector surface curvature on the redirection and beam narrowing of reflected optical signals is shown in the schematic drawings in FIGS. 2A-2F. FIGS. 2A and 2B show prior art reflector structures formed on substrates having planar waveguides formed from a planar waveguide layer. FIG. 2C shows an embodiment of a reflector structure formed on a cavity 204 having curvature in three dimensions and the effect that the curvature has on the narrowing of an incoming beam 270*a* from a planar waveguide facet positioned facing the reflector. FIG. 2D-2F show the curvature of reflectors in orthogonal slices taken through the reflectors of FIGS. 2A and 2B and through embodiments of reflectors having three-dimensional curvature.

FIG. 2A shows an example of prior art for a reflector that is linearly varying in the x-y plane and nonvarying in the z-direction with reference to the reference coordinate system provided in the figure. The reflector shown is assumed to have a reflective surface on the linearly sloped cavity surface. An optical signal exiting the waveguide facet of the planar waveguide to such a reflector structure is re-directed perpendicularly from the points of incidence upon reflection from the reflector for a slope of 45 degrees between the reflector surface and the incoming beam to the reflector surface. The projected boundaries of an example optical signal envelope emerging from the end facet of a closely coupled patterned planar waveguide are shown in the INSET of FIG. 2A for the linear reflector having a slope of 45 degrees. This figure shows the upper, lower, and lateral boundaries imposed by the geometric projection of the waveguide onto the reflector layer in the figure, although some divergence in the signal upon exiting the waveguide is anticipated. For the linearly sloped reflector, assuming a slope of 45 degrees, the beam is reflected perpendicularly from the angle of incidence. The reflected signal does not converge to a line or point upon reflection from the reflector but rather is subject to a simple reflection. For linear reflectors the outgoing angle is equal to the angle of incidence of the incoming beam to the reflector.

FIG. 2B shows another example of prior art for a reflector that is nonlinearly varying in the "x-y" plane, and nonvarying in the "x-z" and "y-z" plane with reference to the reference coordinate system provided in the figure. The reflector shown is assumed to have a reflective surface on the non-linearly varying cavity surface. An optical signal exiting the waveguide facet of the planar waveguide to such a reflector structure is re-directed from the points of incidence upon reflection from the reflector. The projected boundaries of an example optical signal envelope emerging from the end facet of the closely coupled planar waveguide onto the reflector layer are shown in the INSET of FIG. 2B. This figure shows the upper, lower, and lateral boundaries imposed by the geometric projection of the waveguide onto the reflector layer in the figure, although some divergence in the signal upon exiting the waveguide is anticipated. The upper and lower boundaries for the geometrically projected envelope of an incoming beam propagating from the end facet of the planar waveguide, and the incident signal within these boundaries, are focused into a common line of focus as indicated in FIG. 2B by the notation, "focal line". For the reflector shown in FIG. 2B having curvature in the "x-y"

plane, an incoming beam incident on the reflector is both narrowed or otherwise focused and changed in direction upon reflection. The narrowing of the reflected signal in the example shown in FIG. 2B occurs in the "x-y" plane and results from the curvature in the "x-y" plane of the reflector layer as shown, but the narrowing of the signal is limited to the "x-y" plane.

FIG. 2C shows an embodiment of a reflector structure 206 that is nonlinearly varying in the "x-y", "x-z", and "y-z" planes as shown with reference to the reference coordinate system provided in the figure. Reflector structure 206 on interposer 201 includes a reflector layer 207 formed on cavity surface 209. An optical signal 270*a* exiting a patterned planar waveguide 244, for example, to such a reflector structure 206 is re-directed upon reflection from the reflective surface layer 207. The projected boundaries of an example optical signal envelope emerging from the end facet 245 of a closely coupled planar waveguide 244 onto the reflective surface layer 207 are shown in the INSET of FIG. 2C. This figure shows the upper, lower, and lateral boundaries imposed by the geometric projection of the waveguide 244 onto the reflective surface layer 207 in the figure, although some divergence in the signal upon exiting the waveguide 244 is anticipated. The upper and lower boundaries for the geometrically projected envelope of an incident optical signal 270*a* propagating from an end facet 245 of planar waveguide 244, and the incident signal within these boundaries, are focused into a common point of focus as indicated in FIG. 2C by focal point 212. For the embodiment of the reflector structure 206 shown in FIG. 2C having curvature in the "x-y" plane, in the "y-z" plane, and in the "x-z" plane, an incident optical signal on the reflector is both narrowed or otherwise focused and changed in multiple directions upon reflection. The narrowing of the reflected signal in the embodiment shown in FIG. 2C results from the multidimensional curvature of the reflective surface of reflector surface layer 207 as shown, but the narrowing of the signal is not limited to the "x-y" plane as in the structure shown in FIG. 2B.

FIG. 2D further illustrates surface curvature in embodiments in comparison to the reflectors shown in FIGS. 2A and 2B. FIG. 2D(a) shows slices from the perspective drawing (as labeled) for slices taken from an "x-z" plane, a "y-z" plane, and an "x-y" plane through the linear reflector. Each of the orthogonal slices show straight linear slices of the linear reflector and these straight-line slices do not provide beam-narrowing of the reflected signals. The linear "x-z" slice from the perspective drawing in 2D(a) will produce a simple reflection for an incident beam and does not provide beam narrowing. Similarly, for a slice through the linear reflector in a "y-z" plane, the linear projection of the slice onto the reflector does not result in beam narrowing of the incident beam but rather a simple reflection along the linear intersection of the "y-z" plane with the linear reflector. And for a slice through the linear reflector in an x-y plane, the projection of the intersection between an x-y plane and the linear reflector of FIG. 2D(a) is a straight line having no beam narrowing effect on an incident optical signal reflecting from the linear reflector surface.

FIG. 2D(b) shows slices from a perspective drawing (as labeled) for slices taken from an "x-z" plane, a "y-z" plane, and an "x-y" plane through a reflector having simple concave curvature. The slices in the "x-z" and the "y-z" planes show straight linear slices and the slice from the "x-y" plane shows the simple curvature in one dimension. The linear "x-z" slice from the perspective drawing in 2D(b) will produce a simple reflection for an incident beam and does not provide beam narrowing. Similarly, for a slice through the reflector of FIG. 2D(b) in a "y-z" plane, the linear projection of the slice onto the reflector does not result in beam narrowing of the incident beam but rather a simple reflection along the linear intersection of the "y-z" plane with the reflector. And for a slice through the reflector having curvature in an x-y direction, the projection of the intersection between an x-y plane and the linear reflector of FIG. 2D(b) is a curved line having a beam narrowing effect on an incident optical signal reflecting from the curved reflector surface.

FIG. 2D(c) shows slices from a perspective drawing (as labeled) for slices taken from an "x-z" plane, a "y-z" plane, and an "x-y" plane through an embodiment of a reflector having curvature in three dimensions. That is, curvature in the slices is shown in the orthogonal slices from each of the "x-z", "y-z", and "x-y" planes. Projections through each of the example intersecting planes result in beam narrowing of reflected optical signals. Curvature in the projection of the embodiment of the reflector shown in FIG. 2D(c) will produce beam narrowing of an incident beam within the x-z plane. Similarly, for a slice through the reflector of FIG. 2D(c) in a "y-z" plane, the linear projection of the slice onto the reflector also results in beam narrowing of the incident beam in the "x-y" plane. And further, for a slice through the reflector having curvature in an "x-y" direction, the projection of the intersection between an "x-y" plane and the curved reflector of FIG. 2D(c) is a curved line having a beam narrowing effect on an incident optical signal reflecting from the curved reflector surface. Beam narrowing in each of the x-z slice, the "y-z" slice, and the "x-y" slices through an embodiment of the reflector structure having curvature in three dimensions results in beam narrowing in each of the three directions planes from which the slices are taken.

FIG. 2E further shows the projections of the orthogonal slices of FIG. 2D onto the reflector structures of FIG. 2D. FIG. 2E(a) shows the three orthogonal projections on the linear reflector structure with the slice from the "x-y" plane and the overlapping slices from the "x-z" and "y-z" planes labeled accordingly. The linear reflector does not have beam narrowing effects on optical signals incident on the linear reflector structure in the "x-y" plane, the "x-z" plane, nor the "y-z" plane.

FIG. 2E(b) shows the three orthogonal projections on the reflector having simple curvature with the curvature from the "x-y" plane and the overlapping linear projections from the "x-z" and the "y-z" planes labeled accordingly. The reflector having simple curvature in the x-y plane does not have beam narrowing effects on optical signals incident on the reflector structure in the "x-z" plane or the "y-z" plane but beam narrowing is observed in the "x-y" plane.

FIG. 2E(c) shows an embodiment of a reflector having three-dimensional curvature and the slices from the "x-y" plane, the "y-z" plane, and the "x-z" plane each showing curvature and labeled accordingly. The embodiment of the reflector structure having curvature in the x-y plane, in the "y-z" plane, and in the "x-z" plane has beam narrowing effects on optical signals incident on the reflector structure in the "x-z" plane, the "y-z" plane, and the "x-y" plane.

FIG. 2F(a) shows the reflector of FIG. 2E(c) with imaginary orthogonal planes in place to further illustrate the curvature in the three orthogonal dimensions with the planes labeled accordingly for the embodiment shown.

FIG. 2F(b) shows another view of an embodiment of a reflector having three-dimensional curvature and the effect of the curvature on the narrowing of an incoming beam 270*a* upon reflection from the reflector structure 206.

The combination of the curvatures in the "x-z", "x-y", and "y-z" planes, as illustrated in FIG. 2F(a), leads to the multidimensional narrowing or focusing of the outgoing beam 270*b* upon reflection from reflector 206 in embodiments as illustrated in FIG. 2F(b). Methods for the formation of the curvatures in the "x-z" and in the "x-y" and "y-z" planes as shown using gray scale masks are described herein.

Figure 3A:
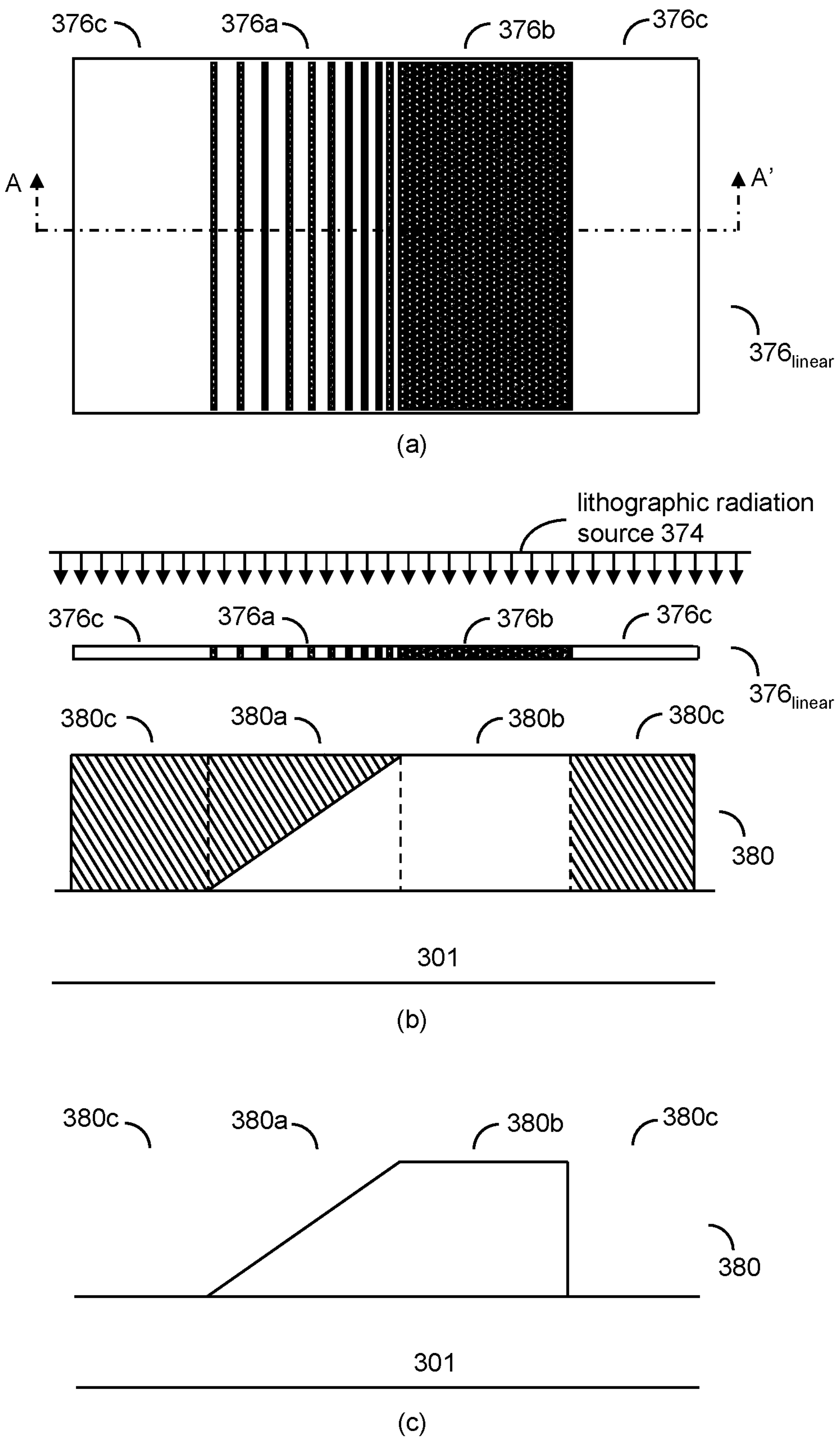
FIG. 3A (a) shows a top down view of a lithographic reticle having a gray scale portion for which an the gray scale portion produces a linearly varying exposure with position between a blocked portion and an open portion of the reticle, (b) shows a schematic cross-sectional view of lithographic apparatus that includes a radiation source and a reticle having a gray scale portion, and also shows a PR layer on a substrate with an example dose applied to the PR for producing a linear profile in the PR layer, and (c) shows a cross section of the PR layer from (a) after exposure to a developer solution.

FIG. 3A(a) shows an illustration of an example of a gray scale reticle that provides a linearly varying portion of PR layer 380 on substrate 301. A lithographic radiation source such as UV radiation, is used in photolithographic processes to expose photosensitive photoresist layers in semiconductor processing to alter the properties of the photoresist layers. In a positive type resist layer, the exposure of the photoresist changes the properties such that the radiation-exposed portions of the photoresist layer can be removed in a suitable developer solution, thereby leaving the unexposed portions to act as a patterned mask layer in subsequent patterning processes, such as, for example, wet chemical or dry plasma etch processes. Conversely, in negative type resist processing, the radiation-exposed portions are resistant to the chemical developer solutions and the non-radiation-exposed portions are removed in the developer solution.

In gray scale lithography, the exposure of the photoresist is varied across all or a portion of a photosensitive photoresist layer by partially blocking or otherwise limiting the transmission of radiation through the reticle. Variations in the dose of radiation reaching the underlying photoresist enables the formation of structures in the resist layer that vary in thickness with position in addition to the regions of the reticle that either block the radiation or allow the radiation to pass unimpeded. An example of a gray scale reticle for which the allowed radiation in the gray scale portion of the reticle delivers a linearly varying dose to a positive photoresist layer is shown in the top-down schematic drawing in FIG. 3A(a) and the cross-sectional schematic drawing of FIG. 3A(b). Lithographic source 374 delivers radiation through the gray scale reticle 376 linear to the photoresist layer 380. Portion 380*a* is a portion of the photoresist layer 380 that is exposed through the gray scale portion 376*a* of the reticle 3761*h* . . . The hatched portions of the photoresist layer 380 show the effect of an example dosage delivered to layer 380. In the gray scale exposed portion 380*a* of photoresist layer 380, the radiation dosage delivered through the gray scale reticle portion 376*a* is such that the exposed photoresist will provide a linearly varying profile in the resist layer upon development of the resist in a suitable developer solution for positive type resists. For the portions 376*b* of reticle $\mathbf{376}_{linear}$, the radiation is blocked and this and other blocked portions will have little or no response to the developer solution. In portions 376*c*, the radiation is allowed to pass unimpeded and these and other areas of the photoresist layer that are exposed to a full dosage of lithographic radiation will be fully removed in response to the developer solution. The resulting photoresist profile for the example radiation exposure and the example gray scale reticle portion 376*a* of FIG. 3A(a) having linearly increasing exposure between the blocked portion 376*b* and open portion 376*c* after developing in a suitable photoresist developer solution is shown in FIG. 3A(c). The resulting photoresist mask shows the linearly varying portion 380*a*, the portion 380*b* for which the radiation was blocked, and the portions 380*c* for which the radiation was allowed to pass unimpeded.

Figure 3B:
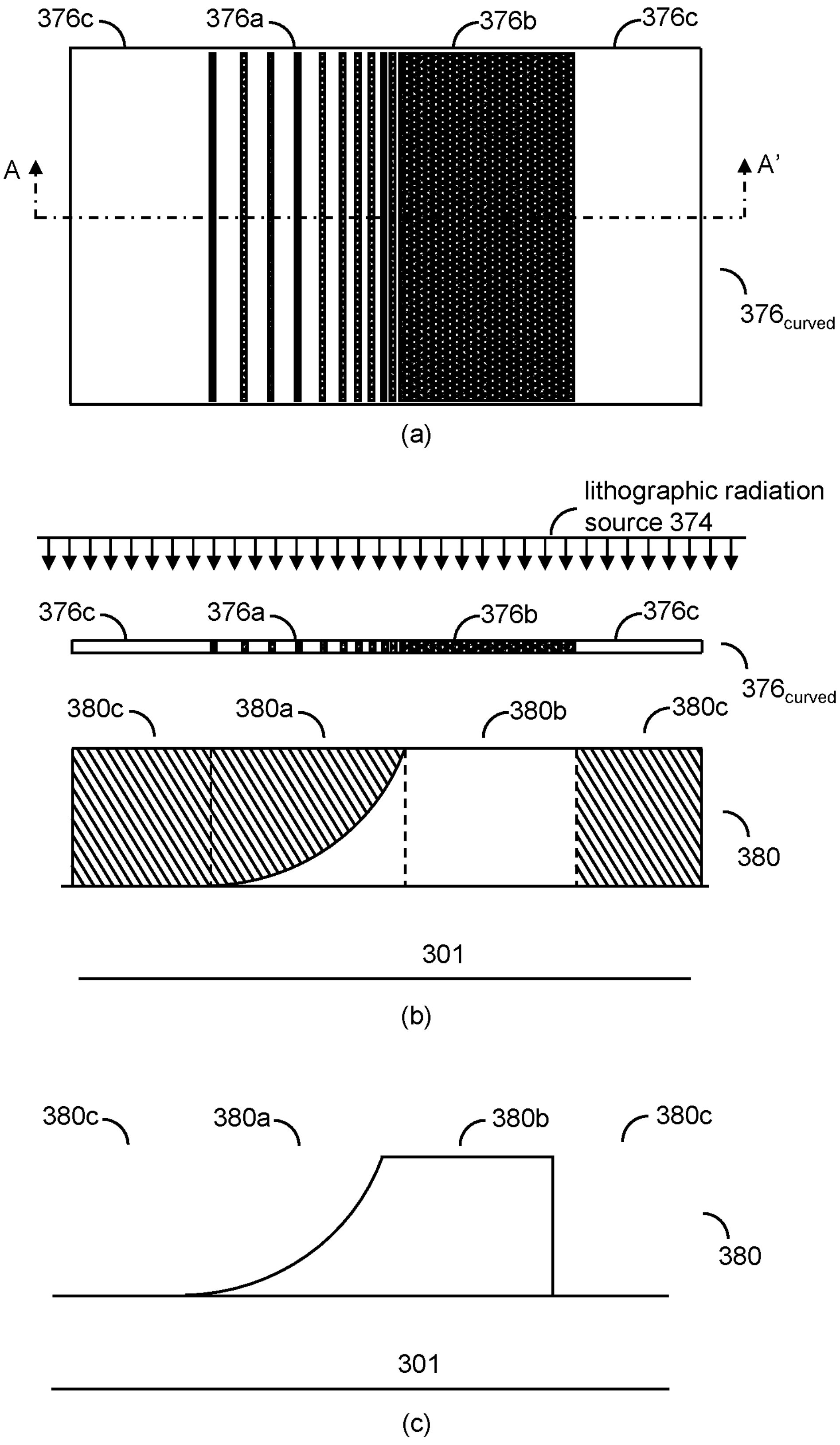
FIG. 3B (a) shows a top down view of a lithographic reticle having a gray scale portion for which an the gray scale portion produces an exposure that varies curvilinearly with position between a blocked portion and an open portion of the reticle, (b) shows a schematic cross-sectional view of lithographic apparatus that includes a radiation source and a reticle having a gray scale portion, and also shows a PR layer on a substrate with an example dose applied to the PR for producing a profile in the PR layer having two-dimensional curvature, and (c) shows a cross section of the PR layer with example two-dimensional curvature from (a) after exposure to a developer solution

FIGS. 3B(a) and 3B(b) show schematic drawings of a reticle $\mathbf{376}_{curved}$ similar to those of FIG. 3A(a) and FIG. 3A(b) with the exception that the gray scale portion 376*a* of the reticle is such that the dosage delivered to the photoresist upon exposure to the lithographic radiation source provides a curved profile in the resist layer upon exposure to a suitable developer solution. The resulting profile from exposure to reticle $\mathbf{376}_{curved}$ for an example exposure is shown in FIG. 3B(c).

For the example gray scale mask profiles shown in FIGS. 3A and 3B, profiles similar to the photoresist can be produced in an underlying substrate with suitable substrate etch processes. The photoresist mask erodes at a controllable rate in the suitable substrate etch processes, resulting in a transfer of the profile from the photoresist to the underlying substrate. Differences between the etch rates of the photoresist and the substrate material can amplify or dampen the transfer of the profile as can differences between the vertical and lateral etch rates of the photoresist layer. In etch processes, for example, in which the substrate etches at a significantly higher rate than the photoresist, the height of the profile in the substrate can be significantly greater than the height of the starting profile in the photoresist. In etch processes, for example in which the substrate etches at a significantly lower rate than the photoresist layer, the height of the profile in the substrate can be significantly less than the height of the starting profile in the photoresist. In etch processes for which the lateral etch rate is different than the vertical etch rate, distortions in the pattern transfer can occur between the starting profile of the photoresist and the substrate.

Figure 4A:
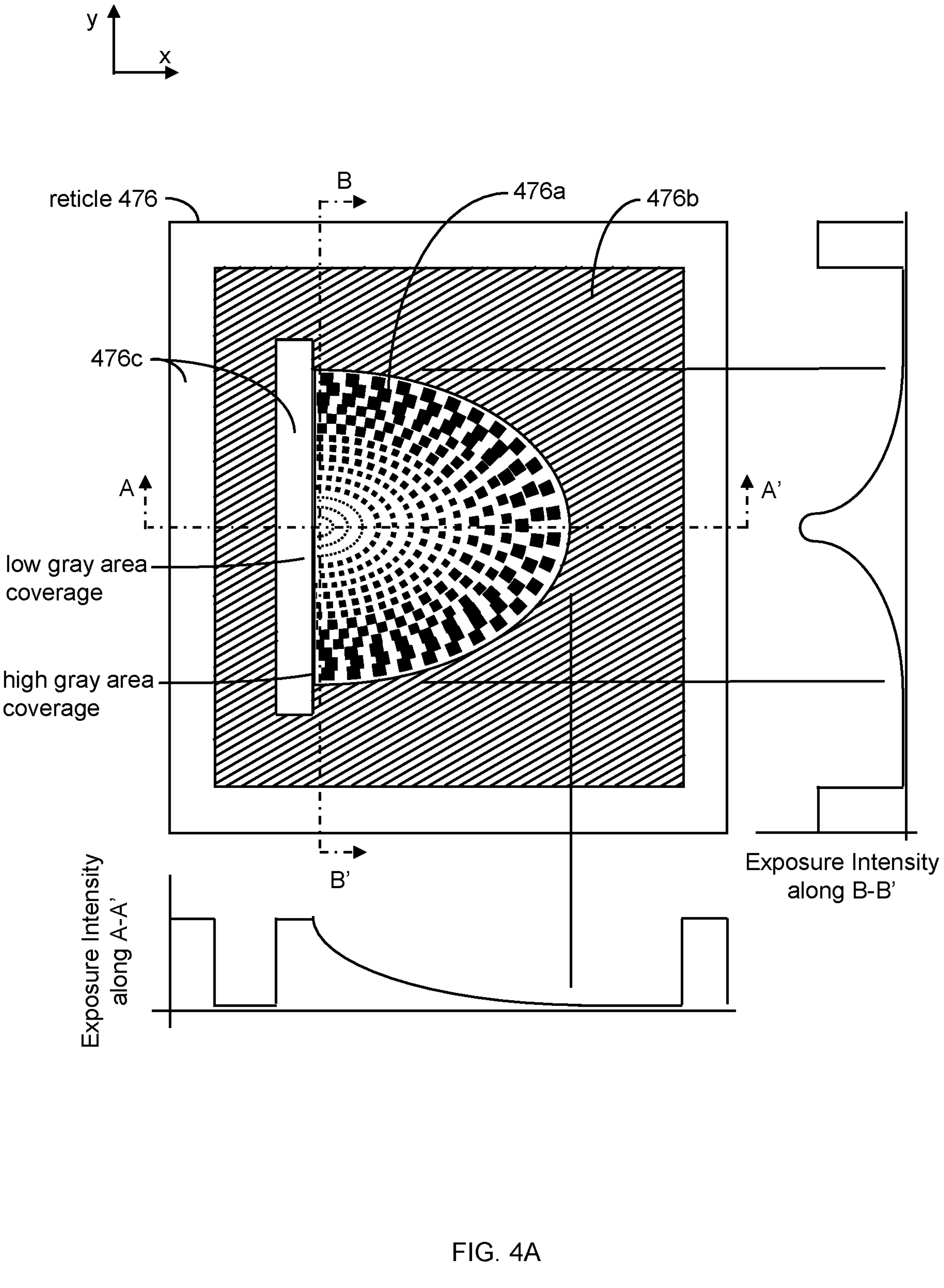
FIG. 4A shows (a) a schematic cross section drawing of a gray scale reticle with lithographic radiation apparatus, and (b) a schematic top-down drawing of a gray scale reticle with plots of example radiation profiles on the photoresist upon exposure, as indicated.

FIG. 4A shows an embodiment of a lithographic reticle 476 that includes gray scale reticle portion 476*a*, blocked portion 476*b*, and open portions 476*c* that can be used to produce embodiments of reflectors having multidimensional curvature. (Note: The pattern shown in the gray scale portion 476*a* of reticle 476 is for illustrative purposes only and not intended to show an actual gray scale pattern.) The gray scale portion 476*a* of the reticle 476 enables an exposure of an underlying photoresist layer that varies in two dimensions.

In an example gray scale mask, the amount of radiation that is transferred through the reticle may be dependent, for example, on the amount of reflective metal coverage. The exposure dose may be varied, for example, by the ratio of the area of the reticle covered by a reflective metal layer, such as chromium, to the open area (no chromium or other blocking layer) of the gray scale portion of the reticle. This ratio may be varied, for example, by varying one or more of the shape, size, and density of metal layers formed on the reticle. In an example gray scale portion of a reticle, a metal layer may be patterned in a series of round metal pads of chromium formed on a gray scale portion 476*a* of reticle 476. The round pads may vary in size from a small circular shape having a low density of metallization coverage in areas requiring high radiation exposure to a high density of metallization coverage in areas requiring low radiation exposure. For the example gray scale reticle portion 476*a* of reticle 476, a region of low-density reticle coverage having a low ratio of covered area to open area is shown along the axis A-A' and labeled "low gray area coverage". In the example, this portion of gray scale portion 476*a* labeled "low gray area coverage" enables a high intensity of radiation to penetrate the reticle. Conversely, for the example gray scale reticle portion 476*a* of reticle 476, a region of high-density reticle coverage having a high ratio of covered area to open area is shown along the axis B-B' in proximity to the blocked portion 476*a* and labeled "high gray area coverage". In the example, this portion of gray scale portion

476*a* labeled "high gray area coverage" enables a low intensity of radiation to penetrate the reticle. The resulting exposure through the resulting gray scale mask portion provides the example intensity profiles shown in FIG. 4A enabling a positionally varying exposure of an underlying positive photoresist layer. In the formation of gray scale reticle portions 476*a* of gray scale reticle 476, the ratio of covered area to open area may be varied by varying the shape, size, and density of metal coverage on the reticle. The coverage may be provided using one or more metal pads in the shape of circles, triangles, quadrilaterals, pentagons, hexagons, octagons, and other shapes having more than eight sides and combinations of these and other shapes. The sizes of these shapes can vary over a range of tenths of a micron to tens of microns. The density of coverage may vary between 0% open area in portions of the gray scale reticle requiring low transmission of radiation to the underlying photoresist to 100% open area in portions of the gray scale reticle requiring high transmission of radiation to the underlying photoresist. Multiple shapes, sizes, and densities of coverage may be used.

Other means of varying the exposure may also be used to produce patterned structures in the underlying photoresist such as semitransparent structures in which the intensity profiles are varied by varying the transmission of radiation through a reticle.

The effect of an example gray scale portion 476*a* for which the exposure of an underlying photoresist varies in two dimensions is illustrated in the example radiation intensity profiles shown in FIG. 4A. Examples of lithographic radiation intensity profiles along section lines A-A' and B-B' produced by a gray scale reticle portion 476*a* are shown at the right and at the bottom of the reticle 476, respectively. Along Section A-A' from left to right in FIG. 4A, radiation exposure for an example lithographic exposure of a positive photoresist layer reaches a maximum at the open area 476*c*, is a minimum at the blocked area 476*b*, is varied from the maximum at 476*b* to a minimum at the apex of the gray scale area 476*a*, again is blocked by the blocked area 476*b*, and again reaches a maximum exposure level at the open area 476*c*. Along Section B-B' from bottom to top in FIG. 4A, the radiation dosage for the example lithographic exposure of the positive photoresist layer reaches a maximum value at the open area 476*c*, is a minimum at the blocked area 476*b*, is varied from a minimum at the edge of the gray scale area 476*a* through a maximum at the center of the gray scale mask area (at the intersection between Section B-B' with Section A-A') and further varying from the maximum at the center of the gray scale mask area to a minimum at the top edge of the gray mask area, maintaining the minimum through the blocked area 476*b*, and again reaching a maximum for the open area 476*c*. The variations in radiation intensity profile along Section A-A' and Section B-B' in FIG. 4A provide examples of lithographic radiation profiles for producing photoresist layers from a gray scale reticle portion 476*a* that can be further exposed to a suitable developer solution to provide a profile in the photoresist layer that can further be exposed to an etch or other patterning process to produce a surface having multidimensional curvature for use as a reflector base in embodiments. Other radiation profiles may also be used that provide radiation exposures to the underlying photoresist that enable the formation of the multidimensional curvature for use as a reflector base in other embodiments.

Figure 4B:
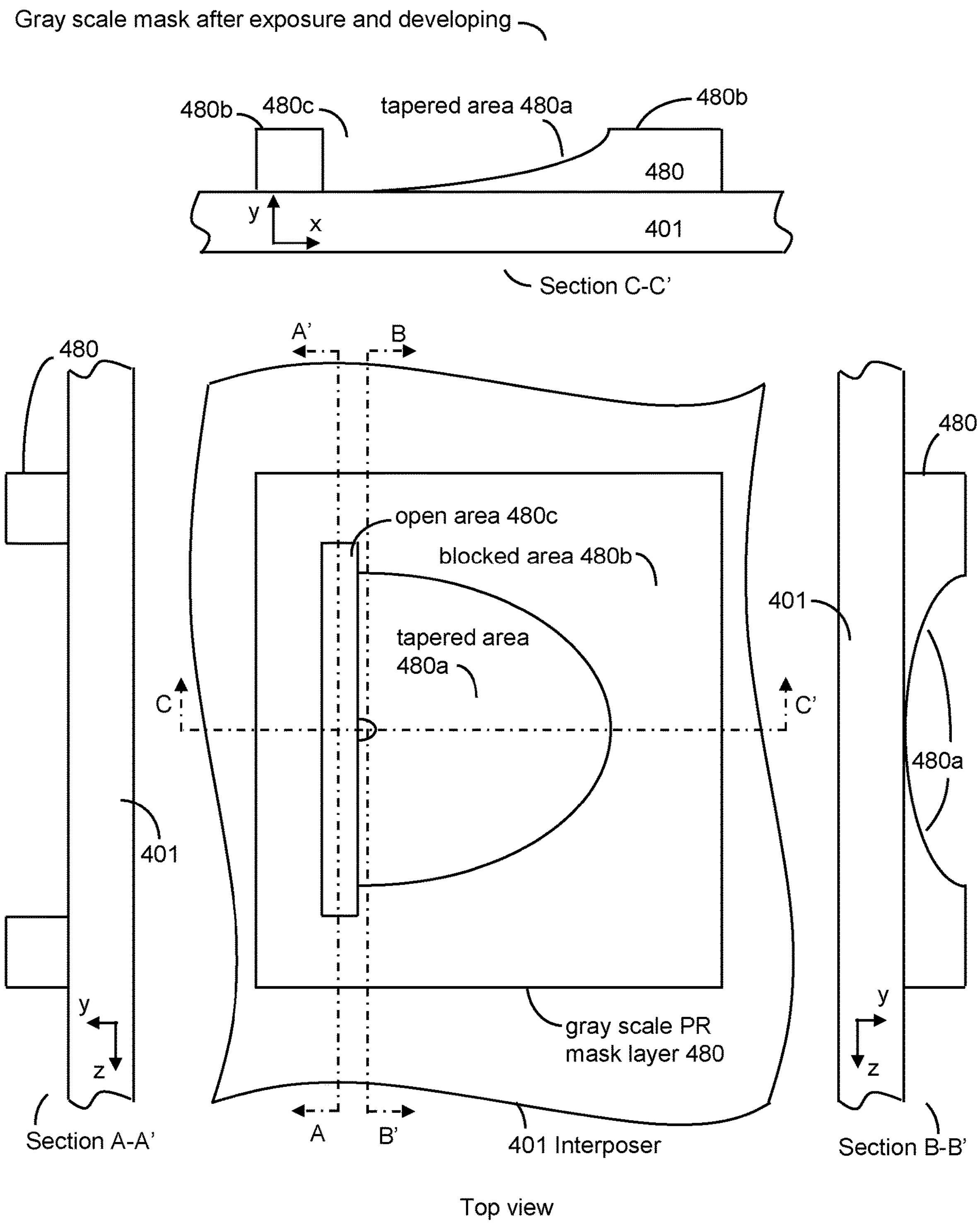
FIG. 4B shows schematic top down and cross section views of an embodiment of a photoresist layer with three-dimensional curvature on an interposer after exposure to a lithographic radiation source through a gray scale reticle and a subsequent developer step to remove the exposed areas of the gray mask layer.

FIG. 4B shows a photoresist layer 480 on substrate 401 after exposure to lithographic radiation through a gray scale reticle such as reticle 476. Portions 480*a*, 480*b*, and 480*c* correspond to lithographic radiation intensity exposure levels described in FIG. 4A for portions 476*a*, 476*b*, and 476*c*, respectively, for gray scale reticle 476. The exposure of the photoresist layer 480 to the lithographic radiation through gray scale portion 476*a* of the gray scale reticle 476 provides a tapered profile with example curvature as shown in Section B-B' and Section C-C' of FIG. 4B. Section A-A' shows a taper-free section. The tapering of the resist profile enables the providing of a multidimensional profile in reflector cavities formed in substrates underlying the gray scale mask layer after suitable etching processes. During the etching of a dielectric planar waveguide layer on an interposer 401, for example, the tapered gray scale photoresist mask layer will recede laterally, thereby producing a tapered profile in the dielectric layer of the interposer to form a base for a reflector having a multidimensionally curved surface. Areas 476*b* of the gray scale reticle 476 are blocked during lithographic radiation exposure and the underlying photoresist is not susceptible to removal in developer solution in these areas (for a positive photoresist). The exposure of the photoresist layer 480 to the lithographic radiation through areas 476*c* of the gray scale reticle 476 in the example shown, results in full exposure of the photoresist layer 480, thus rendering the photoresist to being fully removed in developer solution from these areas during photoresist development.

The combination of the curvatures in the "x-z", "x-y", and "y-z" planes leads to the multidimensional narrowing or focusing of the outgoing beam 270*b* upon reflection from reflector 206 in embodiments as described herein. Use of a gray scale mask is illustrated, for example in FIGS. 4A and 4B, and shows the effect of the gray scale mask on the formation of curvature in each of the orthogonal planes described in FIG. 2F(a). The curvature in the "x-z" plane is determined, as described herein, by the top-down curvature provided in the gray scale mask pattern. Curvature in the "x-y" and "y-z" planes is determined, as described herein, by the profile of the gray scale mask in the "x-y" and "y-z" planes, respectively, and by the etch processes used in transferring the gray scale profile into the underlying substrate. Reference axes are provided in the Section drawings of FIG. 4B.

Figure 5:
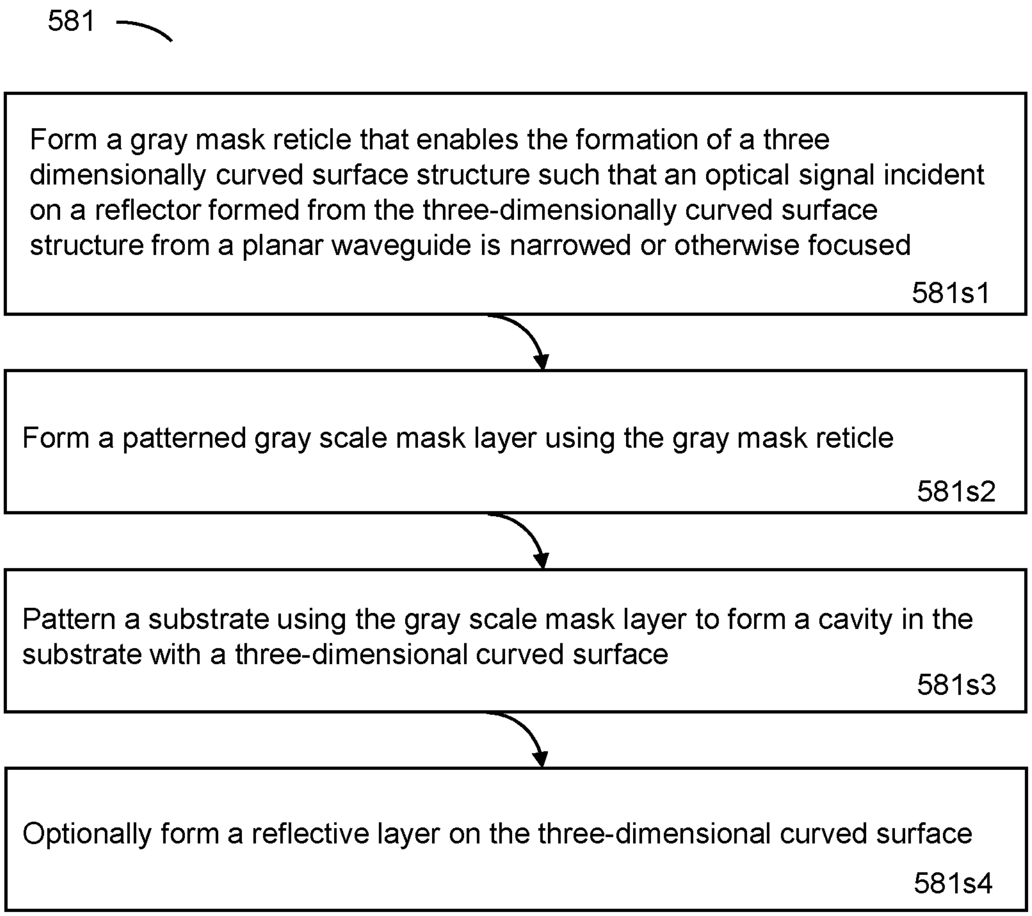
FIG. 5 shows a flowchart for a method of forming an embodiment of a reflector having a surface with three-dimensional curvature using a gray scale reticle for lithographic patterning of a photoresist mask layer.

FIG. 5 shows a flowchart for a method of forming embodiments of a reflector having a surface with three-dimensional curvature using a gray scale reticle such as the gray scale reticle 476 shown in FIG. 4A during lithographic patterning of a photoresist mask layer such as the photoresist mask layer 480 shown in FIG. 4B.

Step 581*s*1 of method 581 is a forming step in which a gray mask reticle is formed that enables the formation of a three-dimensionally curved surface structure such that an optical signal incident on a reflector formed from the three-dimensional curved surface structure from a planar waveguide is narrowed or otherwise focused in two or more dimensions.

Step 581*s*2 of method 581 is a forming step in which a patterned gray scale mask layer is formed using the gray scale mask reticle.

Step 581*s*3 of method 581 is a patterning step in which a substrate is patterned using the gray scale mask layer to form a cavity with a three-dimensional curved surface.

Step 581*s*4 of method 581 is a forming step in which a reflective layer is optionally formed on the three-dimensional curved surface. In some embodiments, a substrate may be sufficiently reflective such that the formation of a reflective layer may not be required. Although additional processing is required to produce the reflective layer, significant improvements in the reflectivity of embodiments of the reflector can be achieved with the addition of an optional reflective layer.

Figure 6:
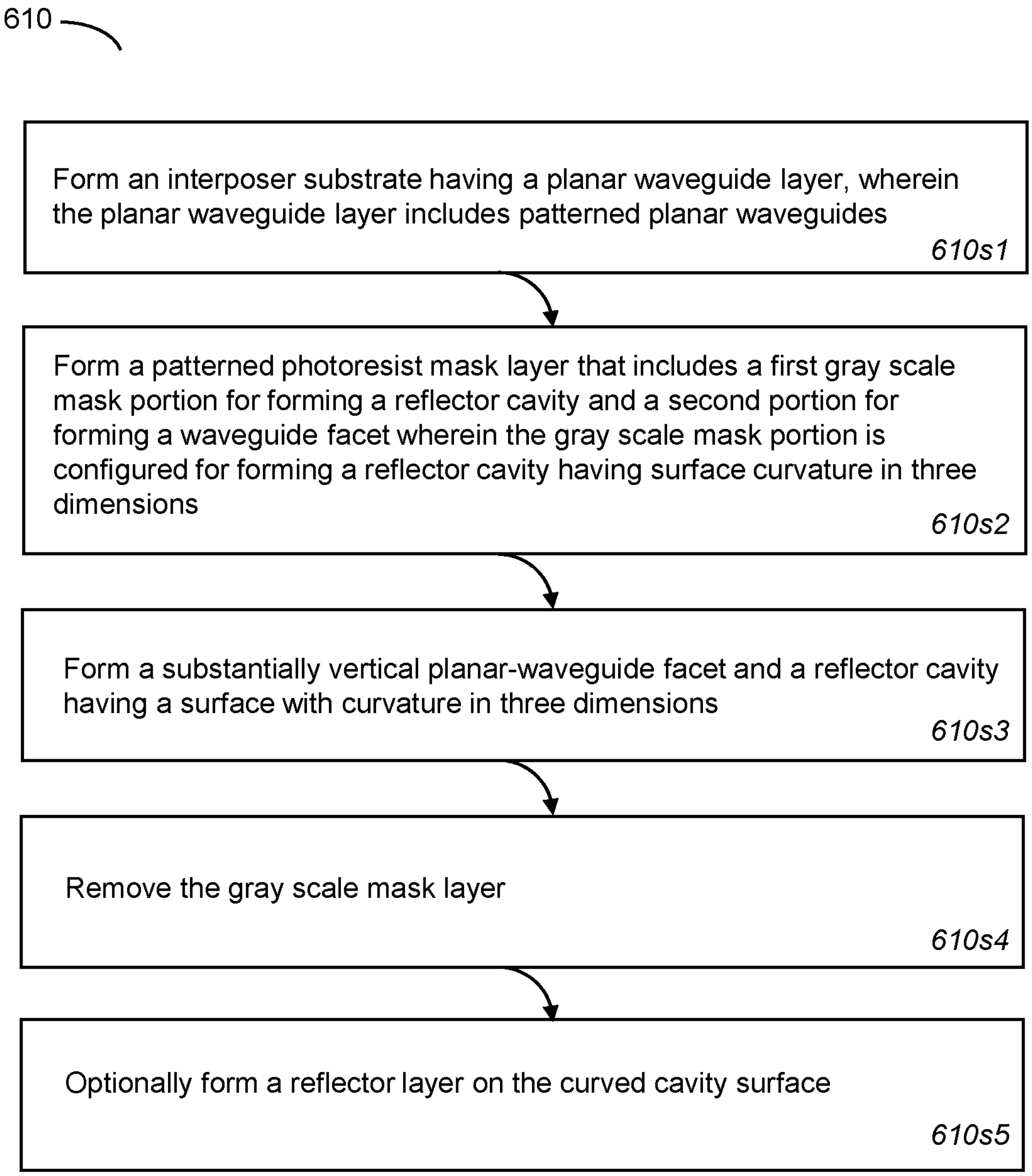
FIG. 6 shows a flowchart for a method of forming an embodiment of an interposer having a reflector with three-dimensional surface curvature.
Figure 7A:
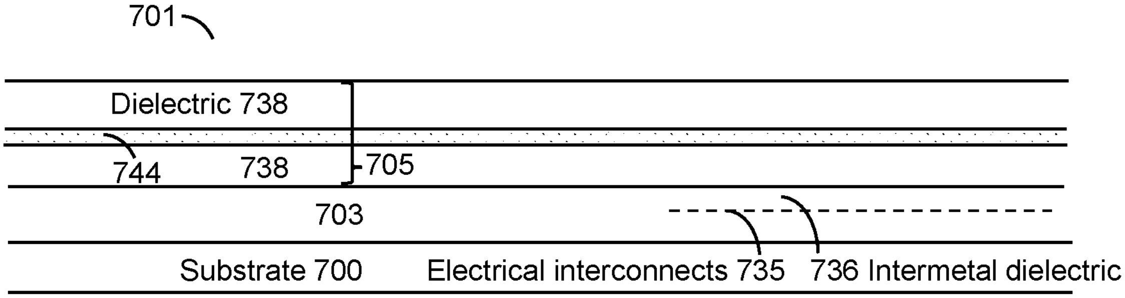
FIG. 7A shows an interposer having patterned planar waveguides and an optional electrical interconnect layer.
Figure 7E:
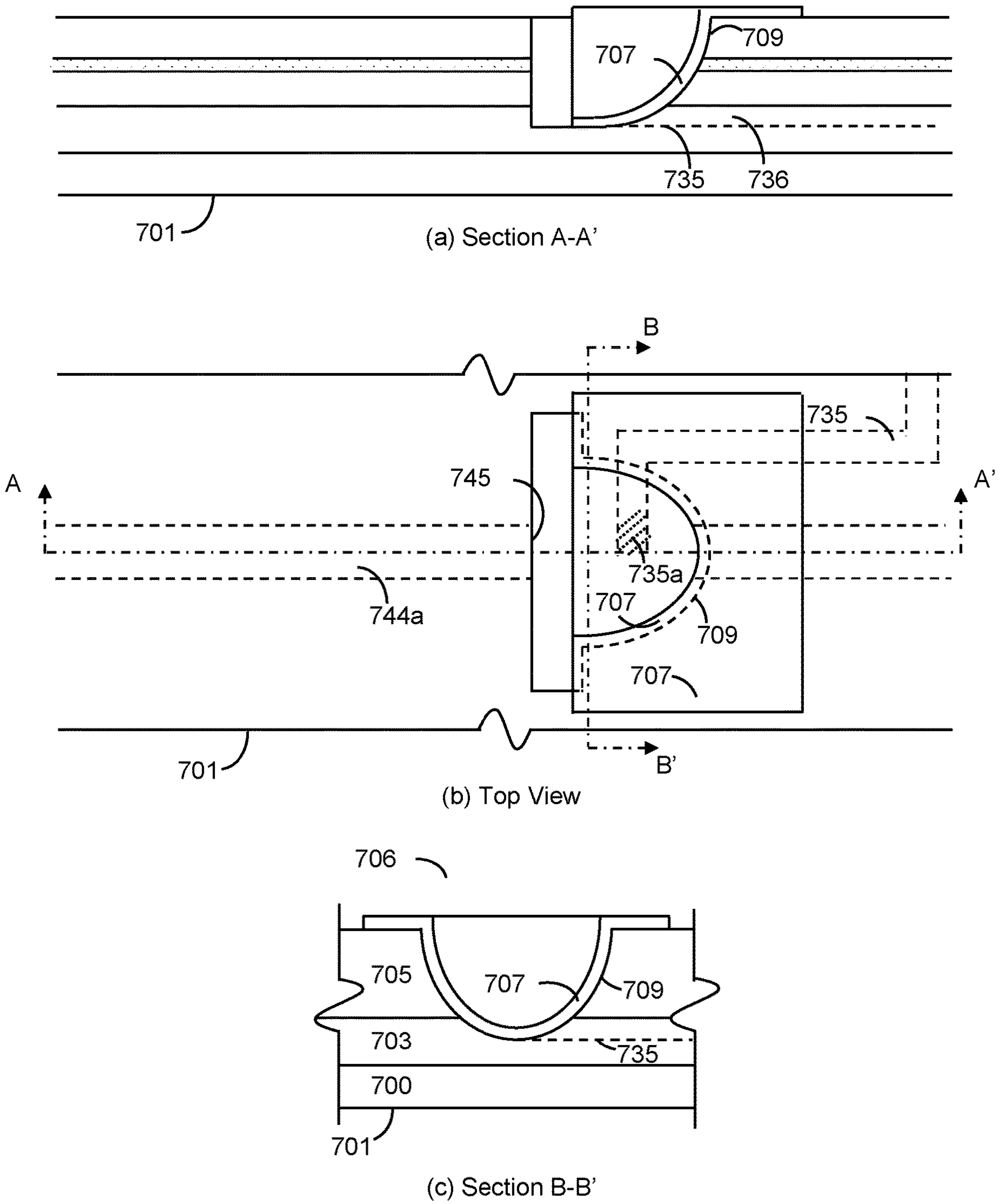
FIG. 7E shows an interposer as in FIG. 7D after formation of a reflector layer on a reflector cavity: (a) Section A-A', (b) top view, and (c) Section B-B'.
Figure 8:
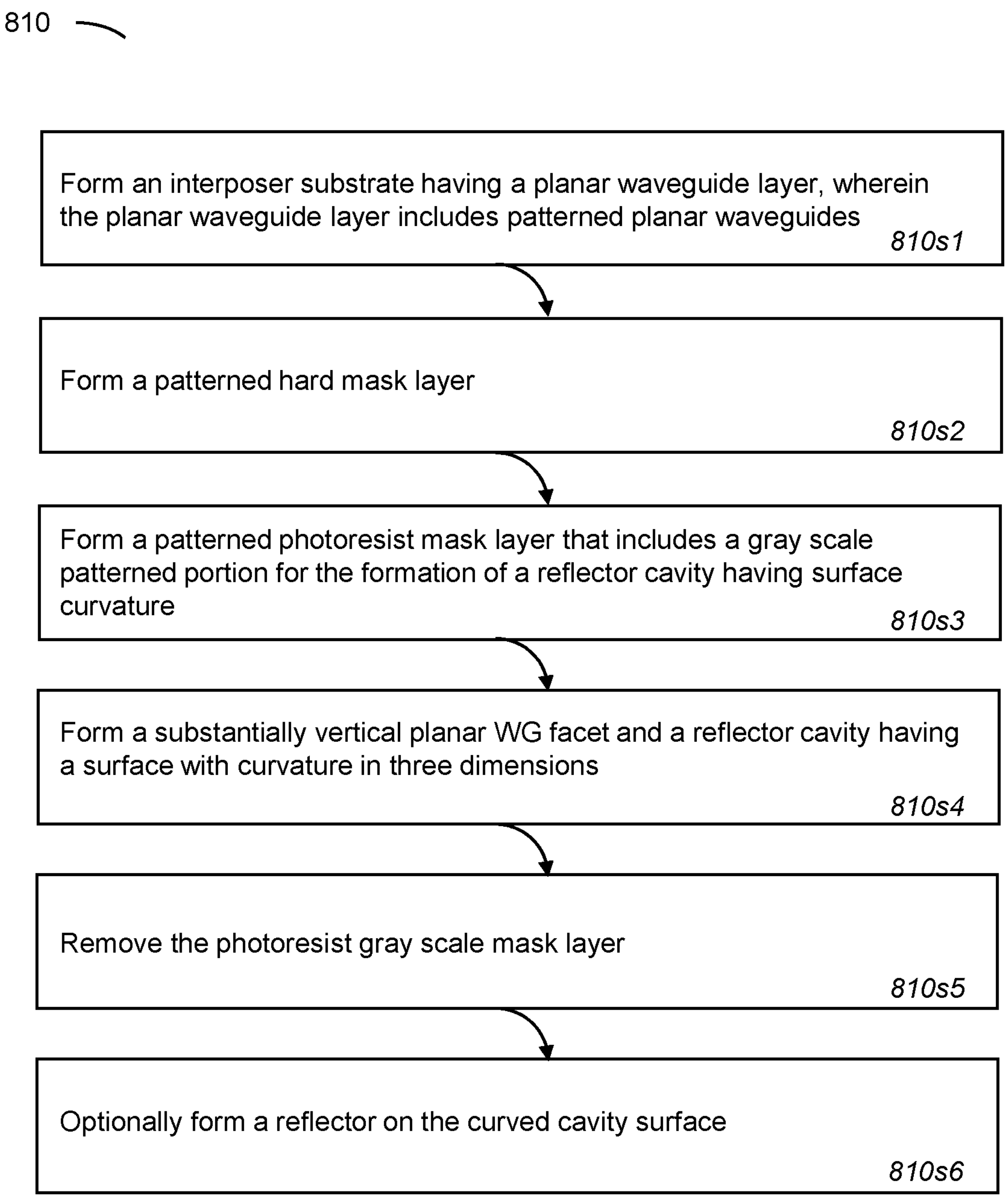
FIG. 8 shows a flowchart for a method of forming another embodiment of an interposer having a reflector with three-dimensional surface curvature.
Figure 9A:
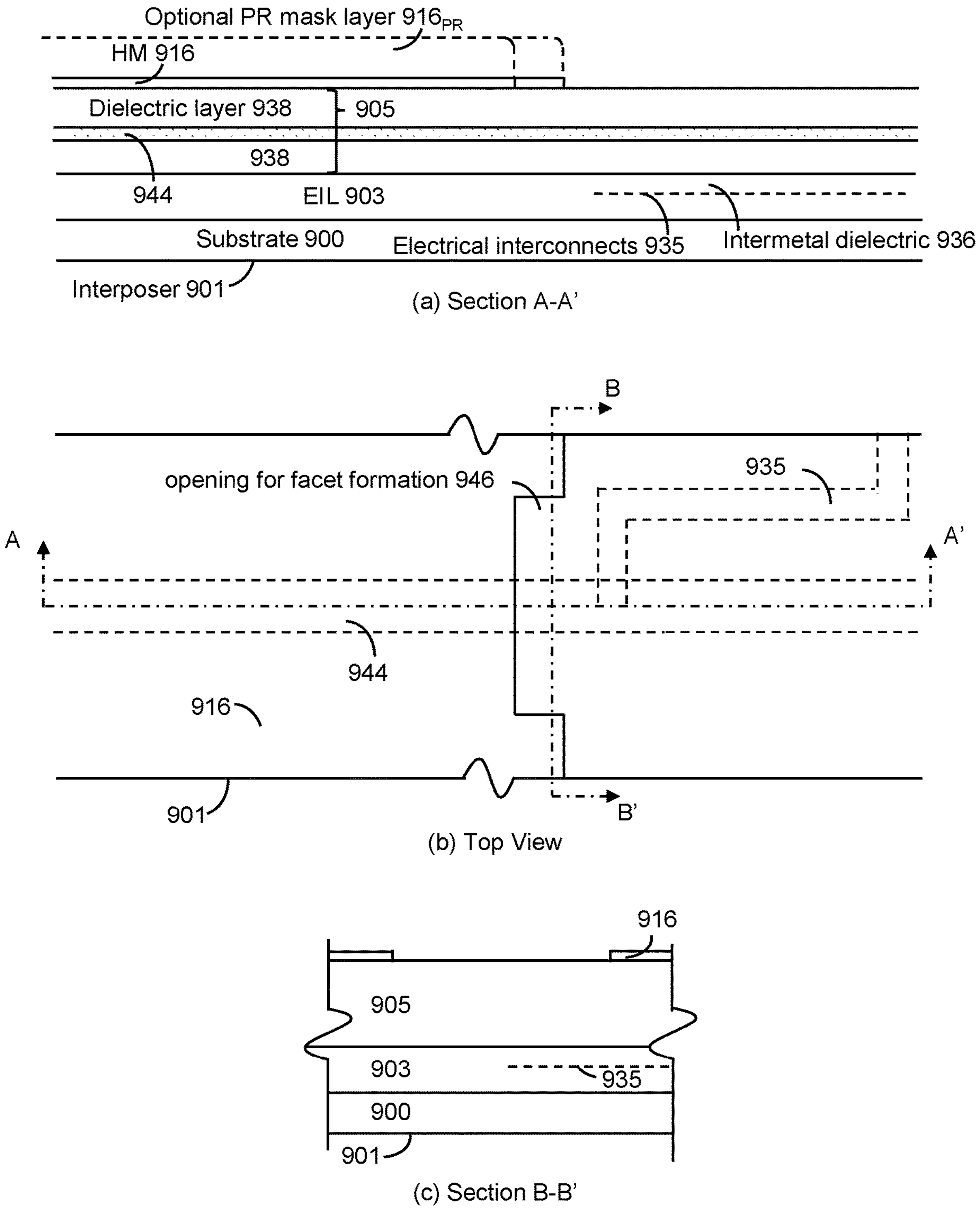
FIG. 9A shows an interposer as in FIG. 7A with the addition of a patterned hard mask layer.
Figure 9B:
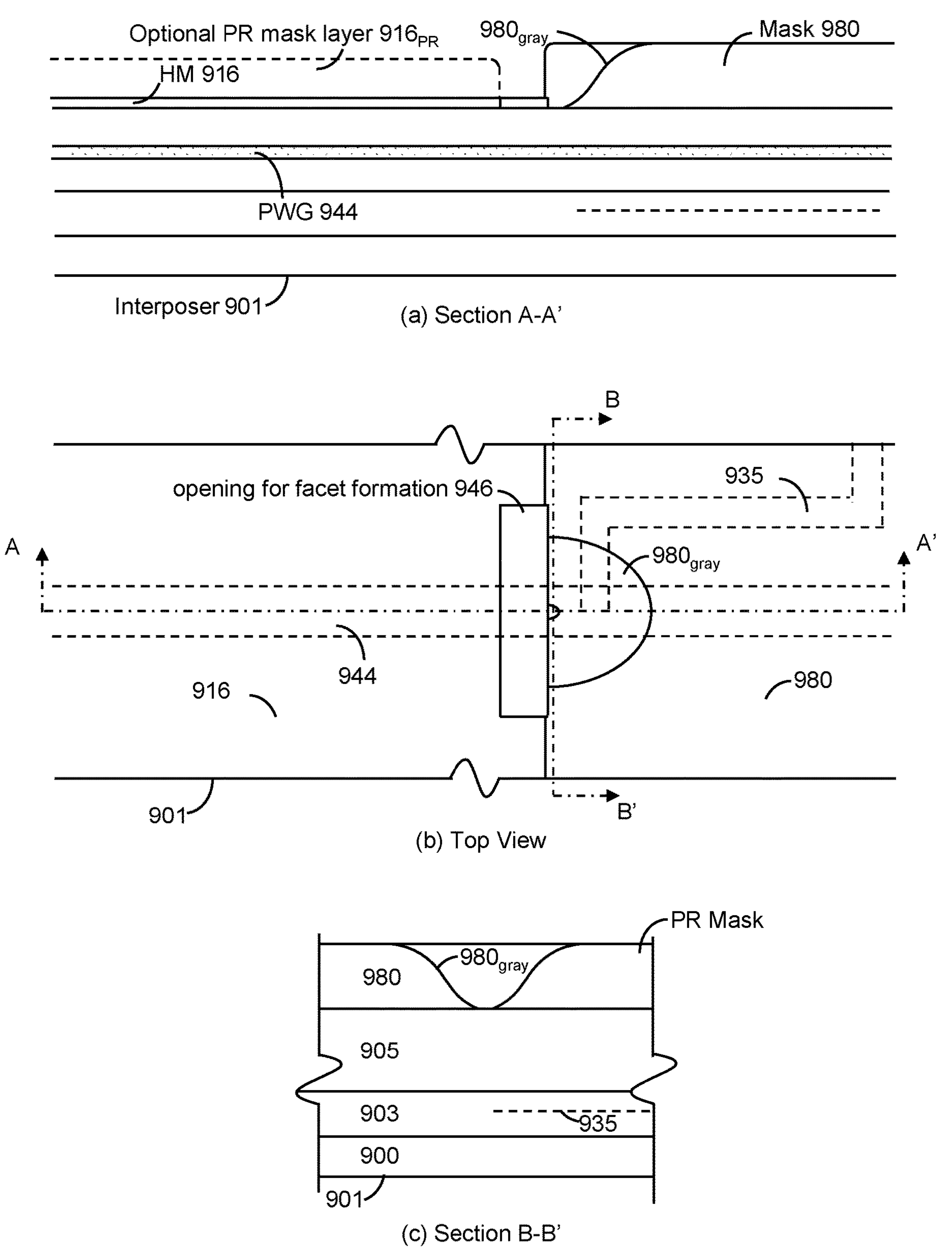
FIG. 9B shows an interposer as in FIG. 9A with the addition of a patterned gray scale mask layer: (a) Section A-A', (b) top view, and (c) Section B-B'.
Figure 9C:
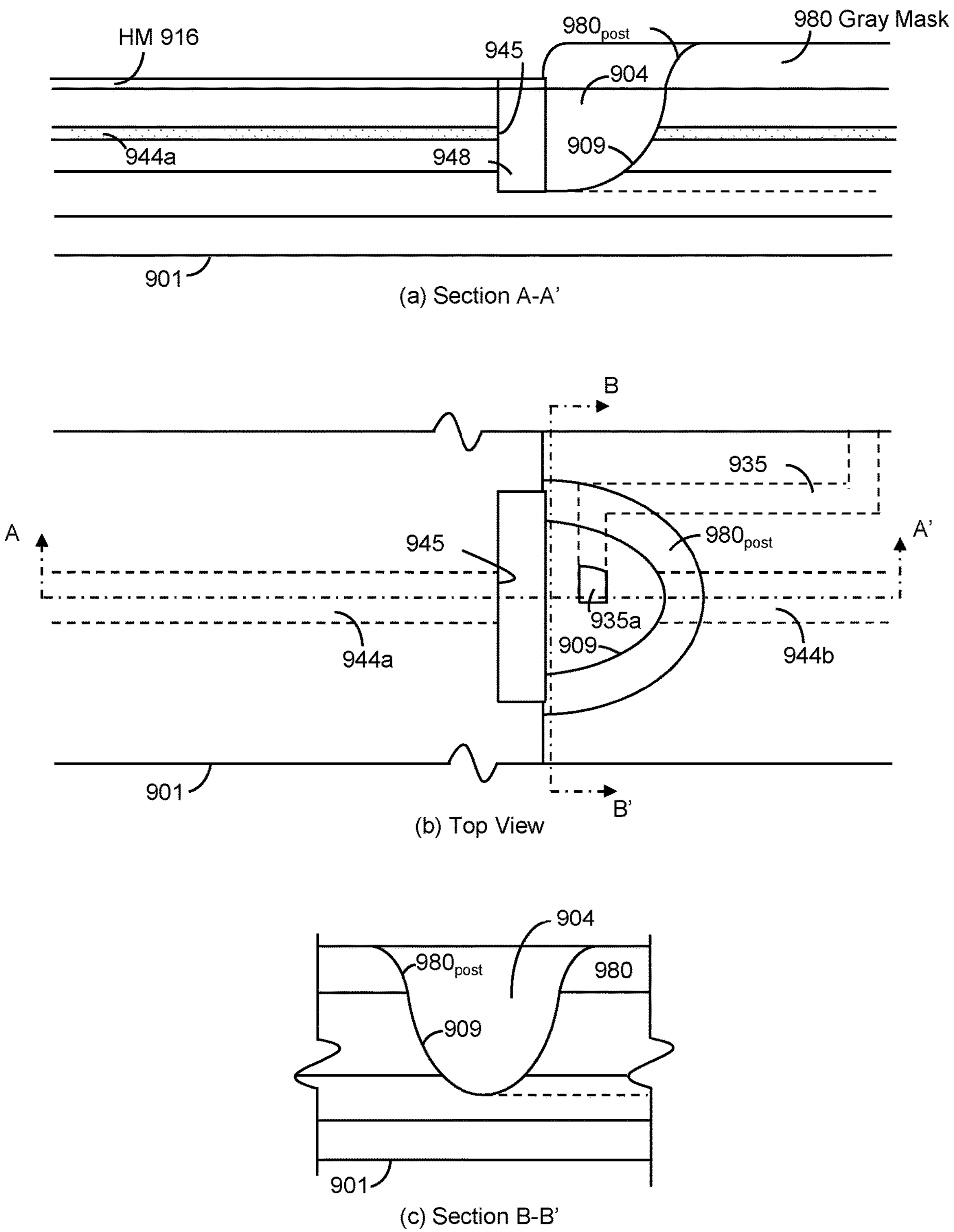
FIG. 9C shows an interposer as in FIG. 9B after the patterning of the planar waveguide layer: (a) Section A-A', (b) top view, and (c) Section B-B'.
Figure 9E:
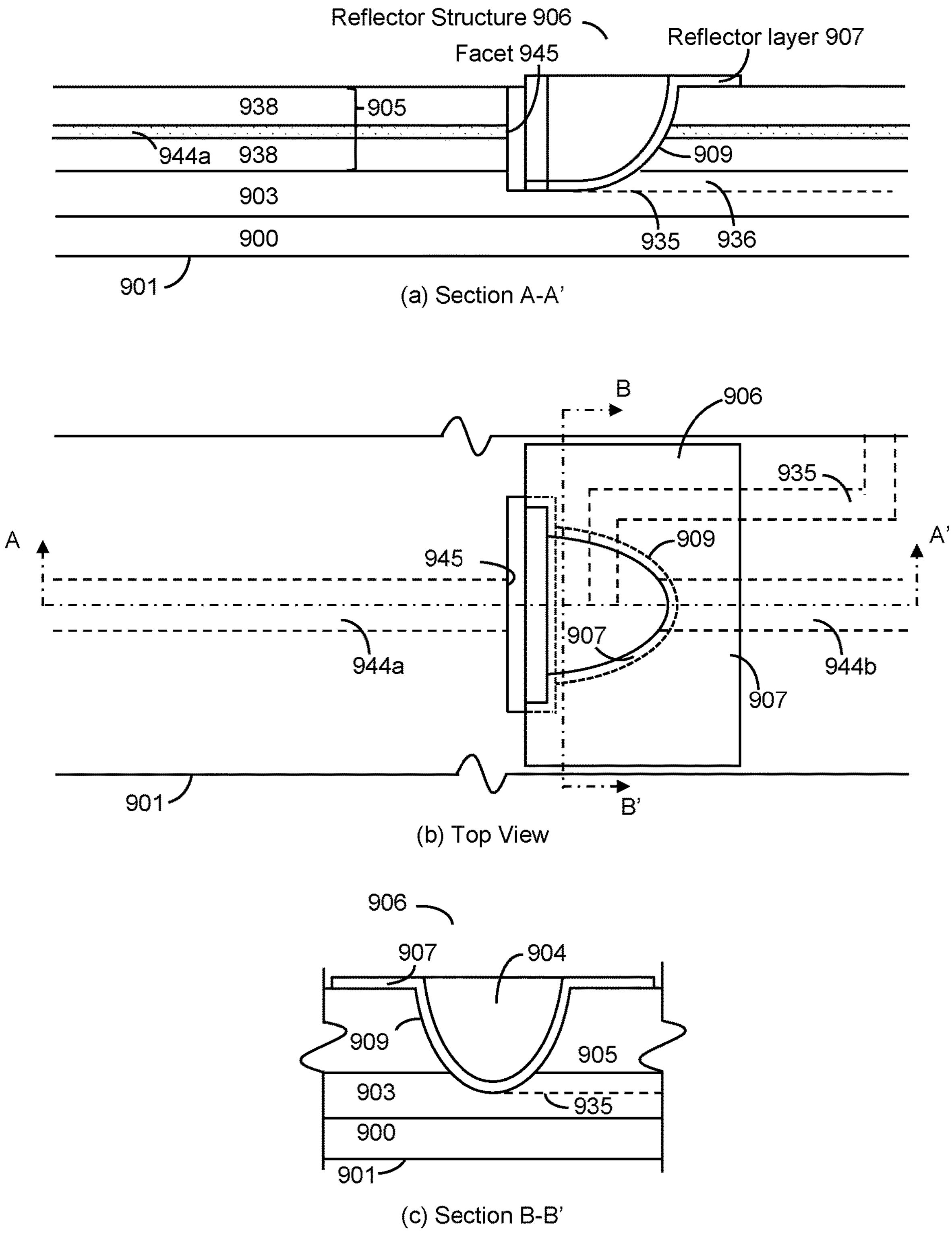
FIG. 9E shows an interposer as in FIG. 9D after formation of a reflector layer on a reflector cavity: (a) Section A-A', (b) top view, and (c) Section B-B'.
Figure 10:
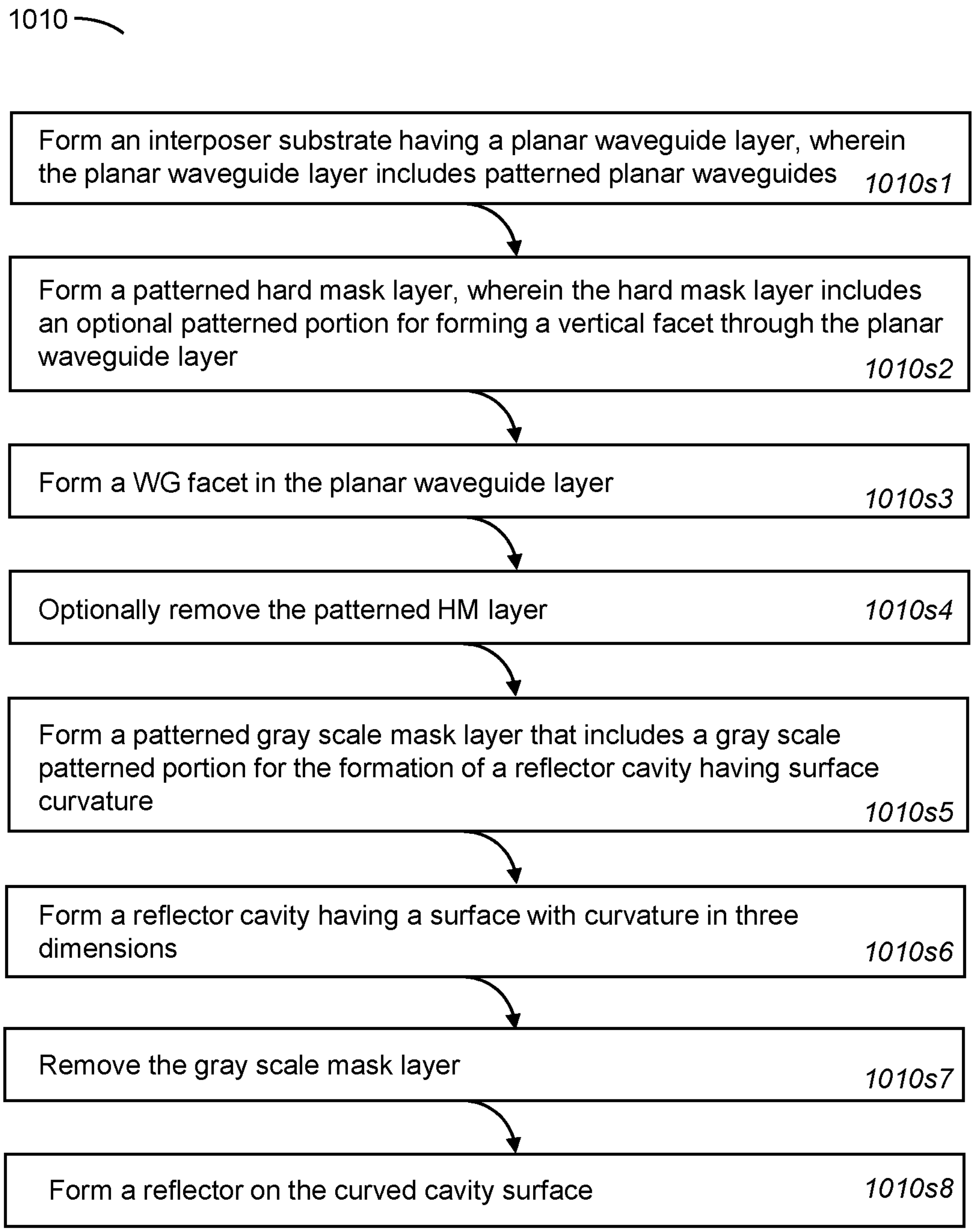
FIG. 10 shows a flowchart for a method of forming yet another embodiment of an interposer having a reflector with three-dimensional surface curvature.

Additional flowcharts for Methods of forming embodiments of reflectors having surfaces with three-dimensional curvature using gray scale reticles are provided in FIGS. 6, 8, and 10 with accompanying illustrative drawings provided in FIGS. 7, 9, and 11, respectively.

The flowchart in FIG. 6, in conjunction with the illustrative drawings provided in FIGS. 7A-7E, shows Method 610 of forming embodiments of reflectors for which a photoresist mask is used to concurrently form a waveguide facet from a planar waveguide and to form a reflector cavity in a substrate having a planar waveguide layer using a gray scale exposure of the photoresist mask layer.

The flowchart in FIG. 8, in conjunction with the illustrative drawings provided in FIGS. 9A-9E, shows a Method 810 of forming embodiments of reflectors for which a hard mask layer is used to concurrently form a waveguide facet from a planar waveguide layer and a gray scale photoresist mask layer is used to form a reflector cavity in a substrate having a planar waveguide layer.

The flowchart in FIG. 10, in conjunction with the illustrative drawings provided in FIGS. 11A-11G, shows a Method 1010 of forming embodiments of reflectors for which a hard mask layer is used to form a waveguide facet from a planar waveguide layer and a gray scale photoresist mask layer is subsequently used to form a reflector cavity in a substrate having a planar waveguide layer.

Method 1

FIG. 6 shows a flow chart for a method of formation of an embodiment of a reflector using a gray scale mask layer to form a cavity in an interposer substrate for which the cavity surface has three-dimensional curvature and the interposer substrate includes a planar waveguide layer. In this embodiment, a reflector structure having three-dimensional surface curvature is formed on the interposer facing an end facet of a patterned planar waveguide also formed on the interposer.

The steps 610*s*1-610*s*5 in the flowchart in FIG. 6 are described in conjunction with the schematic drawings in FIGS. 7A-7E.

Step 610*s*1 of Method 610 is a forming step in which an interposer substrate having a planar waveguide layer is formed. FIG. 7A shows an example interposer layer structure that can be used in some embodiments. Interposer 701 comprises substrate 700, electrical interconnect layer 703, and planar waveguide layer 705. The planar waveguide layer 705 includes a core layer and may include one or more of one or more cladding layers, buffer layers, spacer layers, and planarization layers, among other layers.

Waveguide 744 is a patterned planar waveguide formed from all or a portion of the planar waveguide layer 705 that includes a core and cladding layers.

In embodiments, the patterning of the planar waveguide layer 705 to form the patterned planar waveguides 744 can be performed using lithographic patterning, etching, and deposition steps. In an embodiment, a first portion of the planar waveguide layer 705 is formed that includes the core layer. In this embodiment, a hard mask such as a patterned aluminum hard mask is used in conjunction with an etching process to pattern all or a portion of the waveguide layer 705, including all or a portion of the core layer. Upon patterning of the core layer and removal of the patterned aluminum hard mask, a top and side cladding layer may be deposited over the patterned waveguide core layer to form the patterned planar waveguides 744. Other layers including one or more of a spacer layer, a buffer layer, a planarization layer, among other layers, may be formed on the cladding layer. Details for a method of formation of patterned planar waveguides are described in application Ser. No. 17/499,323 now patent Ser. No. 11/686,906 issued on Jun. 27, 2023, incorporated herein by reference in its entirety.

The formation of patterned planar waveguides 744 from layer 705 is provided by example only. Other methods of forming patterned planar waveguides are known in the art of patterned planar waveguide formation that may also be utilized.

The core layer of the patterned planar waveguides 744 is the layer through which optical signals substantially propagate. Core layers may be formed, for example, from silicon oxynitride, silicon dioxide, silicon nitride, silicon, or other materials. FIG. 7A shows dielectric layers 738 which may be for example, one or more cladding layers, spacer layers, buffer layers, and planarization layers, among other layers. Cladding layers have index of refraction lower than that of the core layer. In some embodiments, layer 738 is a dielectric layer of silicon dioxide. In other embodiments, silicon oxynitride may be used. In yet other embodiments, a polymer layer may be used. In yet other embodiments, silicon nitride may be used. The interposer structure may also include, for example, one or more thermally conductive layers.

The electrical interconnect layer 703 of interposer structure 701 may contain one or more layers of patterned electrical interconnects 735 and intermetal dielectric layers 736. Patterned electrical interconnects 735 in electrical interconnect layer 703 may be formed using methods known in the art. A metal layer such as aluminum, for example, may be deposited on a dielectric layer and patterned using lithographic patterning of a photoresist layer followed by an etch process. An intermetal dielectric layer such as silicon dioxide or other dielectric layer may then be deposited or otherwise formed on the patterned aluminum layer. Vertical interconnects or vias, for example, through the intermetal dielectric layer may then be formed to provide vertical contacts to one or more electrical interconnects 735. Alternatively, other metal layers such as copper may be used. Damascene processes are preferably used with copper metallization to form electrical interconnect layers. Other conductive materials may be used to form the electrical interconnects.

Step 610*s*2 of Method 610 is a forming step in which a patterned photoresist layer is formed on the interposer that includes a first gray scale mask portion for forming a reflector cavity and that includes a second portion for forming a waveguide facet. FIG. 7B shows the interposer structure from FIG. 7A with the addition of a patterned photoresist mask layer 780 having a first gray scale mask portion $\mathbf{780}_{gray}$ and a second portion $\mathbf{780}_{facet}$ for forming a waveguide facet in the patterned planar waveguide 744. In the embodiment shown, the sloped portion $\mathbf{780}_{gray}$ of the photoresist mask layer 780 enables the formation of a surface having three-dimensional curvature in the underlying planar waveguide layer 705 after patterning with a suitable patterning step. Fluorine-containing gas chemistries used in plasma-based etching equipment, for example, can be used in the formation of the cavity in dielectric materials such as silicon dioxide and silicon nitride, among others. The sloped profile in the photoresist gray scale mask 780, shown in the Section A-A' drawing of FIG. 7B(a) is susceptible to pullback during an etch patterning process as further described herein. The sloped profile is provided with the use, for example, of a gray scale reticle that varies the photolithographic radiation intensity to which a positive photoresist is exposed, in combination with the selective removal of the exposed photoresist in a suitable developer solution. Only the portions of the photoresist layer that are exposed to a sufficient lithographic radiation dosage are removed in the developer solution, leaving the sloped profile in the resist as shown in the example profile in Section A-A' in FIG. 7B(a) (Section A-A' is from the top view in FIG. 7B(b). Opening 746 in the photoresist mask layer 780 facilitates the formation of an end facet in the waveguide 744 in the embodiment.

A patterned layout of an example underlying waveguide 744 is shown in the top view of FIG. 7B(b). FIG. 7B(c) shows Section B-B' from the top view in FIG. 7B(b), which further shows the example profile of the first gray scale mask portion $\mathbf{780}_{gray}$ of the photoresist mask layer 780 in this cross section.

Electrical interconnect layer 703 that includes electrical interconnects 735 and intermetal dielectric layers 736 are also shown in FIGS. 7B(a) and 7B(b) for the embodiment. Electrical interconnects 735 in the electrical interconnect layer 703 enable interconnection of electrical and optoelectrical devices on the substrate. In some embodiments, patterned electrical interconnects 735 may connect to a conductive reflective metal layer on the reflector structure to form a vertical interconnect. In some embodiments, the reflective layer of the mirror may be used to provide an electrical contact between an electrical interconnect 735 in electrical interconnect layer 703, and an electrical contact formed from a reflective metallization layer used in the formation of an embodiment of the reflector structure.

Step **610*s*3 of Method 610 is a forming step in which a substantially vertical waveguide facet 745 is formed on the interposer coincidently with the formation of a cavity 704 having a cavity surface 709. FIG. 7C shows the interposer 701 from FIG. 7B after the formation of a waveguide facet 745 and cavity 704 having cavity surface 709 wherein the cavity surface 709 has three-dimensional curvature. The cavity 704 and waveguide facet 745 are formed, in the embodiment, in a portion of the planar waveguide layer 705 and in a portion of the intermetal dielectric layer 736 of the electrical interconnect layer 703. In other embodiments, a portion of the electrical interconnect layer 703** may not be patterned.

FIG. 7C(a) shows a cross section drawing, namely Section A-A', of the top view of FIG. 7C(b), taken through the longitudinal axis of a patterned planar waveguide 744 formed from the planar waveguide layer 705. The post-patterning sloped portion $\mathbf{780}_{post}$ of gray scale mask 780 in FIG. 7C(a), also shown in FIGS. 7C(b) and 7C(c), is shown to have receded from the pre-patterned sloped portion $\mathbf{780}_{gray}$ from FIG. 7B(a). The recession of the sloped portion $\mathbf{780}_{gray}$ of the gray scale mask 780 from an example initial position illustrated by the sloped portion $\mathbf{780}_{gray}$ shown in FIG. 7B(a) prior to patterning, to the example position after patterning as illustrated by the sloped portion $\mathbf{780}_{post}$, is a characteristic of the use of a sloped photoresist masking layer as may be provided with the use of a gray scale patterning technique.

In embodiments, first gray scale mask portion $\mathbf{780}_{gray}$ is formed such that the cross-sectional profile of this mask portion prior to patterning of the planar waveguide layer 705, and in combination with a patterning process for the planar waveguide layer 705, produces a three-dimensional curved cavity surface 709 upon which a reflector layer may be added that will enable the focusing of incident optical signals reflected from the reflector layer. FIG. 7C(c) shows Section B-B' from the top view of FIG. 7C(b) and further shows the gray scale mask portion $\mathbf{780}_{post}$ after patterning of the planar waveguide layer 705 that includes the dielectric layer 738 and a portion of the layer used to form the planar waveguide 744. After patterning, the formation of the waveguide facet 745 and reflector cavity 704 results in the division of the waveguide 744 into portions **744*a*, 744*b* as shown in the top view of FIG. 7C(b). Portion 744*a* of the patterned planar waveguide 744, in FIG. 7C(b) includes the end facet 745 formed in the cavity 704 after the forming step 610*s*3 of method 610**.

FIG. 7C(b) shows exposed electrical interconnect metallization portion **735*a* after formation of a base structure having curved three-dimensional cavity surface 709. The exposed electrical interconnect metallization portion 735*a*** of the optional underlying metallization pattern, in some embodiments, enables the formation of a vertical electrical interconnects using a conductive reflective metal layer to be formed on the reflector base structure.

Step **610*s*4 of Method 610 is a removing step in which the photoresist mask layer 780 is removed. FIG. 7D shows the interposer structure 701 from FIG. 7C after removal of the photoresist mask layer 780 that includes any remainder of first gray scale mask portion $\mathbf{780}_{gray}$ and any remainder of second portion $\mathbf{780}_{facet}$. Curved three-dimensional cavity surface 709 is shown in Section A-A' of FIG. 7D(a), the top view of FIG. 7D(b), and Section B-B' of FIG. 7D(c). The curved three-dimensional cavity surface 709 in cavity 704 forms a base for the formation of a reflector in subsequent process steps as described herein. Waveguide facet 745 of waveguide portion 744*a* is shown closely coupled to the cavity surface 709 in cavity 704. Optional exposed electrical interconnect metallization portion 735*a* is shown in the top-down view of FIG. 7D(b) after formation of a base structure that is receptive to the formation of a metal reflective layer to enable the formation of an optional connection between the electrical interconnect 735 and a reflective layer formed on the curved three-dimensional cavity surface 709**.

Step **610*s*5 of Method 610 is a forming step in which a reflective layer 707 is optionally formed on the curved cavity surface 709. FIG. 7E shows the interposer structure 701 from FIG. 7D after the formation of a reflector layer 707 resulting in the formation of the embodiment of reflector structure 706. In the embodiment shown, the reflective layer 707 of reflector structure 706 is receptive to optical signals emerging from the closely coupled end facet 745 of the planar waveguide portion 744*a* as shown in the Section A-A' drawing of FIG. 7E(a) and the top view of FIG. 7E(b). An end view of the embodiment with the reflector layer 707 and the reflector structure 706** is shown in Section B-B' of FIG. 7E(c).

In some embodiments, reflector layer 707 is a metal layer. In some embodiments, a layer of aluminum is used. In other embodiments, a layer of gold is used. In some embodiments, another metal or metal alloy may be used to form a reflective surface layer. Reflector layer 707, in some embodiments, may be a single layer or more than a single layer. In some embodiments, the reflector layer includes a passivation layer such as a protective transparent dielectric material such as silicon dioxide or other oxide layer. In other embodiments, other passivation materials may be used. For embodiments in which a passivation layer is included, the passivation layer may be a single layer or more than a single layer. Exposure of a pure metal or metal alloy can lead to eventual tarnishing or oxidation from exposure to ambient conditions. Passivation of the exposed metal layer with a transparent dielectric material can prevent or reduce the potential for changes in the reflective properties of a metal layer that can result from exposure to ambient and other processing conditions.

In some embodiments, the reflector layer 707 is a substantially uniform layer in thickness covering the cavity surface 709. In other embodiments, the reflector layer may not be uniform in thickness and may contribute to the three-dimensional curvature of the reflector structure 706 and to the focusing or narrowing of the outgoing optical signal reflected from reflector 706.

In embodiments, the reflector layer 707 is a patterned reflector layer as shown, for example, in FIG. 7E. The patterning of the reflector layer, in some embodiments, enables the isolation of the reflective metallization layer 707 from a blanket metallization layer. In some embodiments, patterning of the reflective metallization layer 707 enables the formation of electrical contact pads for the attachment of surface-mounted devices over the reflector. In some embodiments, the patterning of the reflective metallization layer 707 enables one or more of the isolation of the reflective metallization of the reflector structure 706, the formation of one or more electrical contacts, and the formation of one or more contact pads for the attachment of surface-mounted devices. In some embodiments, contact pads formed above the planar waveguide layer, may be further extended to other layers deposited or otherwise formed on the planar waveguide layer. Contact pads may further include bond pads for forming solder contacts between the contact pads formed from the reflective metallization layer 707 and electrical contacts of mounted devices. And in some embodiments, the electrical contacts may be used to mount other chips or substrates having electrical contacts.

In some embodiments, the patterning of the reflector layer 707 can be performed using a deposition step to form the reflector layer or group of layers, followed by a lithographic patterning step to form a mask layer, and further followed by a wet or dry etching step to remove portions of the reflector requiring removal. Additional passivation layers may be added in some embodiments upon removal of the masking layer.

In other embodiments, a lift-off process may be used to form a patterned reflector layer 707. In embodiments that use a lift-off process to form the reflector layer 707, the reflector layer 707 is provided by forming a patterned mask layer, such as a patterned photoresist layer in which the photoresist is removed from all or a portion of the cavity surface 709. In these embodiments, the reflector layer 707 is deposited onto the cavity surface 709 and over the patterned photoresist layer. In a subsequent lift-off step, the photoresist is removed from the interposer along with the metal layer on the photoresist leaving the metal reflector layer 707 that resides on the cavity surface 709.

Optional electrical interconnect metallization portion 735*a* is shown in hatched area in the top-down view of FIG. 7E(b) after formation of patterned reflective metallization layer 707 to form reflector structure 706. Optional electrical interconnect metallization portion 735*a*, in the embodiment, enables the reflector layer to be used as a vertical conductive interconnect through all or a portion of the planar waveguide layer 705. In the embodiment shown in FIGS. 7A-7E, a vertical interconnect is formed between an electrical interconnect 735 in electrical interconnect layer 703 and the top surface of the planar waveguide layer 705. In some embodiments, the use of reflector layer 707 for the formation of a vertical electrical interconnect enables the reflective metallization layer to be used to form an electrical interconnection between a surface-mounted devices such as photodiodes, VCSELs, and other surface-mounted devices to an underlying electrical interconnect 735 in the electrical interconnect layer 703. Surface-mounted devices such as photodiodes and VCSELs that may be optically coupled to the reflective structure, would benefit from the secondary use of the reflective layer for an electrical interconnection.

Method 2

FIG. 8 shows a flow chart for a method of formation of another embodiment of a reflector using a gray scale mask layer to form a cavity in an interposer substrate for which the cavity surface has three-dimensional curvature and the interposer substrate includes a planar waveguide layer having patterned planar waveguides. In this embodiment, a hard mask layer is used in the formation of the end facet of a patterned planar waveguide 744 in the planar waveguide layer 705.

The steps 810*s*1-810*s*6 in the flowchart in FIG. 8 are described in conjunction with the schematic drawings in FIG. 7A and FIGS. 9A-9E.

Step 810*s*1 of method 810 is a forming step in which an interposer having a planar waveguide layer is formed. FIG. 7A shows an example interposer layer structure that can be utilized in some embodiments. A description of the interposer structure of FIG. 7A having patterned planar waveguides is provided herein.

Step 810*s*2 of method 810 is a forming step in which a patterned hard mask layer 916 is formed on a portion of the interposer 901. FIG. 9A shows the interposer structure 901 from FIG. 7A with the addition of patterned hard mask 916. In the embodiment shown, the patterned hard mask 916 is, for example, a patterned layer of aluminum. The patterned hard mask layer 916 is shown in FIG. 9A(a) with optional photoresist layer $\mathbf{916}_{PR}$ shown in dotted outline. In some embodiments, photoresist layer $\mathbf{916}_{PR}$ or other layer used in the patterning of the hard mask 916 may optionally be removed prior to subsequent processing. An aluminum layer has a high resistance to fluorinated plasma etching chemistries used in the pattering of dielectric layers such as silicon dioxide, silicon oxynitride, and silicon nitride, for example. Other hard mask materials that have a high resistance to etching in comparison to the etching rate of the underlying materials in the planar waveguide layer 905 may also be used, including other metals, metal oxides, and metal nitrides. Other dielectric hard mask layers that have high etch resistance relative to the underlying material in the planar waveguide layer 905 may also be used. Leaving the photoresist layer $\mathbf{916}_{PR}$ in place after patterning of the hard mask for one or more subsequent processing steps may provide improved process stability and uniformity, particularly during the formation of the reflector cavity, among other benefits.

FIG. 9A(b) shows top view of a portion of the interposer 901 with opening 946 for the formation of an end facet of planar waveguide 944 as described herein. FIG. 9A(c) shows an end view of the structure for reference in subsequent figures that shows the layered structure of the interposer 901. Like numbering in FIGS. 9A-9E is used for similar structural features to those of the interposer structure shown in FIG. 7A.

The interposer structure 901 shown in FIGS. 9A(a)-9A(c) includes planar waveguide layer 905 and electrical interconnect layer 903 on substrate 900. Planar waveguide layer 905 further includes the core layer 944 and dielectric layers 938. Electrical interconnect layer 903 further includes conductive patterned interconnect 935 and intermetal dielectric layer 936.

Step 810$s$3 of method 810 is a forming step in which a patterned photoresist mask layer is formed on the interposer 901 that includes a patterned gray scale portion $\mathbf{980}_{gray}$ for the formation of a reflector cavity having surface curvature in three dimensions. FIG. 9B shows the interposer structure from FIG. 9A with the addition of patterned mask layer 980 having gray scale mask portion $\mathbf{980}_{gray}$ on the interposer 901.

In the embodiment shown in FIG. 9B, the patterned gray scale mask portion $\mathbf{980}_{gray}$ of the mask layer 980 is formed on a portion of the interposer 901 adjacent to the areas occupied by the hard mask. In some embodiments, the gray scale mask 980 overlaps with a portion of the hard mask 916. The sloped profile in the gray scale mask portion $\mathbf{980}_{gray}$, shown in the Section A-A' drawing of FIG. 9B(a), is susceptible to pullback during an etch patterning process as further described herein. Sloped portion $\mathbf{980}_{gray}$ of the mask layer 980 enables the formation of a cavity having three-dimensional surface curvature in the underlying planar waveguide layer 905 after patterning with a suitable etching step. Fluorine-containing gas chemistries used in plasma-based etching equipment, for example, can be used in the formation of the cavity in dielectric materials such as silicon dioxide, silicon oxynitride, and silicon nitride. In etch processes that utilize fluorine-containing gases, the etch rates for aluminum containing hard mask layers is low in comparison to the etch rates of the underlying planar waveguide layer 905. The use of the hard mask 916 for the formation of the end facets of the planar waveguides can result in smoother and more vertical surfaces, among other benefits, on the waveguide facets.

The top view in FIG. 9B(b) shows patterned underlying waveguide 944 and opening 946 in the masked areas that facilitates the formation of an end facet in the planar waveguide 944. FIG. 9B(c) shows Section B-B' of FIG. 9B(b), which further shows an example end view profile of patterned gray scale mask layer $\mathbf{980}_{gray}$.

Step 810$s$4 of method 810 is a forming step in which a substantially vertical facet is formed in a planar waveguide on the interposer coincidently with the formation of a cavity having a surface with three-dimensional curvature. FIG. 9C shows the interposer structure from FIG. 9B after the formation of a cavity 904 having a surface 909 with three-dimensional curvature and the formation of a waveguide facet 945 in waveguide 944. The cavity 904 and waveguide facet 945 are formed in the embodiment, in a portion of the planar waveguide layer 905 and in the embodiment shown, a portion of the intermetal dielectric layer 936 in the electrical interconnect layer 903. In other embodiments, a portion of the electrical interconnect layer 903 may not be patterned.

FIG. 9C(a) shows Section A-A' from the top view of FIG. 9C(b), taken through the longitudinal axis of a patterned planar waveguide 944 formed from the planar waveguide layer 905 as shown. The post patterning sloped gray scale portion $\mathbf{980}_{post}$ of photoresist mask 980 in FIGS. 9C(a)-9C(c), is shown to have receded from the pre-patterned sloped gray scale portion $\mathbf{980}_{gray}$ from FIG. 9B(a). The recession of the sloped portion $\mathbf{980}_{post}$ of the gray scale mask 980 from an example initial position illustrated by the sloped portion $\mathbf{980}_{gray}$ shown in FIG. 9B(a) prior to patterning, to the example position after patterning as illustrated by the sloped portion $\mathbf{980}_{post}$, is a characteristic of the use of a sloped photoresist masking layer as may be provided with the use of a gray scale patterning technique for the formation of cavity 904 having curved cavity surface 909.

In embodiments, a photoresist mask 980 is formed such that the cross-sectional profile of a gray scale mask portion $\mathbf{980}_{gray}$ in combination with a patterning process for the planar waveguide layer 905, produces a three-dimensional curved surface 909 upon which a reflector layer can be added that will enable the focusing of reflected optical signals exiting an end facet 945 of waveguide 944. FIG. 9C(c) shows Section B-B' from the top view of FIG. 9C(b) and further shows the gray scale mask portion $\mathbf{980}_{post}$ after patterning of the planar waveguide layer 905 that includes the dielectric layers 938 and a portion of the intermetal dielectric layer 936 of the electrical interconnect layer 903. After patterning, the formation of the waveguide facet 945 and reflector cavity 904 has resulted in the division of the waveguide 944 into portions 944$a$, 944$b$ as shown in the top view of FIG. 9C(b). Portion 944$a$ of the patterned planar waveguide 944, in FIG. 9C(b) includes the end facet 945 formed in the reflector cavity after the forming step 810$s$4 of method 810.

In embodiments that include the hard mask layer 916, the hard mask provides increased resistance to mask erosion during patterning of the cavity 948 and can lead to increased control of the verticality and smoothness of the etched facet 945.

Step 810$s$5 of method 810 is a removing step in which photoresist mask layer 980 and hard mask layer 916 are removed from the interposer. FIG. 9D shows the interposer structure from FIG. 9C after removal of the hard mask layer 916 and the photoresist mask layer 980. Curved surface 909 of the reflector cavity is shown in Section A-A' in FIG. 9D(a), the top view of FIG. 9D(b), and Section B-B' in FIG. 9D(c). The curved three-dimensional surface 909 forms a base for the formation of a reflector in subsequent processing as described herein. End facet 945 of the planar waveguide layer 944 is shown in the embodiment in proximity to the curved cavity surface 909.

FIG. 9C(b) shows exposed electrical interconnect metallization portion 935$a$ after formation of a base structure having curved three-dimensional cavity surface 909. The exposed electrical interconnect metallization portion 935$a$ of the optional underlying metallization pattern, in some embodiments, enables the formation of a vertical electrical interconnects using a conductive reflective metal layer to be formed on the reflector base structure as described for the metallization layers in the embodiments described in FIGS. 7A-7E.

Step 810$s$6 of method 810 is a forming step in which a reflective layer is formed on the curved cavity surface 909. FIG. 9E shows the interposer structure from FIG. 9D after the formation of a reflector layer 907 on cavity surface 909. In the embodiment shown, the reflective layer 907 is receptive to optical signals emerging from the closely coupled end facet 945 of the planar waveguide portion 944$a$ as shown in the Section A-A' drawing of FIG. 9E(a) and the top view of FIG. 9E(b). An end view of the embodiment with the reflector layer 907 is shown in Section B-B' of FIG. 9E(c).

In some embodiments, reflector layer 907 is a metal layer. In some embodiments, a layer of aluminum is used. In other embodiments, a layer of gold is used. In some embodiments, another metal or metal alloy may be used to form a reflective surface layer. Reflector layer 907, in some embodiments, may be a single layer or more than a single layer. In some embodiments, the reflector layer includes a passivation layer such as a protective transparent dielectric material such as silicon dioxide. In other embodiments, other passivation materials may be used. For embodiments in which a passivation layer is included, the passivation layer may be a single layer or more than a single layer. Exposure of a pure metal or metal alloy can lead to eventual tarnishing or oxidation from exposure to one or more of ambient conditions and processing steps subsequent to the formation of the reflector layer 907. Passivation of the exposed metal layer with a transparent dielectric material can prevent or reduce the potential for changes in the reflective properties of a metal layer that may result from exposure to ambient and that may result from exposure to subsequent fabrication processes.

In some embodiments, the reflector layer 907 is a substantially uniform layer in thickness covering the cavity surface 909. In other embodiments, the reflector layer may not be uniform in thickness and may contribute to the three-dimensional curvature of the reflector structure 906 and to the focusing or narrowing of the outgoing optical signal reflected from reflector 906.

In embodiments, the reflector layer 907 is a patterned reflector layer as shown, for example, in FIG. 9E. In some embodiments, the patterning of the reflector layer 907 can be performed using a deposition step to form the reflector layer or group of layers, followed by a lithographic patterning step to form a mask layer, and further followed by a wet or dry etching step to remove portions of the reflector requiring removal. Additional passivation layers may be added in some embodiments upon removal of the masking layer.

In other embodiments, a lift-off process may be used to form a patterned reflector layer 907. In embodiments that use a lift-off process to form the reflector layer 907, the reflector layer 907 is provided by forming a patterned mask layer, such as a patterned photoresist layer in which the photoresist is removed from all or a portion of the cavity surface 909. In these embodiments, the reflector layer 907 is deposited onto the cavity surface 909 and over the patterned photoresist layer. In a subsequent lift-off step, the photoresist is removed from the interposer along with the metal layer on the photoresist leaving the metal reflector layer that resides on the cavity surface 909.

Method 3

FIG. 10 shows a flow chart for a method 1010 of formation of yet another embodiment of a reflector structure on an interposer having a planar waveguide layer. Two distinct masking and patterning steps are used in Method 1010. In the formation of embodiments described by Method 1010, a reflector structure having three-dimensional surface curvature is also formed on the interposer facing an end facet of a patterned planar waveguide as in the embodiments shown in FIGS. 7E and 9E. However, the masking and patterning process used for the formation of the waveguide facet is performed in a separate step from the gray scale masking and patterning process used for the formation of the reflector. This separation enables increased flexibility for assemblies that utilize embodiments of the reflector structure that are not coupled to a waveguide facet as further described herein.

Steps 1010*s*1-1010*s*8 in the flowchart in FIG. 10 are described in conjunction with the drawings in FIG. 7A and FIGS. 11A-11D.

Step 1010*s*1 of method 1010 is a forming step in which an interposer having a planar waveguide layer is formed. FIG. 7A shows an example interposer layer structure that can be utilized in some embodiments. A description of FIG. 7A is provided herein.

Step 1010*s*2 of method 1010 is a forming step in which a patterned hard mask is formed on a portion of the interposer.

Figure 11C:
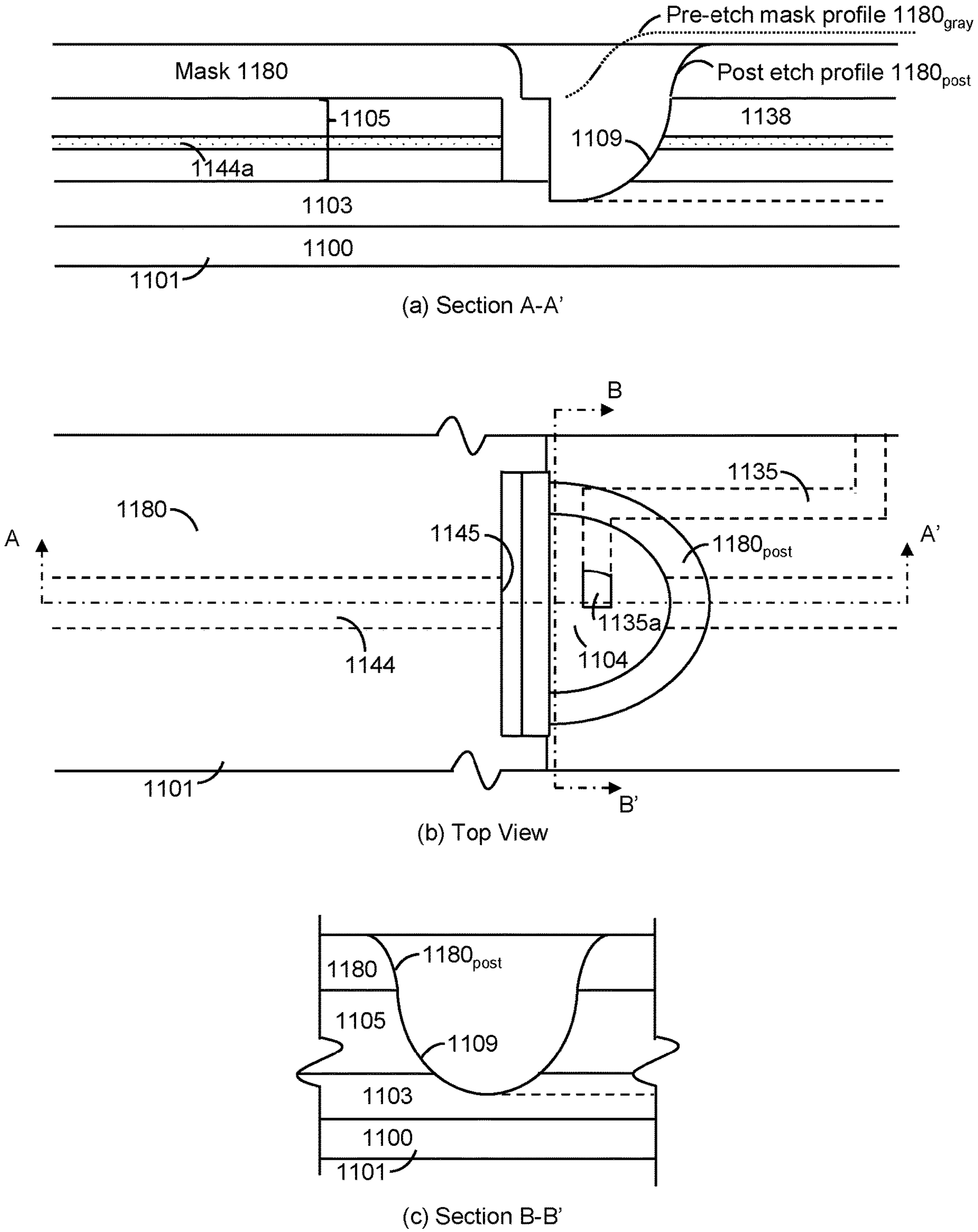
FIG. 11C shows an interposer as in FIG. 11B after the patterning of the planar waveguide layer to form a reflector cavity having a surface with curvature in three-dimensions: (a) Section A-A', (b) top view, and (c) Section B-B'.

Step 1010*s*3 of method 1010 is a forming step in which a waveguide facet is formed on a portion of the interposer 1101. FIGS. 11A(a), 11A(b), and 11A(c) show the Section A-A', top-down views, and Section B-B' views, respectively for the patterned interposer structure 1101 with the hard mask 1116, for example, after the formation of recess 1148 that includes, in the embodiment, the formation of the waveguide facet 1145 from planar waveguide section 1144*a*. The patterning step includes the patterning of all or a portion of the waveguide layer 1105 and may include a portion of the underlying electrical interconnect layer 1103. Patterned hard mask 1116 is shown in FIG. 11A. FIG. 11A(c) shows Section B-B' from the top view of FIG. 11A(b) with reference in subsequent figures showing the layered structure of the interposer 1101. Like numbering in FIGS. 11A-11D is used for similar structural features to those of the interposer structure shown in FIG. 7A. Interposer structure 1101 includes substrate 1100, electrical interconnect layer 1103, and planar waveguide layer 1105 having one or more patterned planar waveguides 1144.

Step 1010*s*4 of method 1010 is a removing step in which all or a portion of a patterned hard mask layer 1116 is optionally removed from the interposer 1101.

Step 1010*s*5 of method 1010 is a forming step in which a patterned mask layer 1180 is formed on the interposer 1101 wherein the patterned mask layer includes gray scale mask layer portion $\mathbf{1180}_{gray}$. FIGS. 11B(a), 11B(b), and 11B(c) show the Section A-A' view, top view, and Section B-B' view, respectively, for the interposer structure from FIG. 11A after the removal of the hard mask 1116 and subsequent formation of patterned mask layer 1180. Sloped gray scale portion $\mathbf{1180}_{gray}$ of the mask layer 1180 is shown.

Step 1010*s*6 of method 1010 is a forming step in which a reflector cavity 1104 having three-dimensionally curved surface 1109 is formed in the interposer 1101. FIGS. 11C(a), 11C(b), and 11C(c) show the Section A-A' view, top view, and Section B-B' view, respectively, for the interposer structure from FIG. 11B after the formation of reflector cavity 1104. A comparison of the cross-sectional profile of the mask layer 1180 before and after the reflector cavity patterning step is shown with the superimposed dotted line for the pre-etch mask profile $\mathbf{1180}_{gray}$ as shown. After formation of the cavity 1104, the mask layer has receded to form post etch profile $\mathbf{1180}_{post}$ as shown.

FIG. 11C(b) shows exposed electrical interconnect metallization portion 1135*a* after formation of a base structure having curved three-dimensional cavity surface 1109. The exposed electrical interconnect metallization portion 1135*a* of the optional underlying metallization pattern, in some embodiments, enables the formation of a vertical electrical interconnects using a conductive reflective metal layer to be formed on the reflector base structure as described for the metallization layers in the embodiments described in FIGS. 7A-7E having like numbering.

Step 1010*s*7 of method 1010 is a removing step in which the patterned mask layer 1180 is removed.

Step 1010*s*8 of method 1010 is a forming step in which a reflector layer 1107 is formed on all or a portion of the three-dimensional cavity surface 1109 of reflector cavity 1104. FIGS. 11D(a), 11D(b), and 11D(c) show the Section A-A' view, top view, and Section B-B' view, respectively, for the interposer structure from FIG. 11C after the removal of the mask layer 1180 and the formation of reflector layer 1107.

FIG. 11D shows an embodiment of reflector structure 1106 using Steps 1010*s*1-1010*s*8 of Method 1010. Reflector structure 1106 is closely coupled to waveguide facet 1145 of the patterned planar waveguide 1144*a* formed from planar waveguide layer 1105.

The use of the multiple masking steps, 1010_s_2 and 1010_s_5, and the corresponding patterning step 1010_s_3 for waveguide facet 1145 and step 1010_s_6 for the reflector cavity, respectively, enables additional configurations of assemblies that include embodiments of the reflector structure such as, but not limited to, reflector structure 1106. Some example configurations that utilize embodiments of reflector structures disclosed herein are further described in FIGS. 13-16. The configurations disclosed in FIGS. 13-16 include the optional use of alignment aids for the mounting and alignment of devices on an interposer, among other example configurations. A method of forming alignment aids is described in Method 1284 in FIG. 12A with accompanying schematic drawings shown in FIG. 12B. Details for a method of formation of alignment aids are described in application Ser. No. 17/499,323 now patent Ser. No. 11/686,906 issued on Jun. 27, 2023, incorporated herein by reference in its entirety.

Methods 4-6

Figure 12A:
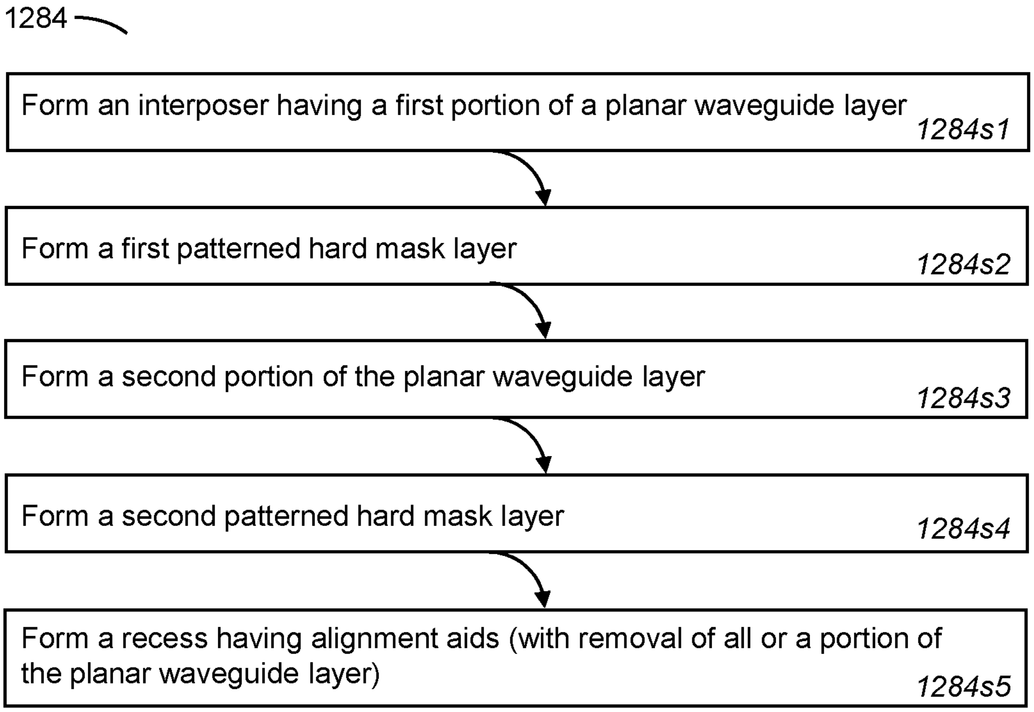
FIG. 12A shows a method for the formation of alignment aids used in assemblies having embodiments of reflector structures.

FIG. 12A shows Method 1284 for the formation of alignment aids used in assemblies having embodiments of reflector structures. The steps 1284_s_1-1284_s_5 are shown in conjunction with schematic drawings in FIG. 12B that illustrate steps in the formation of alignment aids on an interposer that includes a planar waveguide layer.

In assemblies that utilize alignment aids as described herein, the formation of the alignment aids may be performed prior to, or concurrently, with other steps in the formation of embodiments of the reflector structure.

Figure 12B:
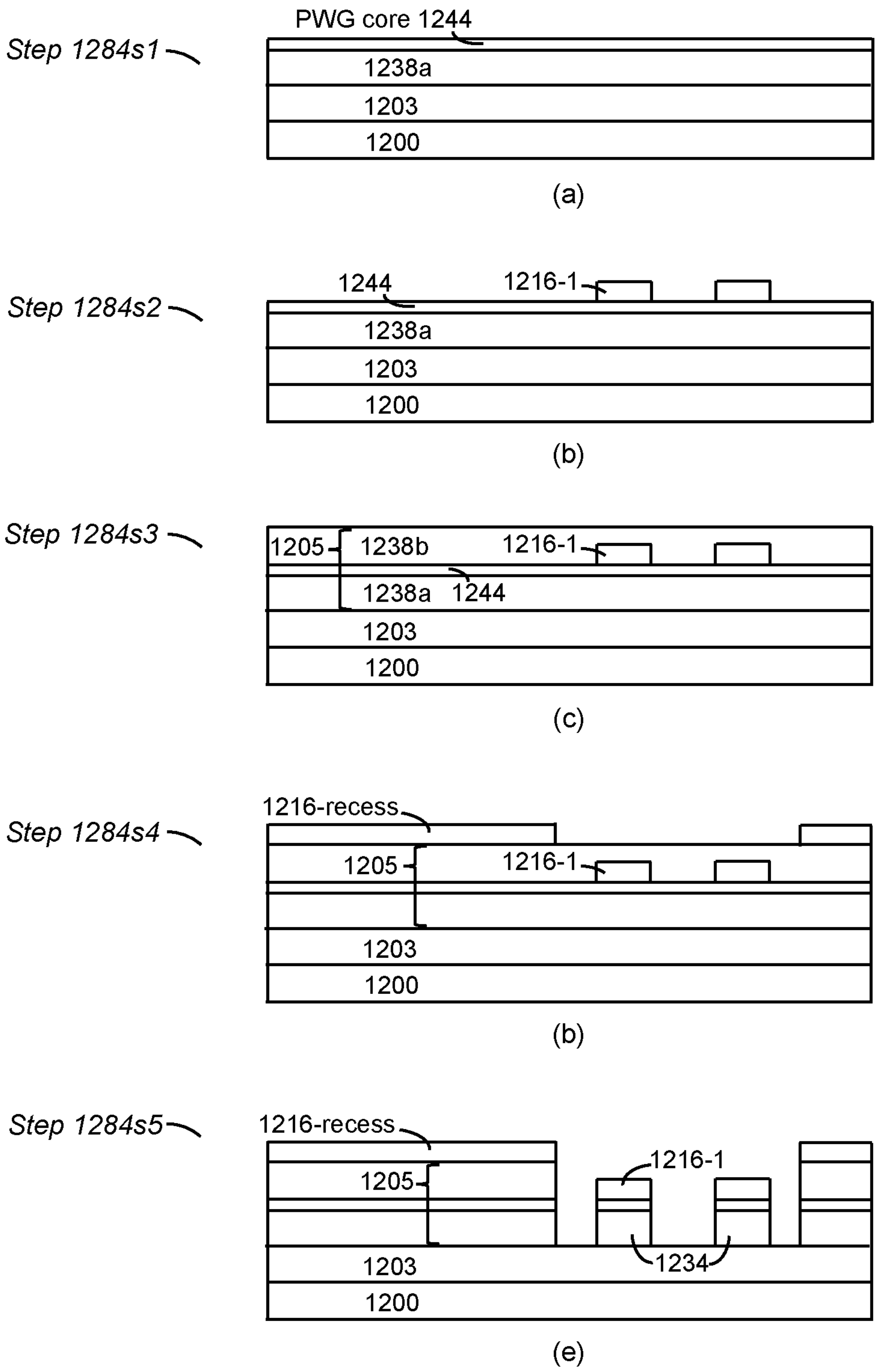
FIG. 12B(a)-(e) show schematic drawings corresponding to the steps of FIG. 12A.

Step 1284_s_1 of Method 1284 is a forming step in which a first portion of a planar waveguide layer is formed on a base structure of the interposer, wherein the base structure of the interposer comprises a substrate 1200 and an optional electrical interconnect layer 1203, and wherein the first portion of the planar waveguide, in the embodiment shown, includes a first dielectric layer 1238_a_ and waveguide core 1244 as shown in the schematic cross section in FIG. 12B(a).

Step 1284_s_2 of Method 1284 is a forming step in which a first patterned hard mask 1216-1 is formed on the first portion of the planar waveguide layer. The first patterned hard mask 1216-1 provides a pattern for the alignment aids as shown in FIG. 12B(b).

Step 1284_s_3 of Method 1284 is a forming step in which a second portion of the planar waveguide layer is formed on the patterned hard mask 1216-1 and on the areas of the first portion of the planar waveguide layer not covered by the first hard mask 1216-1. The second portion, in the embodiment shown, includes dielectric layer 1238_b_. Planar waveguide layer 1205 is formed from the first and second portions of the planar waveguide layer as shown in FIG. 12B(c). Dielectric layers 1238_a_, 1238_b_ and waveguide core layer 1244 are similar to descriptions of similar layers with like numbers for the planar waveguide layer described herein.

Step 1284_s_4 of Method 1284 is a forming step in which a second patterned hard mask 1216-recess is formed on the planar waveguide layer 1205 as shown. The second hard mask 1216-recess provides, in embodiments, a recess within which the alignment aids will be formed.

Step 1284_s_5 of Method 1284 is a forming step in which a recess is formed having alignment aids 1234. The formation of the alignment aids 1234 results from the removal of exposed portions of the planar waveguide layer 1205 through the second hard mask 1216-recess and the buried first hard mask layer 1216-1.

Method 1284 is an example method for forming alignment aids that can be used in conjunction with embodiments of reflector structures described herein to form assemblies having devices compatible with the alignment aids and having an embodiment of a reflector structure.

Figure 13:
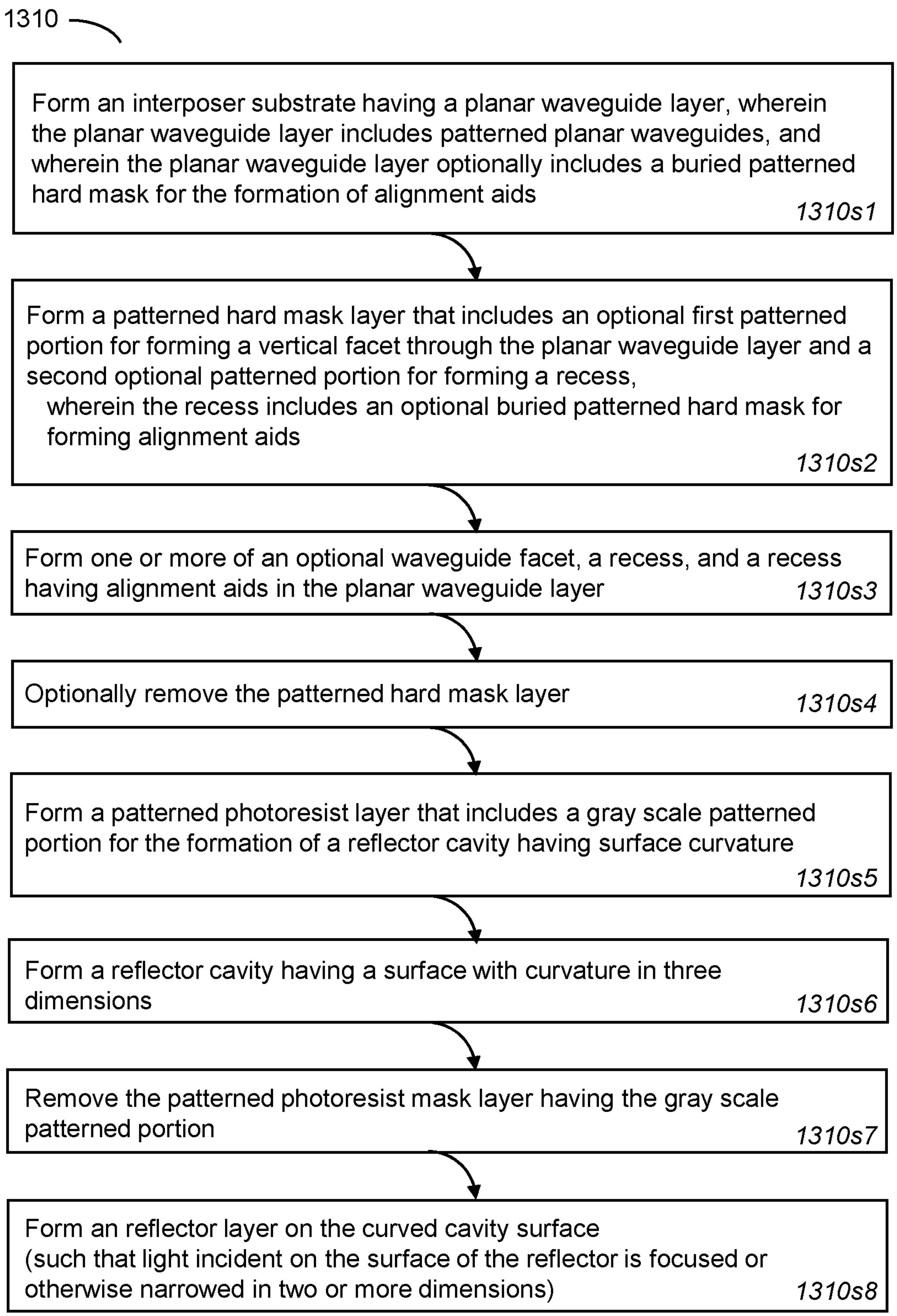
FIG. 13 shows a flowchart for a method of forming yet another embodiment of an interposer having a reflector with three-dimensional surface curvature wherein the method includes for the formation of alignment aids.

FIG. 13 shows a flow chart for a method 1310 of formation of yet another embodiment of a reflector structure on an interposer having a planar waveguide layer wherein the formation of the reflector structure uses aspects of the multiple masking process of Method 1010 and includes the formation of a recess within the planar waveguide layer for mounting devices that intersect the axis of propagation of the planar waveguide layer on the interposer as further described herein. In the first of the two masking and patterning processes used in Method 1310, the adjacent recess to embodiments of the reflector can be formed such that devices can be mounted within the formed recess can be coupled to the reflectors. In some embodiments, devices mounted within the formed recesses can be mounted to the underlying electrical interconnect layer for electrical connectivity. And in some embodiments, devices can be mounted and aligned using alignment aids formed in the recesses.

Steps 1310_s_1-1310_s_8 in the flowchart in FIG. 13 are described in conjunction with the drawings in FIG. 7A and FIGS. 14A-16B. FIG. 7A shows an example interposer layer structure that can be utilized in some embodiments. A description of FIG. 7A is provided herein.

Step 1310_s_1 of Method 1310 is a forming step in which an interposer having a planar waveguide layer is formed wherein the planar waveguide layer optionally includes a buried patterned hard mask for the formation of alignment aids.

Figure 14A:
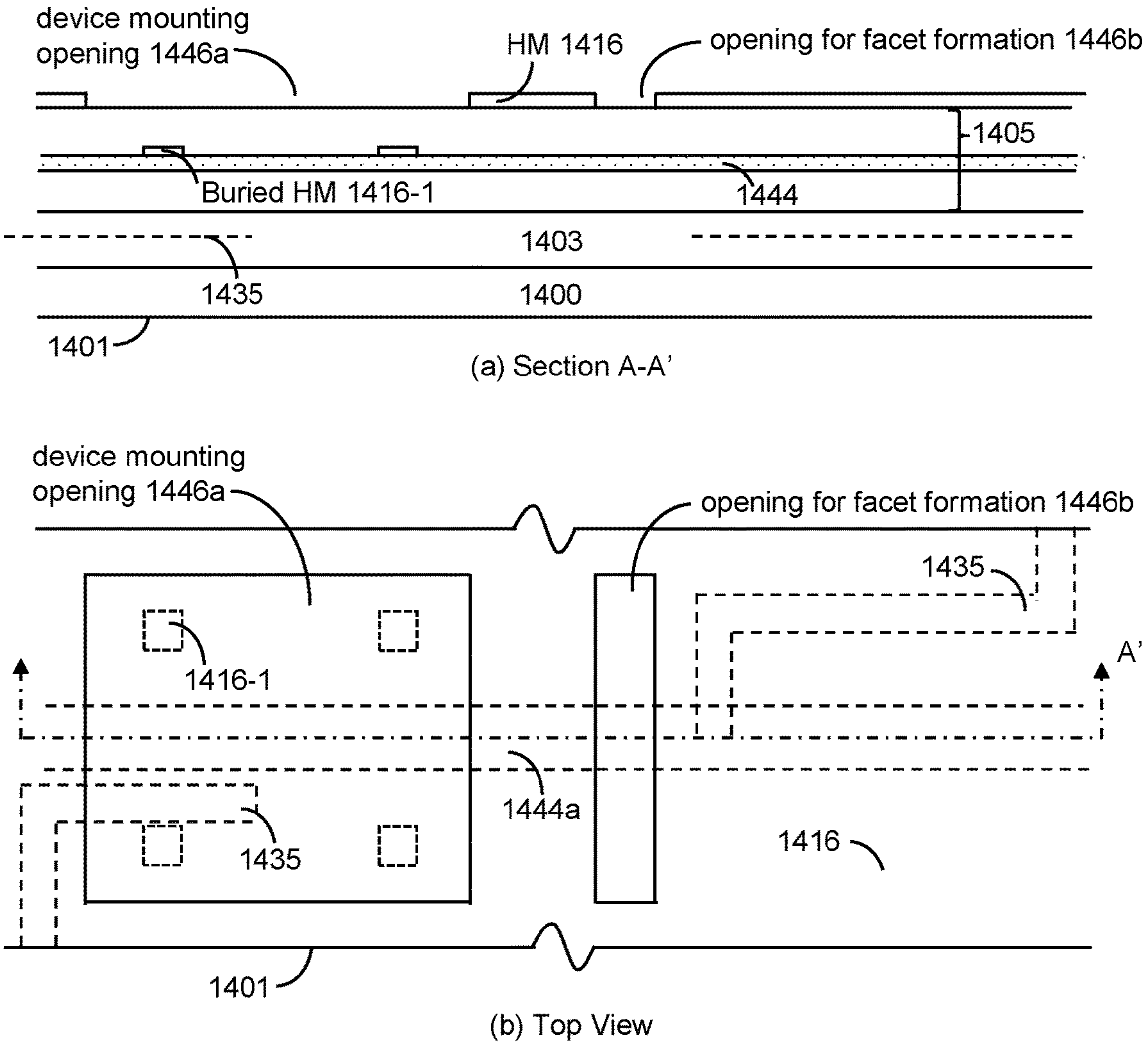
FIG. 14A shows an interposer as in FIG. 7A that further includes a buried hard mask for the formation of alignment aids after the formation of a hard mask layer: (a) Section A-A' and (b) top view.

Step 1310_s_2 of method 1310 is a forming step in which a patterned hard mask is formed on the interposer wherein the patterned hard mask includes an optional portion for forming a vertical facet through a planar waveguide layer and a second optional portion for forming a device mounting recess wherein the device mounting recess includes an optional buried hard mask for the formation of alignment aids in the device mounting recess. FIG. 14A shows hard mask 1416 with openings 1446_a_,1446_b_ for the formation of a device mounting recess and a waveguide facet recess, respectively. The top view of FIG. 14A(b) also shows the openings 1446_a_,1446_b_ in the hard mask 1416 and an example areal layout of a buried hard mask 1416-1 shown positioned within the device mounting hard mask opening 1446_b_ of hard mask 1416.

Figure 14B:
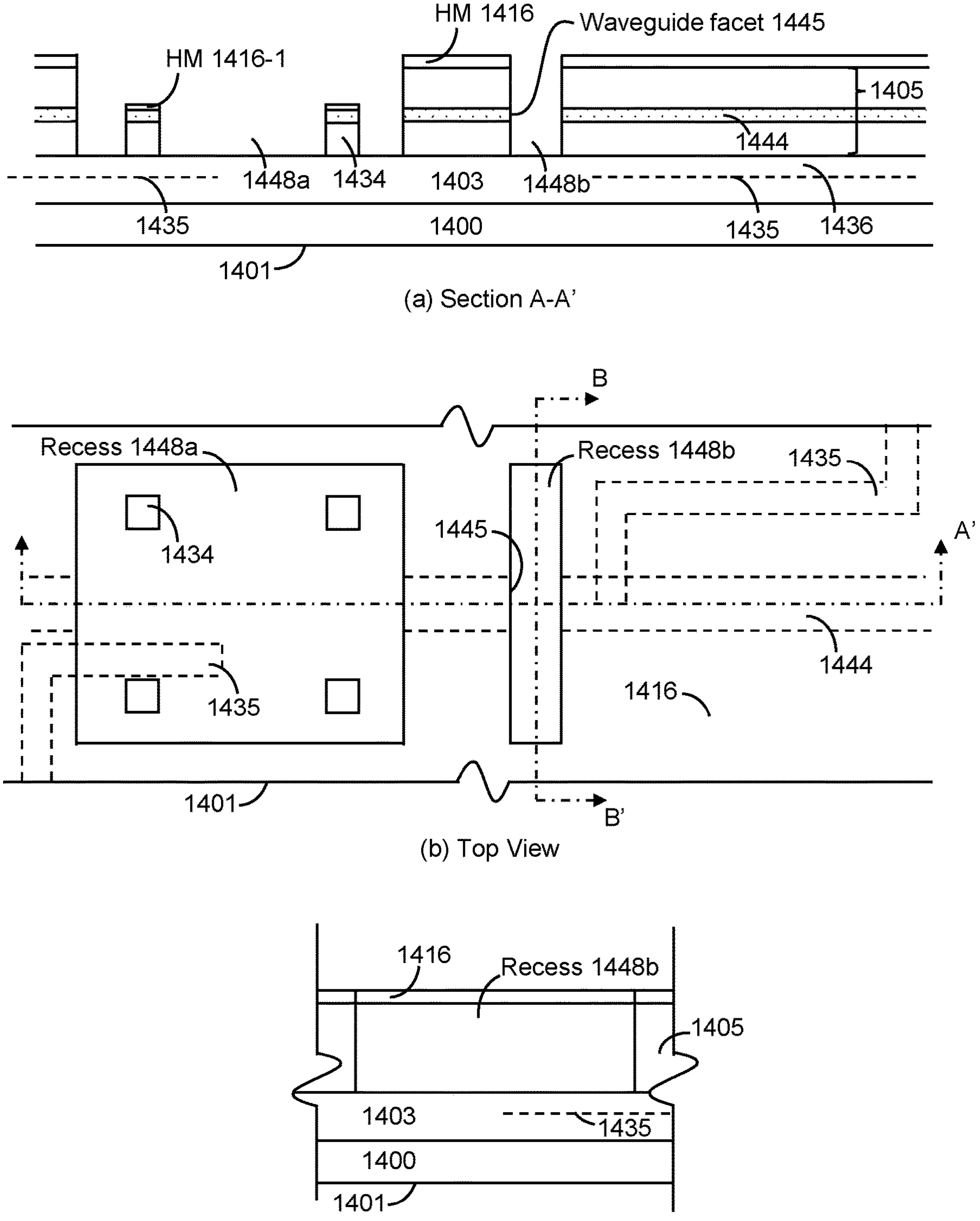
FIG. 14B shows an interposer as in FIG. 14A after patterning of the planar waveguide layer to form a waveguide facet and to form a recess having alignment aids: (a) Section A-A', (b) top view, and (c) Section B-B'.

Step 1310_s_3 of method 1310 is a forming step in which a device mounting recess and a waveguide facet recess are formed on a portion of the interposer 1401. FIGS. 14B(a), 14B(b), and 14B(c) show the Section A-A', top-down views, and Section B-B' views, respectively, for the interposer structure 1401 patterned using the hard mask 1416, for example, after the formation of device mounting recess 1448_a_ and waveguide facet recess 1448_b_ in planar waveguide layer 1405. Waveguide facet recess 1448_b_ includes waveguide facet 1445. In the embodiment, one or more alignment aids 1434 are formed in the device mounting recess 1448_a_. Forming Step 1310_s_3 includes the patterning of all or a portion of the planar waveguide layer 1405 and may include a portion of the underlying electrical interconnect layer 1403 on substrate 1400. Patterning of electrical interconnects 1435 in the underlying electrical interconnect layer 1403, can enable the formation of electrical connections to be formed between devices that are mounted in the device mounting recess 1448_a_ and the patterned electrical interconnects 1435 in the electrical interconnect layer 1403. Bond pads, for example, may be formed between the electrical interconnects 1435 and the bottom of the cavity to which the electrical contacts of cavity-mounted devices may be soldered or otherwise connected. Optional electrical interconnects 1435 that enable contact to a reflective metallization layer as in other embodiments described in conjunction with FIGS. 7A-11D are also shown.

Step **1310*s*4 of method 1310 is an optional removing step in which all or a portion of a patterned hard mask layer 1416 is removed from the interposer 1401**.

Step **1310*s*5 of method 1310 is a forming step in which a photoresist mask layer having one or more gray scale mask portions are formed on the interposer 1401. Examples of gray scale masking are provided for embodiments herein, such as for example, the photoresist layer 1180 having gray mask portion $\mathbf{1180}_{gray}$ for the embodiment shown in FIG. 11**B.

Step **1310*s*6 of method 1310 is a forming step in which a reflector cavity having a three-dimensional curved surface is formed in the interposer 1401**.

Step **1310*s*7 of method 1310 is a removing step in which the patterned photoresist layer that includes the gray scale mask portion used in the formation of the reflector cavity, as for example in Step 1310*s*6, is removed from the interposer 1401**.

Figure 14C:
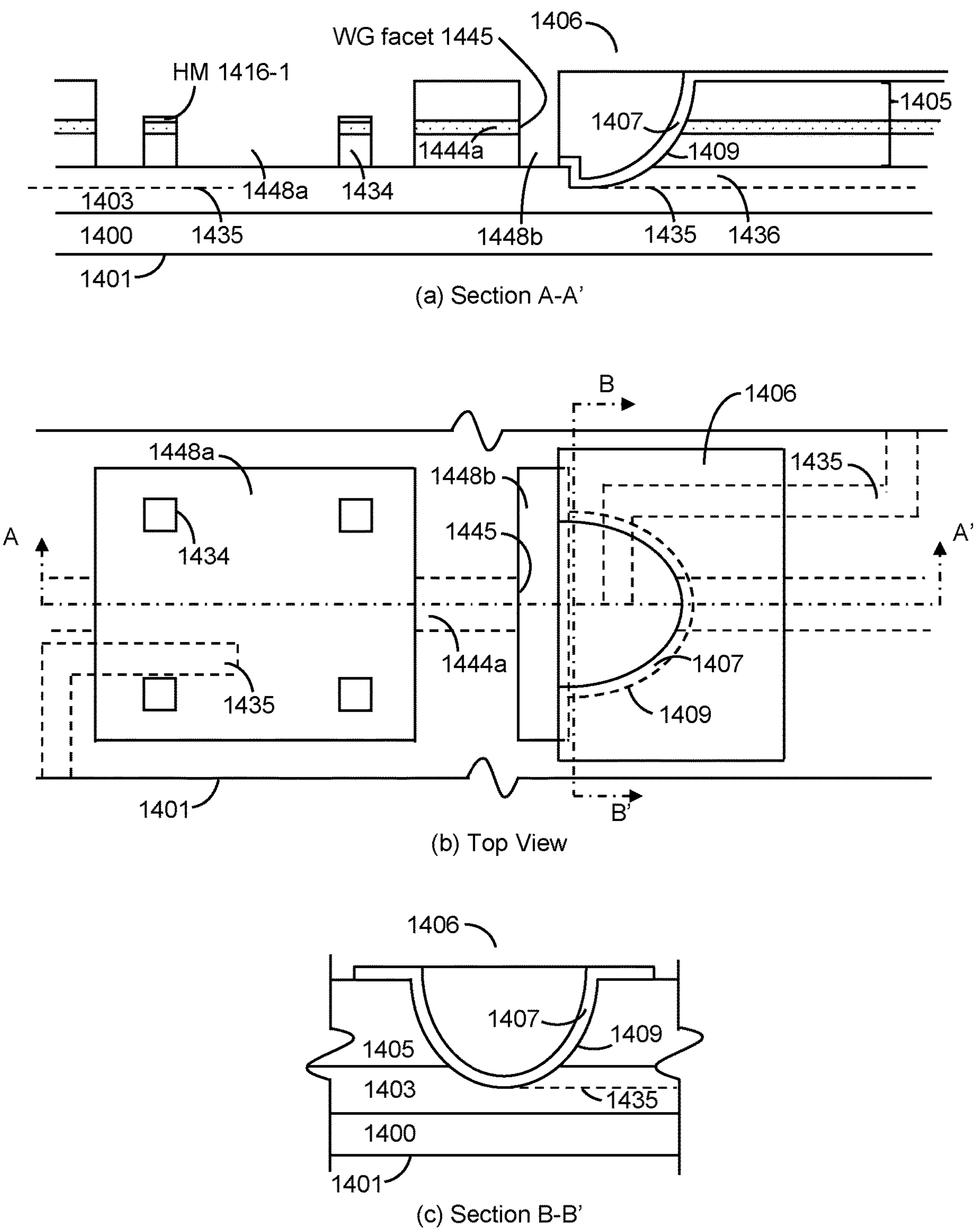
FIG. 14C shows an interposer as in FIG. 14B after formation of a reflector layer on a reflector cavity: (a) Section A-A', (b) top view, and (c) Section B-B'.

Step **1310*s*8 of method 1310 is a forming step in which a reflector layer 1407 is formed on all or a portion of the three-dimensional cavity surface 1409 of reflector cavity 1404 as shown in FIG. 14C. FIGS. 14C(a), 14C(b), and 14C(c) show the Section A-A' view, top view, and Section B-B' view, respectively, for the interposer structure from FIG. 14B after removal of the patterned hard mask 1416 (Step 1310*s*4), after the formation of the photoresist mask layer with gray scale mask portion (Step 1310*s*5), after the formation of a reflector cavity (Step 1310*s*6), after removal of the photoresist mask layer having a gray scale mask portion (Step 1310*s*7), and after the formation of reflector layer 1407 to form the embodiment shown for reflector structure 1406**.

Section A-A' in FIG. 14C(a) and the top view of FIG. 14C(b) show the reflector structure 1406 with reflector layer 1407 closely coupled to the waveguide facet 1445 in the waveguide facet recess **1448*b*. Section A-A' in FIG. 14C(a) and the top view of FIG. 14C(b) also show the alignment aids 1434 in the device mounting recess 1448*a* with the exposed hard mask layer 1416-1. Hard mask layer 1416-1 has a low etch rate in comparison to the etch rate of the layers in the planar waveguide layer 1405. Hard mask 1416-1 in some embodiments is formed from aluminum. In other embodiments, the hard mask 1416-1 is formed from an alloy containing aluminum. Aluminum and aluminum-containing alloys have a high resistance to etching (low etch rates) in fluorine-containing gas chemistries commonly used for the patterning of dielectrics such as silicon dioxide, silicon nitride, and silicon oxynitride as used, for example, in embodiments of the planar waveguide layer 1405**.

In some embodiments, devices mounted within the device mounting recess **1448*a* are mounted on the alignment aids 1434. Mounting of devices on alignment aids 1434 can provide vertical alignment of an optical axis of the mounted device and the optical axis of the patterned waveguide 1444 to which the device is coupled. Additionally, the use of alignment aids 1434 for the mounting of devices in the device mounting cavity 1448*a*** can restrict the lateral movement of the mounted devices to facilitate lateral alignment of the optical axes of the mounted device and a waveguide to which the mounted device is coupled.

In some embodiments, the underlying electrical interconnect layer 1403 can facilitate electrical connection between devices mounted within the device mounting recess **1448*a* and other devices and connection points on the interposer. Patterned electrical interconnects 1435 are shown (in dotted lines) in the electrical interconnect layer 1403 below the device mounting recess 1448*a*. Additional steps not shown in Method 1310** may be required.

Alignment aids 1434 can facilitate the mounting and alignment of optical and optoelectrical devices within the device mounting cavity **1448*a* as shown, for example, for the alignment aids shown in the embodiment in FIG. 14C. In other embodiments, the alignment aids 1434 may not be included. The device mounting recess 1448*a* allows for the coupling of mounted devices on the interposer 1401 to patterned waveguides formed from the planar waveguide layer 1405 and to reflector structure 1406. In embodiments for which the alignment aids are not required, the steps for forming the buried hard mask 1416-1, as described for example, in FIGS. 12A and 12**B, are not required.

Figure 15A:
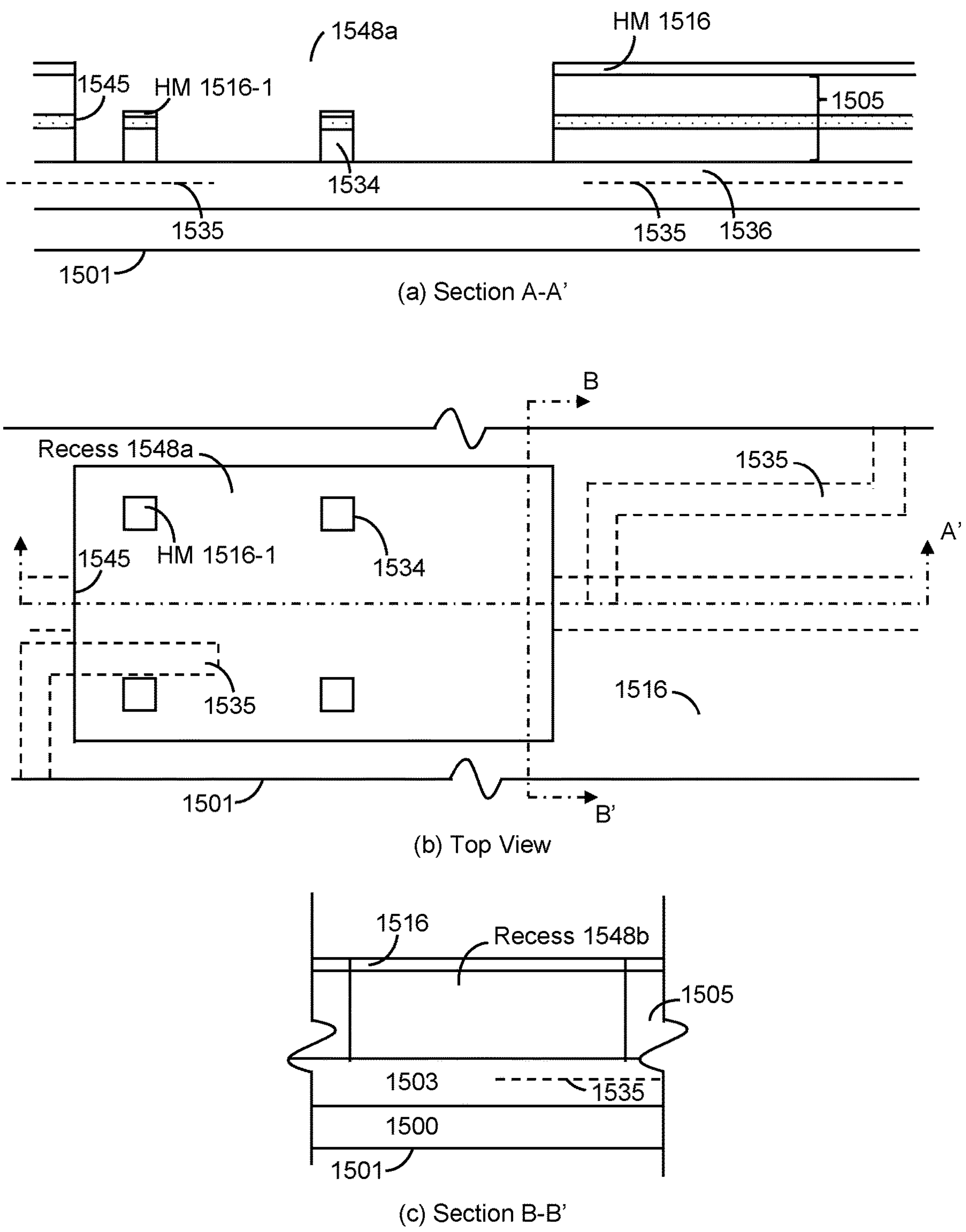
FIG. 15A shows an interposer as in FIG. 7A that further includes a buried hard mask for the formation of alignment aids shown after the formation of a hard mask layer and patterning step to form a recess having alignment aids: (a) Section A-A', (b) top view, and (c) Section B-B'. Embodiment shown does not include a pattern for forming a waveguide facet.
Figure 15B:
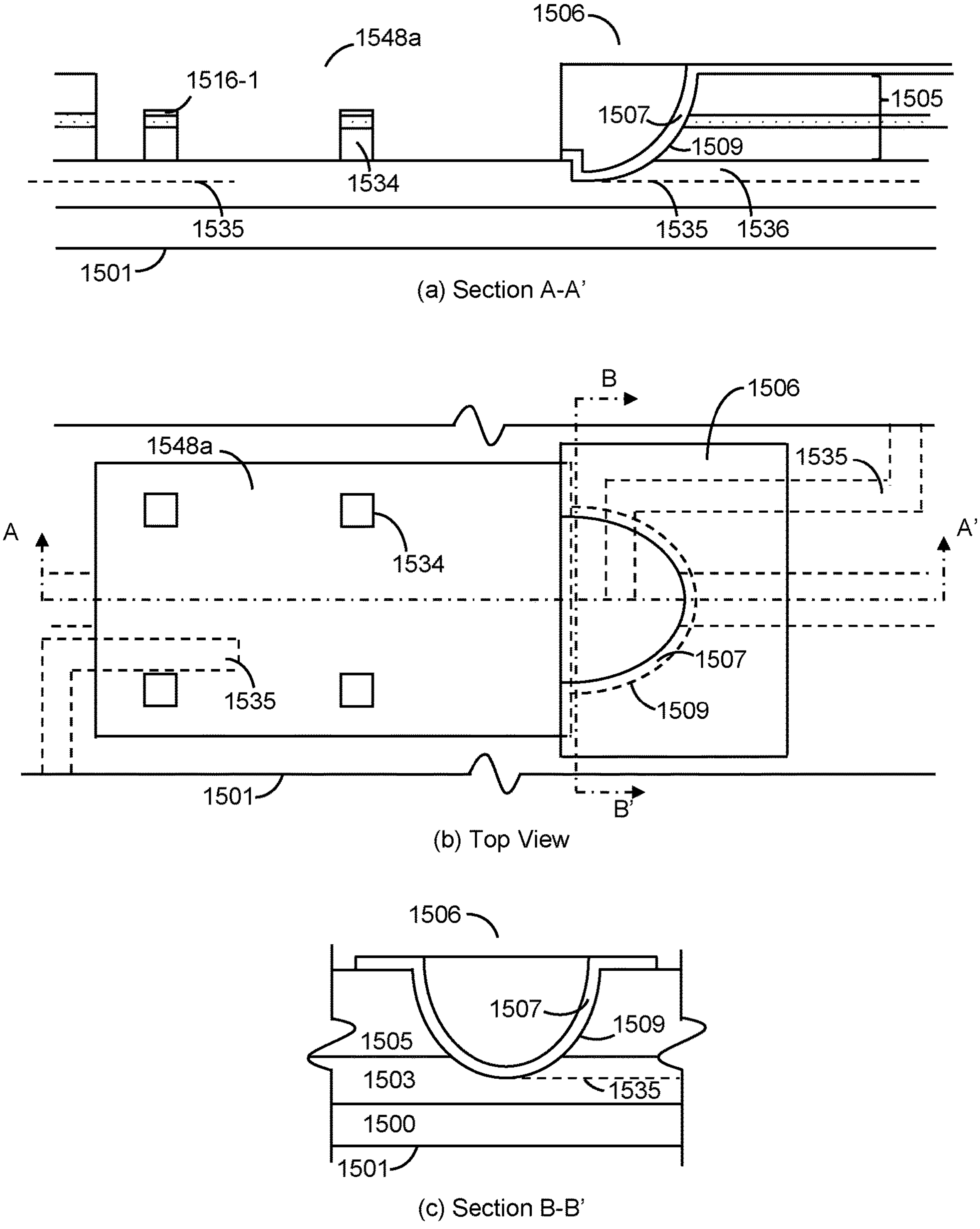
FIG. 15B shows an interposer as in FIG. 15A after formation of reflector cavity and the formation of a reflector layer on a reflector cavity shown facing a recess with alignment aids: (a) Section A-A' and (b) top view.

FIGS. 15A and 15B show yet another embodiment of a reflector structure 1506 on an interposer 1501 having a planar waveguide layer 1505 wherein the formation of the reflector structure 1506 uses aspects of the multiple masking process of Method 1010 and Method 1310. The embodiment shown in FIGS. 15A and 15B, as in the embodiment shown in FIGS. 14A-14C, includes a device mounting recess **1548*a* formed within the planar waveguide layer 1505 for mounting devices that intersect the axis of propagation of optical signals in the patterned planar waveguide layer 1505 of the interposer 1501. In the embodiment of FIGS. 15A and 15B, however, the portion of the planar waveguide layer 1405 for the embodiment of FIGS. 14A and 14B that remained between the device mounting recess 1448*a* and the waveguide facet recess 1448*b* after patterning is not present in the embodiment shown in FIGS. 15A and 15B. Device mounting recess 1548*a***, however, is present in the embodiment as shown.

Patterning of electrical interconnects 1535 in the underlying electrical interconnect layer 1503, can enable the formation of electrical connections to be formed between devices that are mounted in the device mounting recess **1548*a* and the patterned electrical interconnects 1535 in the electrical interconnect layer 1503. Bond pads, for example, may be formed between the electrical interconnects 1535 and the bottom of the cavity to which the electrical contacts of cavity-mounted devices may be soldered or otherwise connected. Optional electrical interconnects 1535 that enable contact to a reflective metallization layer as in other embodiments described in conjunction with FIGS. 7A-11**D are also shown.

FIGS. 15A(a) and 15A(b) show the device mounting recess **1548*a* having alignment aids 1534 following the Step 1310*s*3 of Method 1310. Step 1310*s*3 is a forming step in which a patterned hard mask layer is formed that includes an optional first patterned portion for forming a vertical facet through the planar waveguide layer and a second optional patterned portion for forming a recess, wherein the recess includes an optional buried patterned hard mask for forming alignment aids. The embodiment shown in FIG. 15A does not utilize the optional first patterned portion for forming a vertical facet through the planar waveguide in a recess as in 1448*b* but does utilize the optional buried patterned hard mask 1516-1 for forming alignment aids. It should be noted that a waveguide facet 1545 is formed at the side of the recess 1548*a*** opposite that to which the reflector will be formed.

FIG. 15A(c) shows a cross section, namely Section B-B' from the top view of FIG. 15A(b), taken from the recess 1548*a*.

FIG. 15B shows the embodiment from FIG. 15A after the formation of the reflector layer 1507 on curved surface 1509 to form the reflector structure 1506. Reflector structure 1506 faces the device mounting recess 1548*a* and enables optical coupling of devices mounted in the device mounting cavity 1548*a* to other devices receiving optical signals from, or sending optical signal to, the reflector surface layer 1507. Devices mounted in the device mounting cavity 1548*a* can be directly coupled to reflector structure 1506. In some embodiments, the alignment aids 1534 may not be present in the device mounting cavity 1548*a*.

In some embodiments, devices mounted within the device mounting recess 1548*a* are mounted on the alignment aids 1534. Mounting of receiving devices on alignment aids 1534, for example, can provide vertical alignment between an optical signal reflected from the reflector structure 1506 and the receiving aperture of a mounted receiving device on the alignment aids 1534. Alternatively, the mounting of emitting devices on alignment aids 1534, for example, can provide vertical alignment between an optical signal from the mounted emitting device on the alignment aids 1534 and a location on the reflector structure 1506 that provides high reflectivity and directionality for the emitted signals upon reflection.

Additionally, the use of alignment aids 1534 for the mounting of devices in the device mounting cavity 1548*a* can restrict the lateral movement of the mounted devices to facilitate alignment of the optical axes of the receiving or emitting apertures of mounted devices on the alignment aids 1534 with locations on the reflector structure 1506 that provide suitable signal reflection.

In some embodiments, the underlying electrical interconnect layer 1503 in substrate 1500 can facilitate electrical connection between devices mounted within the device mounting recess 1548*a* and other devices and connection points on the interposer. Patterned electrical interconnects 1535 in electrical interconnect layer 1503 are shown (in dotted lines) below the device mounting recess 1548*a* in FIGS. 15A and 15B. Additional steps not shown in Method 1310 may be required.

Alignment aids 1534 can facilitate the mounting and alignment of optical and optoelectrical devices within the device mounting cavity 1548*a* as shown, for example, in the embodiment in FIGS. 15A-15B. In other embodiments, the alignment aids 1534 may not be included. The device mounting recess 1548*a* allows for the coupling of mounted devices on the interposer 1501 to reflector structures 1506. In embodiments for which the alignment aids are not required, the steps for forming the buried hard mask 1516-1, as described for example, in FIG. 12, are not required.

Figure 16A:
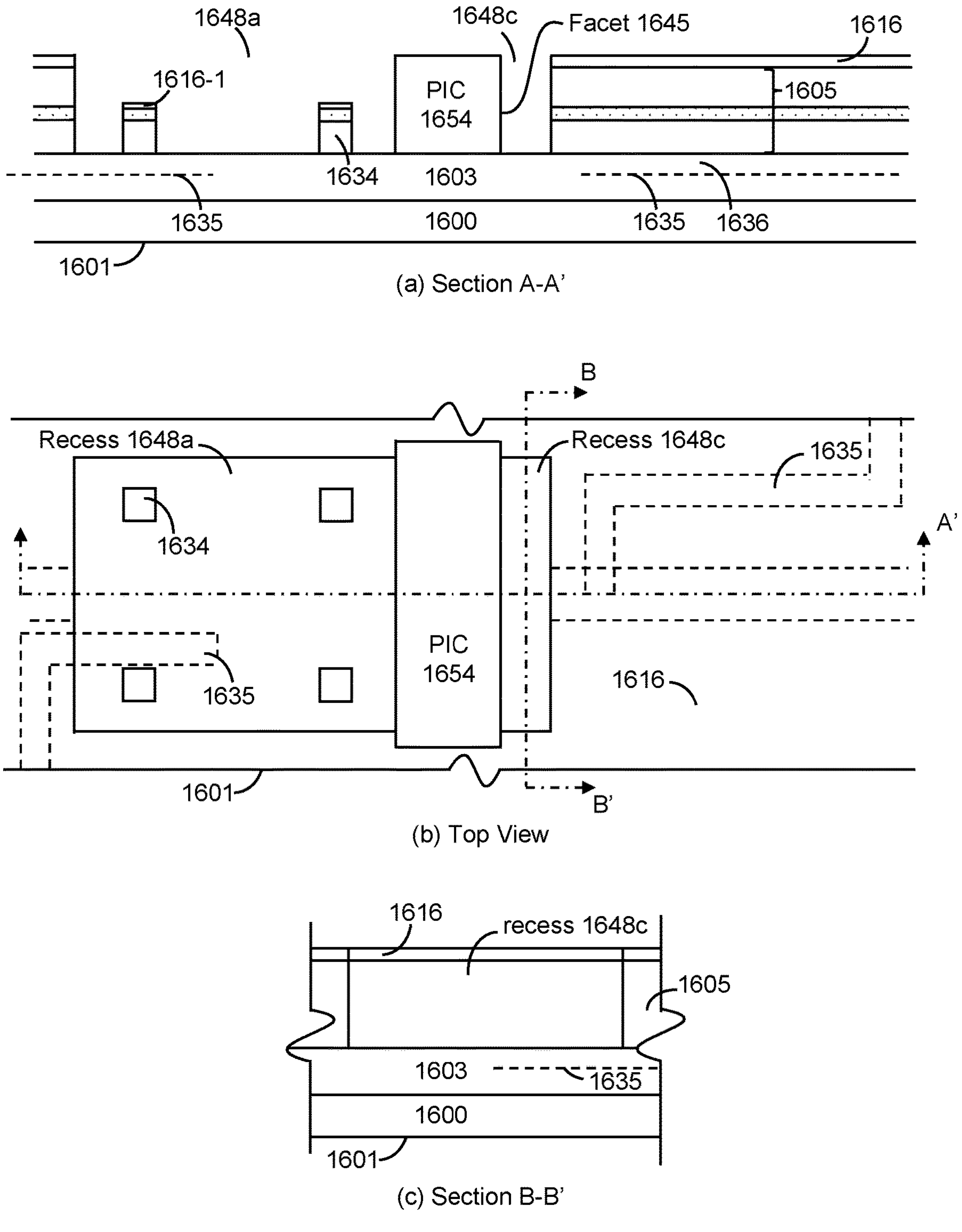
FIG. 16A shows an interposer as in FIG. 7A that further includes a buried hard mask for the formation of alignment aids shown after the formation of a hard mask layer and patterning step to form a recess having alignment aids: (a) Section A-A', (b) top view, and (c) Section B-B'. Embodiment shown includes all or a portion of a PIC.

FIGS. 16A and 16B show yet another embodiment of a reflector structure on an interposer having a planar waveguide layer wherein the formation of the reflector structure uses aspects of the multiple masking process of Method 1010 and Method 1310. The embodiment shown in FIGS. 16A and 16B, as in the embodiment shown in FIGS. 14A-14C, includes a device mounting recess formed within the planar waveguide layer for mounting devices that intersect the axis of propagation of optical signals in the planar waveguide layer on the interposer. In the embodiment of FIGS. 16A and 16B, however, all or a portion of a PIC 1654 is formed between the device mounting recess 1648*a* and reflector structure 1606.

Patterning of electrical interconnects 1635 in the underlying electrical interconnect layer 1603, can enable the formation of electrical connections to be formed between devices that are mounted in the device mounting recess 1648*a* and the patterned electrical interconnects 1635 in the electrical interconnect layer 1603. Bond pads, for example, may be formed between the electrical interconnects 1635 and the bottom of the cavity to which the electrical contacts of cavity-mounted devices may be soldered or otherwise connected. Optional electrical interconnects 1635 that enable contact to a reflective metallization layer are also shown as in other embodiments described in conjunction with FIGS. 7A-11D.

FIGS. 16A(a) and 16A(b) show the device mounting recess 1648*a* having alignment aids 1634 following the Step 1310*s*3 of Method 1310. Step 1310*s*3 is a forming step in which a patterned hard mask layer is formed that includes an optional first patterned portion for forming a vertical facet through the planar waveguide layer and a second optional patterned portion for forming a recess, wherein the recess includes an optional buried patterned hard mask for forming alignment aids. The embodiment shown in FIG. 16A may utilize or may not utilize the optional first patterned portion for forming a vertical facet through the planar waveguide and does utilize the optional buried patterned hard mask 1616-1 for forming alignment aids as shown. FIG. 16A shows patterned hard mask layer 1616 that includes a patterned portion for forming a vertical facet through the planar waveguide layer 1605 and a second optional patterned portion for forming a recess 1648*a*, wherein the recess includes an optional buried patterned hard mask 1616-1 for forming alignment aids.

PIC 1654 is shown in FIG. 16A(a) and FIG. 16A(b). PIC 1654 can be a waveguide (as in the embodiment shown in FIG. 14). PIC 1654 can be a lens. PIC 1654 can be any optical or optoelectrical component or combination of optical and optoelectrical components for the transfer, propagation, reflection, detection, emission, characterization, coupling, or processing of optical signals. PIC 1654 may be one or more devices.

FIG. 16A(c) shows a cross section, namely Section B-B' from the top view of FIG. 16A(b), taken through the recess 1648*a*.

FIG. 16B shows the embodiment from FIG. 16A after the formation of the reflector layer 1607 on curved surface 1609 in waveguide layer 1605 to form the reflector structure 1606 as, for example, following Step 1310*s*8 of Method 1310. Reflector structure 1606 faces one or more devices of the PIC 1654 and enables optical coupling of one or more devices of the PIC 1654 to other devices receiving optical signals from, or sending optical signal to, the reflector surface layer 1607. Devices in the PIC 1654 can be directly coupled to reflector structure 1606.

FIG. 16B also shows the device mounting recess 1648*a*. In the embodiment, recess 1648*a* shows alignment aids 1634 that enable the mounting and alignment of devices that may be optically coupled to the reflector structure 1606 through all or a portion of PIC 1654.

Recess 1648*c*, also shown in the embodiment in FIGS. 16A(a) and 16A(b), may facilitate the formation of the reflector cavity and enable improved coupling between the PIC 1654 and the reflector structure 1606 in some embodiments.

In some embodiments, devices mounted within the device mounting recess 1648*a* are mounted on the alignment aids 1634. Mounting of receiving devices on alignment aids 1634, for example, can provide vertical alignment between an optical signal from all or a portion of PIC 1654 and the optical axis or receiving aperture of the receiving device mounted on the alignment aids 1634.

Alternatively, the mounting of emitting devices on alignment aids 1634, for example, can provide vertical alignment between an optical signal from all or a portion of the PIC 1654 and the optical axis or emitting aperture of the emitting device mounted on the alignment aids 1634.

Additionally, the use of alignment aids 1634 for the mounting of devices in the device mounting cavity 1648*a* can restrict the lateral movement of the mounted devices to facilitate alignment of the optical axes of the receiving or emitting apertures of mounted devices on the alignment aids 1634 with coupling locations on all or a portion of the PIC 1654

In some embodiments, the underlying electrical interconnect layer 1603 on substrate 1600 may facilitate electrical connection between devices mounted within the device mounting recess 1648*a* and other devices and connection points on the interposer. Patterned electrical interconnects 1635 in electrical interconnect layer 1603 are shown (in dotted lines) in the electrical interconnect layer below the device mounting recess 1648*a* in FIGS. 16A and 16B. Additional steps not shown in Method 1310 may be required. Optional electrical interconnects 1635 that enable contact to a reflective metallization layer as in other embodiments described in conjunction with FIGS. 7A-11D are also shown.

Alignment aids 1634 can facilitate the mounting and alignment of optical and optoelectrical devices within the device mounting cavity 1648*a* as shown, for example, in the embodiment in FIGS. 16A and 16B. In other embodiments, the alignment aids 1634 may not be included. The device mounting recess 1648*a* allows for the coupling of mounted devices on the interposer 1601 to reflector structures 1606 through all or a portion of the PIC 1654. In embodiments for which the alignment aids are not required, the steps for forming the buried hard mask 1616-1, as described, for example, in FIGS. 12A and 12B may not be required.

For the embodiments shown in FIGS. 14A-16C, two distinct masking and patterning steps are used in the formation of device mounting recesses formed on the interposer as described in Method 1310. The formation and inclusion of the device mounting recesses enables the mounting and alignment of devices used in conjunction with embodiments of the reflector described herein.

It should be noted that the waveguide facets, such as for example, facet 1445, 1545, and others, may not be formed with the flat, vertical surface, as depicted in the drawings, but rather may be angled or otherwise shaped to facilitate improved coupling or improved focusing of the optical signals between the facet and a coupled reflector structure. Angled surfaces relative to the direction of propagation may be incorporated in some embodiments, for example, to reduce back reflection into a mounted emitting device such as a laser. The facets may also be formed with convex or concave shapes to facilitate improved coupling, for example, between the output of a waveguide and an embodiment of a reflector structure.

Assemblies

Figure 17A:
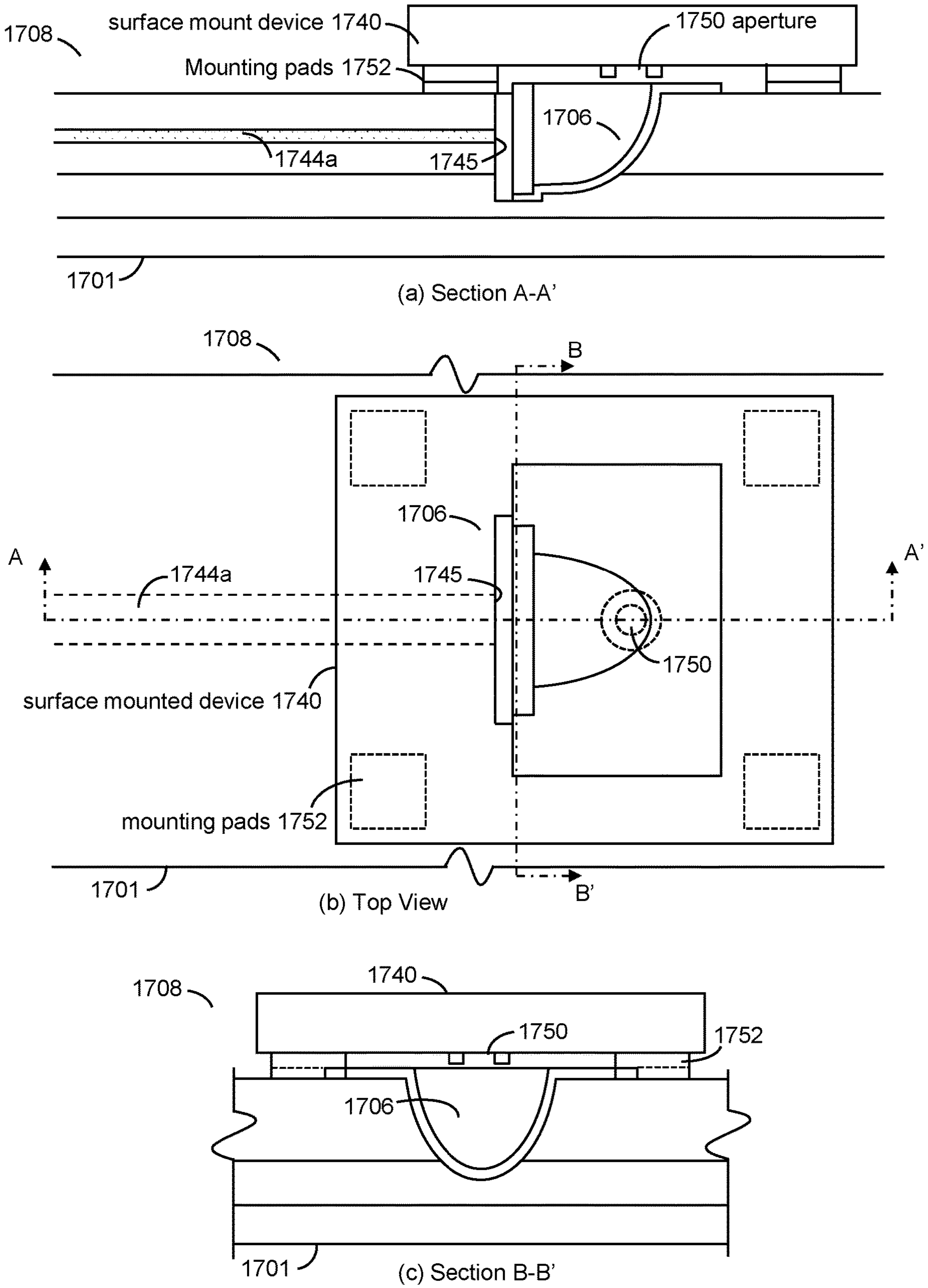
FIG. 17A shows an interposer with a mounted device over an embodiment of a reflector structure for a mounted device having an aperture positioned at a focal point of the reflected signal: (a) Section A-A', (b) top view, and (c) Section B-B'.

FIG. 17A shows an embodiment of a reflector structure 1706 formed on an interposer 1701 in an assembly 1708 that also includes a surface-mounted device 1740. Surface-mounted device 1740 may be a receiving device or an emitting device. For embodiments in which the surface-mounted device 1740 is a receiving device, the reflector structure 1706 shown in FIG. 17A is configured to receive an incoming signal from planar waveguide 1744*a* and the surface-mounted receiving device 1740 is positioned to receive a focused outgoing optical signal from reflector structure 1706. For embodiments in which the surface-mounted device 1740 is an emitting device, the reflector structure 1706 shown in FIG. 17A is configured to receive an incoming signal from the surface-mounted emitting device and planar waveguide 1744*a* is formed in a position to receive a focused outgoing optical signal from reflector structure 1706. FIG. 17A(a) shows a cross sectional schematic view of the interposer structure with the embodiment of the reflector structure 1706. FIG. 17A(b) shows a top view and FIG. 17A(c) shows an end view of this interposer structure with the mounted receiving device 1740.

In FIGS. 17A(a)-FIG. 17A(c), surface-mounted device 1740 is positioned on the interposer 1701 on mounting pads 1752 such that aperture 1750 can receive a focused or otherwise narrowed outgoing optical signal from the reflector structure 1706 for embodiments in which the surface-mounted device 1740 is a receiving device. The ingoing optical signal to the reflector structure 1706, in the embodiment shown, exits the facet 1745 of the planar waveguide 1744*a*, is first incident on the reflector structure 1706, and upon reflection, the outgoing signal from the reflector is focused or otherwise narrowed upon reflection and couples to all or a portion of the area covered by the aperture 1750 of the surface-mounted device 1740.

Conversely, surface-mounted devices 1740 that are emitting devices can emit an incoming optical signal to the reflector structure 1706 from an aperture 1750, or other form of coupling feature, and upon reflection, the outgoing signal from the reflector structure 1706 is coupled to the end facet 1745 of the planar waveguide layer 1744*a* for the embodiments shown. In other embodiments for which the surface-mounted device 1740 is an emitting device, the outgoing signal may be coupled to a mounted receiving device. And in other embodiments for which the surface-mounted device is an emitting device, the outgoing signal from the reflector may be coupled to all or a portion of a PIC, for example, as further described herein.

Figure 17B:
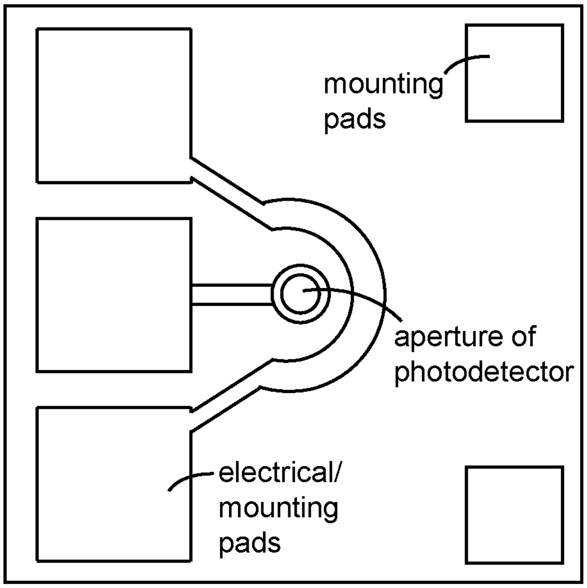
FIG. 17B shows an example of a surface-mounted device having an aperture for a receiving device such as a photodiode and for an emitting device such as a vertical-cavity surface-emitting laser (VCSEL).

FIG. 17B shows a bottom view of an example surface-mounted device 1740 that is a surface-mounted photodiode. Surface-mounted photodiodes may have, for example, mounting pads for mechanical support and attachment to an interposer, electrical pads for forming electrical connections between the surface-mounted device and electrical contacts on the interposer, and an aperture for coupling an optical signal to the photodiode. A collecting aperture on a photodiode, for example, provides an interface for receiving an optical signal. The photodiode converts the received optical signal to an electrical signal for further processing. Focusing of an incoming beam to the aperture of a photodiode receiving device is beneficial given the limited size of the collecting area within the aperture. Emitting devices such as surface-mounted vertical-cavity surface-emitting lasers (VCSEL) also have, or may have, mounting pads, electrical pads or other forms or electrical connections, and a circular aperture for coupling optical signals from the laser. For a VCSEL, the aperture is an emitting aperture through which an optical signal emerges from the device upon conversion from an electrical signal. Focusing of the emerging signal from the aperture of the VCSEL can be beneficial for minimizing signal loss when coupled, for example, to other devices.

Figure 18A:
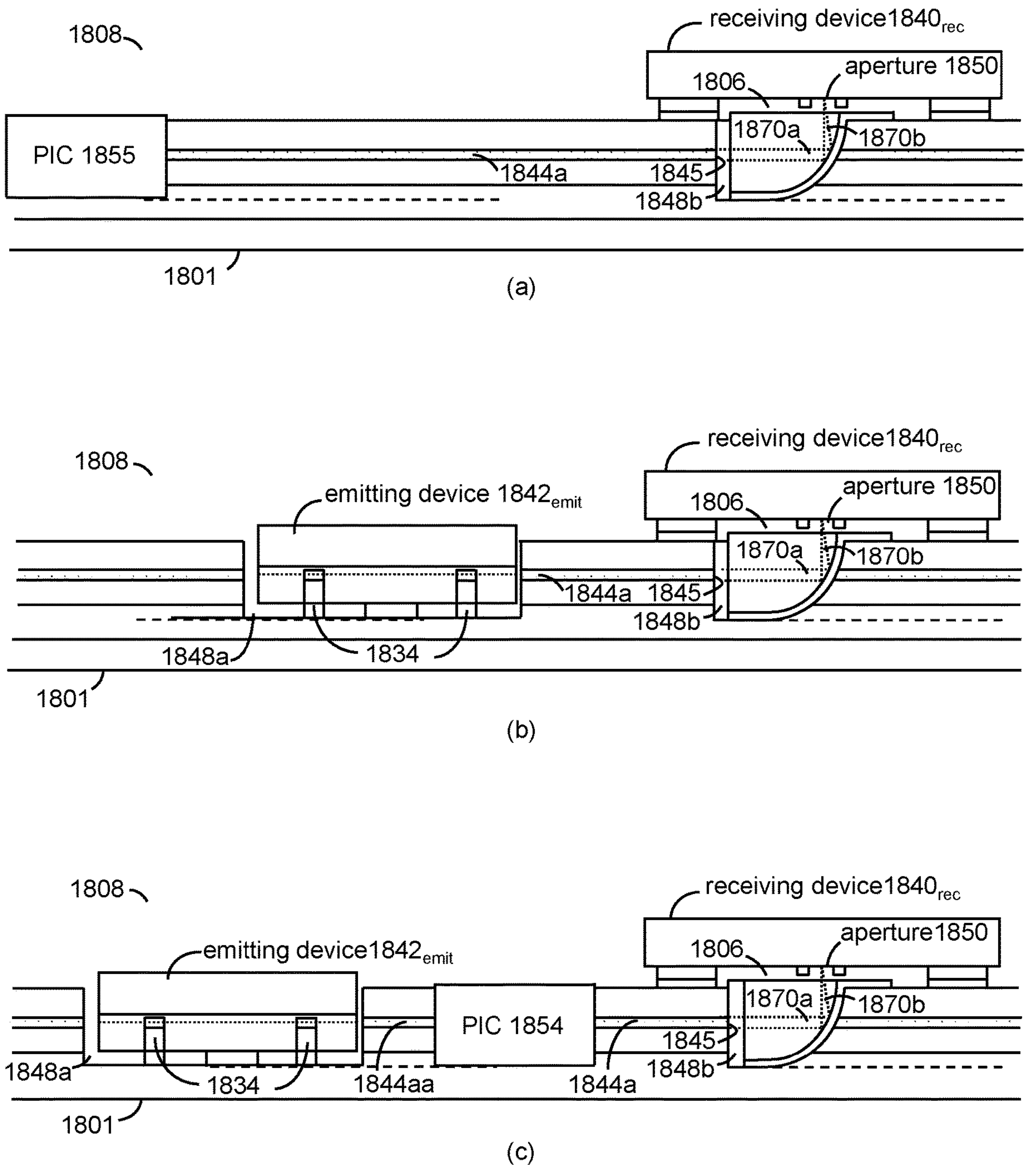
FIG. 18A shows embodiments of a reflector in assemblies configured to receive an incoming optical signal from a planar waveguide: (a) for an assembly that includes all or a portion of a PIC and with outgoing signal coupled to a surface-mounted receiving device, (b) for an assembly that includes a mounted emitting device (optionally on alignment aids) and with outgoing signal coupled to a surface-mounted receiving device, and (c) for an assembly that includes a mounted emitting device (optionally on alignment aids) and all or a portion of a PIC and with outgoing signal coupled to a surface-mounted receiving device.

FIGS. 18A(a)-18A(c) show embodiments of reflector structure 1806 in assemblies 1808 configured as shown in FIG. 1A to receive ingoing optical signals 1870*a* from a waveguide facet 1845 formed from a patterned planar waveguide 1844*a* and to reflect the optical signal from the patterned planar waveguide 1844*a* to the aperture 1850 of a surface-mounted device.

FIG. 18A(a) shows an embodiment of reflector structure 1806 in an assembly 1808 configured to receive an incoming optical signal 1870*a* from a patterned planar waveguide 1844*a* and to reflect the optical signal to the aperture 1850 of a surface-mounted receiving device 1840$_{rec}$. Patterned planar waveguide 1844*a* may be, for example, a portion of PIC 1855 in the embodiment. An optical signal propagating in patterned planar waveguide 1844*a* is coupled to the reflector structure 1806 through the waveguide facet 1845, in the embodiment shown, and through the waveguide facet recess 1848*b*. Beam focusing of the outgoing signal 1870*b* from the reflector structure 1806 to the aperture 1850 of the surface-mounted receiving device 1840$_{rec}$ is illustrated in FIG. 18A(a). In some assemblies 1808, surface-mounted receiving device 1840$_{rec}$ is positioned such that the receiving aperture 1850 is at or near a focal point of the reflected outgoing signal 1870*b*. In some assemblies, receiving aperture 1850 of the surface-mounted device 1840$_{rec}$ is positioned to receive a reflected optical signal 1870*b* that is narrowed or otherwise focused after reflection from reflector structure 1806 having beam-narrowing surface curvature.

FIG. 18A(b) shows an embodiment of reflector structure 1806 in an assembly 1808 configured to receive an incoming optical signal 1870*a* from a patterned planar waveguide 1844*a* and to reflect the optical signal to the aperture 1850 of surface-mounted receiving device 1840$_{rec}$. In the embodiment shown in FIG. 18A(b), optical signal 1870*a* is coupled to the patterned planar waveguide 1844*a* from a cavity-mounted emitting device 1842$_{emit}$. Patterned planar waveguide 1844*a* couples incoming optical signal 1870*a* from cavity-mounted emitting device 1842$_{emit}$ mounted in device mounting recess 1848*a*, in the embodiment, through the waveguide facet 1845 of the patterned planar waveguide 1844*a* and through the waveguide facet recess 1848*b* to reflector structure 1806. Beam focusing of the outgoing signal 1870*b* from the reflector structure 1806 to the aperture 1850 of the surface-mounted receiving device 1840$_{rec}$ is illustrated in FIG. 18A(b). In some assemblies, the surface-mounted receiving device 1840$_{rec}$ is positioned such that the receiving aperture 1850 is at or near a focal point of the reflected outgoing signal 1870*b*. In some assemblies, receiving aperture 1850 of the surface-mounted device 1840$_{rec}$ is positioned to receive a reflected optical signal 1870*b* that is narrowed or otherwise focused after reflection from reflector structure 1806 having beam-narrowing surface curvature.

FIG. 18A(c) shows an embodiment of reflector structure 1806 in an assembly 1808 configured to receive an incoming optical signal 1870*a* from a patterned planar waveguide 1844*a* and to reflect the optical signal to the aperture 1850 of surface-mounted receiving device 1840$_{rec}$. In the embodiment shown in FIG. 18A(c), optical signal 1870*a* is coupled to the patterned planar waveguide 1844*a* from a cavity-mounted emitting device 1842$_{emit}$ and from all or a portion of a PIC 1854. Patterned planar waveguide 1844*a* couples incoming optical signal 1870*a* from cavity-mounted emitting device 1842$_{emit}$ mounted in device mounting recess 1848*a*, in the embodiment, to all or a portion of PIC 1854 and from the all or a portion of the PIC 1854 through the waveguide facet 1845 of the patterned planar waveguide 1844*a* and through the waveguide facet recess 1848*b* to reflector structure 1806. Beam focusing of the outgoing signal 1870*b* from the reflector structure 1806 to the aperture 1850 of the surface-mounted receiving device 1840$_{rec}$ is illustrated in FIG. 18A(c). In some assemblies, surface-mounted receiving device 1840$_{rec}$ is positioned such that the receiving aperture 1850 is at or near a focal point of the reflected outgoing signal 1870*b*. In some assemblies, receiving aperture 1850 of surface-mounted device 1840$_{rec}$ is positioned to receive a reflected optical signal 1870*b* that is narrowed or otherwise focused after reflection from reflector structure 1806 having beam-narrowing surface curvature.

Cavity-mounted emitting devices 1842$_{emit}$, in some embodiments, are mounted or otherwise formed on alignment aids 1834 as shown for example in FIGS. 18A(b) and 18A(c).

Figure 18B:
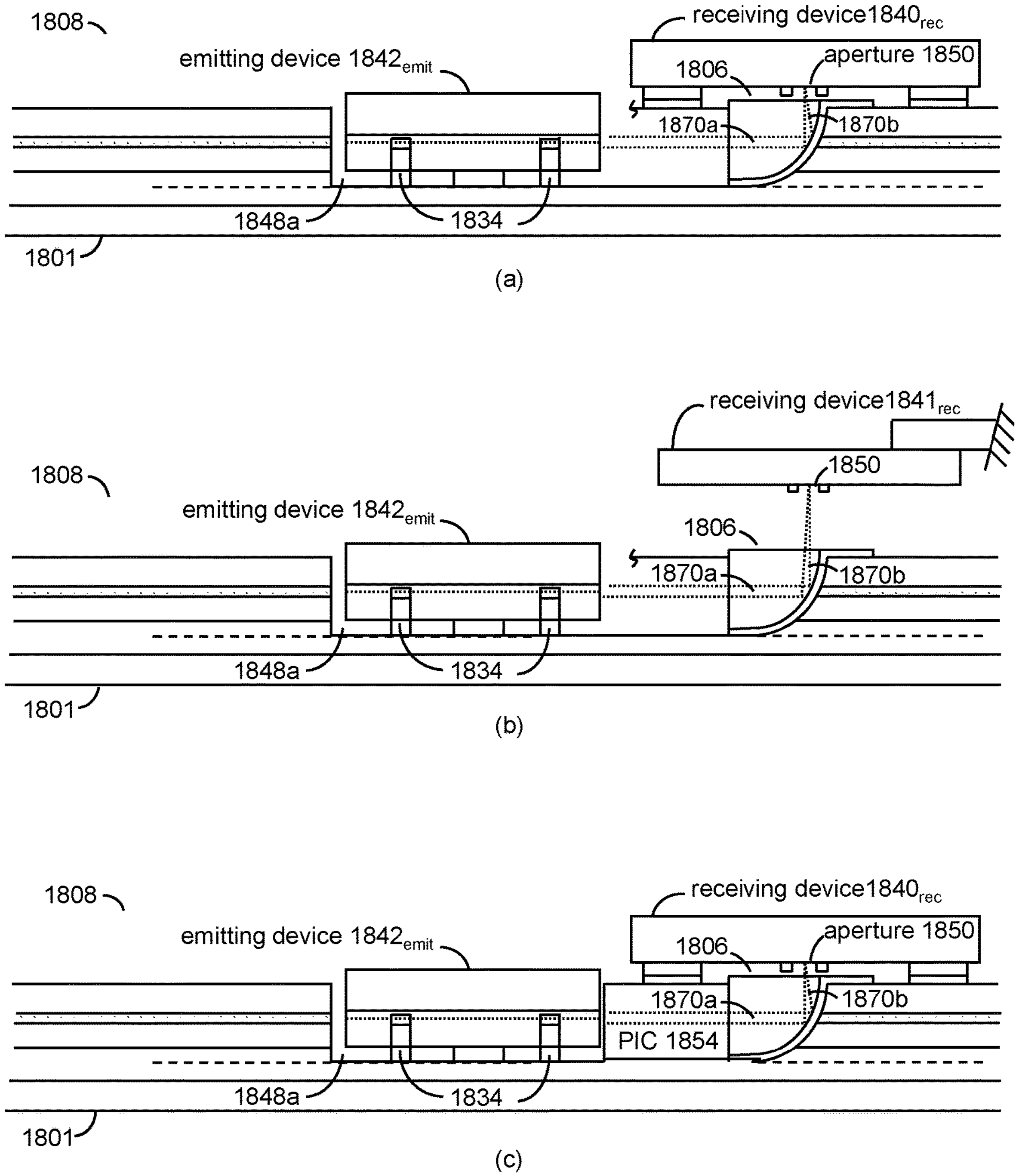
FIG. 18B shows embodiments of a reflector in assemblies configured (a) to receive an incoming optical signal from a mounted emitting device (optionally on alignment aids) and with outgoing signal coupled to a surface-mounted receiving device, (b) to receive an incoming optical signal from a mounted emitting device on alignment aids and with outgoing signal coupled to a remotely mounted receiving device, and (c) to receive an incoming optical signal from a mounted device (optionally on alignment aids) for an assembly that includes all or a portion of a PIC and with outgoing signal coupled to a surface-mounted receiving device.

FIGS. 18B(a)-18B(c) show embodiments of reflector structure 1806 in assemblies 1808 configured to receive ingoing optical signals 1870*a* from a cavity-mounted device 1842$_{emit}$ optionally mounted or otherwise formed on alignment aids 1834 in device mounting recess 1848*a*, and to reflect the optical signal from the cavity-mounted device to the aperture 1850 of a surface-mounted receiving 1840 or to a remotely mounted device positioned above the reflector structure 1806. In some embodiments, the cavity-mounted device on alignment aids is coupled through all or a portion of a PIC that resides between cavity-mounted device recess 1848*a* and reflector structure 1806.

FIG. 18B(a) shows an embodiment of reflector structure 1806 in an assembly 1808 configured to receive an ingoing optical signal 1870*a* from a cavity-mounted emitting device 1842$_{emit}$ optionally mounted on alignment aids 1834 and to reflect the optical signal to the aperture 1850 of a surface-mounted receiving device 1840$_{rec}$. Cavity-mounted emitting device 1842$_{emit}$ may be, for example, a ridge waveguide laser, a buried heterostructure laser, or other form of device capable of providing an optical signal to the reflector structure 1806. An optical signal 1870*a* from mounted emitting device 1842$_{emit}$ is coupled to the reflector structure 1806, in the embodiments shown, through device mounting recess 1848*a*. Beam focusing of the outgoing signal 1870*b* from the reflector structure 1806 to the aperture 1850 of surface-mounted receiving device 1840$_{rec}$ is illustrated in FIG. 18B(a). In some assemblies, surface-mounted receiving device 1840$_{rec}$ is positioned such that the receiving aperture 1850 is at or near a focal point of the reflected outgoing signal 1870*b*. In some assemblies, receiving aperture 1850 of the surface-mounted device 1840$_{rec}$ is positioned to receive a reflected optical signal 1870*b* that is narrowed or otherwise focused after reflection from reflector structure 1806 having beam-narrowing surface curvature.

FIG. 18B(b) shows an embodiment of reflector structure 1806 in an assembly 1808 configured to receive an ingoing optical signal 1870*a* from a cavity-mounted emitting device 1842$_{emit}$ optionally mounted on alignment aids 1834, and to reflect the optical signal to aperture 1850 of remotely mounted receiving device 1841$_{rec}$. Cavity-mounted emitting device 1842$_{emit}$ may be, for example, a ridge waveguide laser, a buried heterostructure laser, or other form of device capable of providing an optical signal to the reflector. An optical signal 1870*a* from mounted emitting device 1842$_{emit}$ is coupled to the reflector structure 1806, in the embodiments shown, through device mounting recess 1848*a*. Beam focusing of the outgoing signal 1870*b* from the reflector structure 1806 to the aperture 1850 of remotely mounted receiving device 1841$_{rec}$ is illustrated in FIG. 18B(b). In the embodiment, the optical signal is coupled to a remotely mounted receiving device 1841$_{rec}$, which may be, for example, a photodiode or other form of photodetector, photosensor, or photoreceptive device. Receiving device 1841$_{rec}$, may be remotely mounted, for example, in multichip assemblies, assemblies for which the interposer 1801 is portion of a larger device or network of devices, and assemblies used for device testing, among other assemblies. In some assemblies 1808, remotely mounted receiving device 1841$_{rec}$ is positioned such that the receiving aperture 1850 is at or near a focal point of the reflected outgoing signal 1870*b*. In some assemblies 1808, receiving aperture 1850 of the remotely mounted device 1841$_{rec}$ is positioned to receive a reflected optical signal 1870*b* that is narrowed or otherwise focused after reflection from reflector structure 1806 having beam-narrowing surface curvature.

FIG. 18B(c) shows an embodiment of reflector structure 1806 in an assembly 1808 configured to receive an incoming optical signal 1870*a* from all or a portion of a PIC 1854 or an element of a PIC 1854 and to reflect the optical signal to the aperture 1850 of surface-mounted receiving device 1840$_{rec}$. In the embodiment shown in FIG. 18B(c), optical signal 1870*a* is coupled to all or a portion of PIC 1854 or an element of PIC 1854 from a cavity-mounted emitting device 1842$_{emit}$. The cavity-mounted emitting device 1842$_{emit}$ may be, for example, a ridge waveguide laser, a buried heterostructure laser, or other form of device capable of providing an optical signal to the reflector structure 1806. PIC 1854 may be a lens, a spot size converter, an optical or optoelectrical device, or all or a portion of a PIC or a component of a PIC that can facilitate coupling of the outgoing signal from the cavity-mounted emitting device 1842$_{emit}$ to the reflector structure 1806. An optical signal 1870*a* from the cavity-mounted emitting device 1842$_{emit}$ is coupled to the reflector structure 1806 through the all or a portion of PIC 1854 and through device mounting recess 1848*a*, if present. Beam focusing of the outgoing signal 1870*b* from the reflector structure 1806 to the aperture 1850 of surface-mounted receiving device 1840$_{rec}$ is illustrated in FIG. 18B(c). In some assemblies 1808, surface-mounted receiving device 1840$_{rec}$ is positioned such that the receiving aperture 1850 is at or near a focal point of the reflected outgoing signal 1870*b*. In some assemblies 1808, receiving aperture 1850 of the surface-mounted device 1840$_{rec}$ is positioned to receive a reflected optical signal 1870*b* that is narrowed or otherwise focused after reflection from reflector structure 1806 having beam-narrowing surface curvature.

In other embodiments for which a cavity-mounted emitting device 1842$_{emit}$ is coupled through a PIC 1854 to reflector structure 1806, remotely mounted receiving device 1841$_{rec}$ is configured to receive the outgoing signal from the reflector structure 1806 rather than the surface-mounted receiving device 1840$_{rec}$ in the configuration shown in FIG. 18B(c).

Figure 19A:
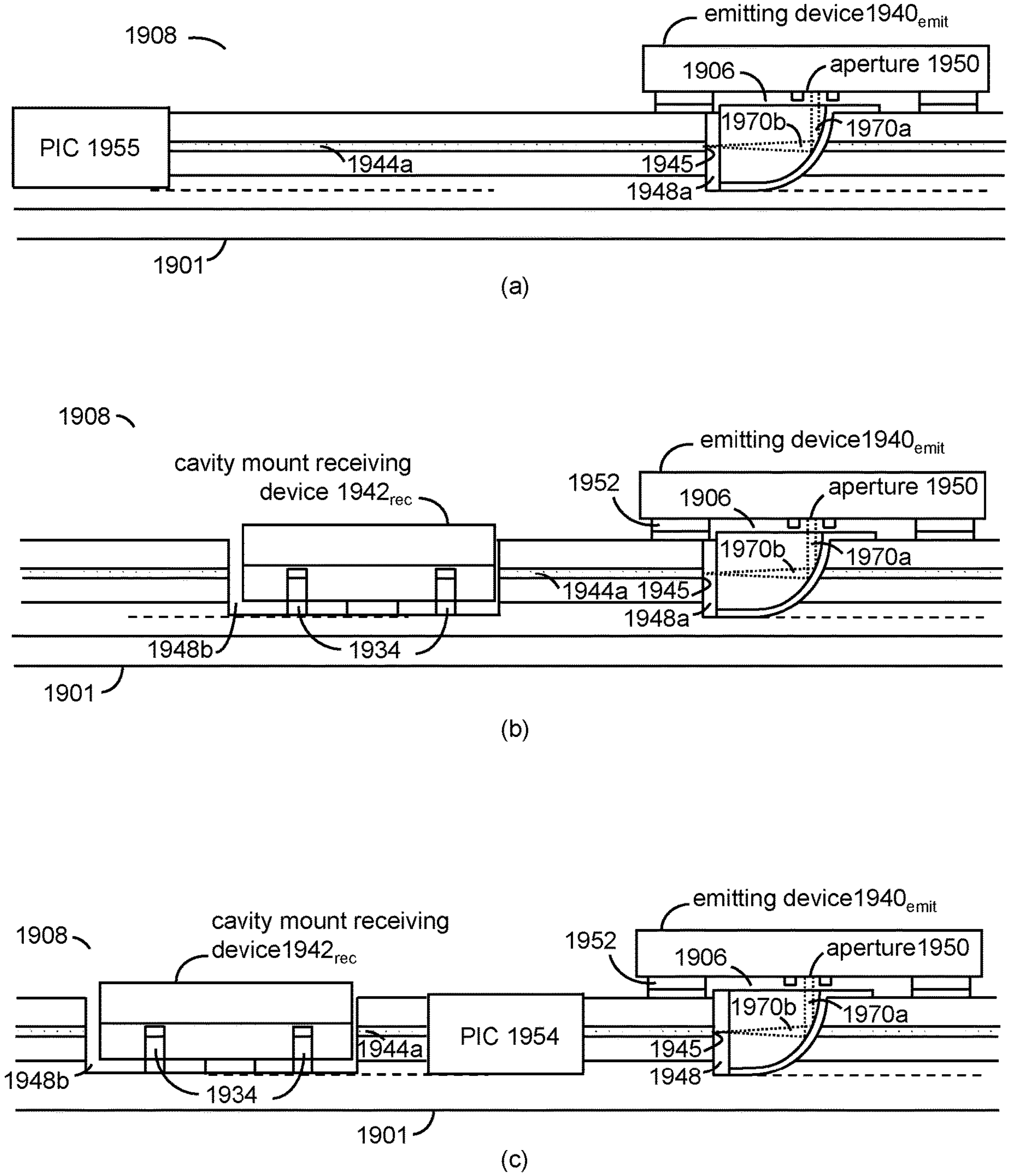
FIG. 19A shows embodiments of a reflector in assemblies configured to receive an incoming optical signal from above the reflector, (a) for an assembly with ingoing signal from a surface-mounted emitting device and with outgoing signal coupled to a planar waveguide layer and all or a portion of a PIC, (b) for an assembly with ingoing signal from a surface-mounted emitting device and with outgoing signal coupled to a planar waveguide layer and that includes a mounted receiving device (optionally on alignment aids), and (c) for an assembly with ingoing signal from a surface-mounted emitting device and with outgoing signal coupled to a planar waveguide layer and that includes all or a portion of a PIC and a mounted receiving device (optionally on alignment aids).
Figure 19B:
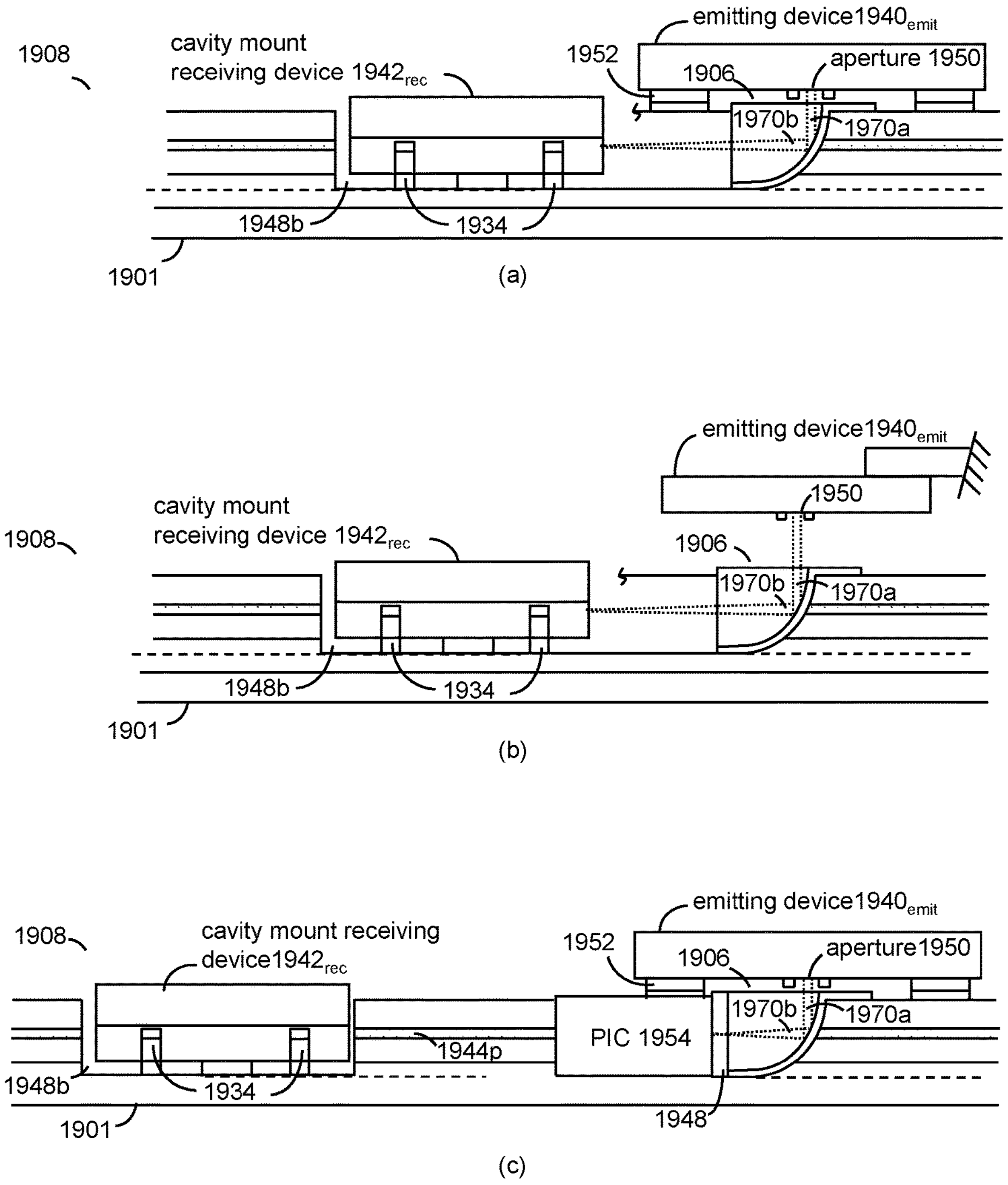
FIG. 19B shows embodiments of a reflector in assemblies configured to receive an incoming optical signal from above the reflector, (a) for an assembly with an incoming optical signal from a surface-mounted emitting device and with outgoing signal coupled to a mounted receiving device (optionally on alignment aids), (b) for an assembly with an incoming optical signal from a remotely mounted emitting device and with outgoing signal coupled to a mounted receiving device (optionally on alignment aids), and (c) for an assembly with an incoming optical signal from a surface-mounted receiving device and with outgoing signal coupled to all or a portion of a PIC and that includes a mounted receiving device (optionally on alignment aids).

In yet other embodiments, further described in FIGS. 19A and 19B, incoming optical signals are provided from a surface-mounted emitting device and in yet other embodiments, from a remotely mounted emitting device.

FIGS. 19A(a)-19A(c) show embodiments of reflector structure 1906 in assemblies 1908 configured to receive ingoing optical signals 1970*a* from a surface-mounted emitting device 1940$_{emit}$ and to reflect the optical signal into a waveguide facet 1945 formed from patterned planar waveguide 1944*a*

FIG. 19A(a) shows an embodiment of reflector structure 1906 in an assembly 1908 configured to receive an incoming optical signal 1970*a* from a surface-mounted emitting device 1940$_{emit}$ and to reflect the optical signal to a waveguide facet 1945 of patterned planar waveguide 1944*a*. Patterned planar waveguide 1944*a* may be a portion of a PIC 1955 in embodiments. An optical signal emitted from aperture 1950 of the surface-mounted emitting device 1940$_{emit}$ is coupled to the reflector structure 1906 and upon reflection, the optical signal is focused or otherwise narrowed. The narrowed beam is incident on waveguide facet 1945 of the patterned planar waveguide 1944*a*. In some embodiments, the waveguide facet 1945 may be shaped to facilitate improved receptivity of the optical signal into the waveguide 1944*a*. In other embodiments, the waveguide facet may be coated to improve the receptivity of the optical signal into the waveguide 1944*a*. And in yet other embodiments, the reflector cavity may be filled with an index-of-refraction-matching dielectric or other material to reduce reflection and to facilitate receptivity of the optical signal into the waveguide 1944*a*. Beam focusing of the outgoing signal 1970*b* from the reflector structure 1906 to the waveguide facet 1945 is illustrated in FIG. 19A(a). In some embodiments, the waveguide facet 1945 is positioned at or near a focal point of the reflected signal 1970*b* from the reflector structure 1906. In some assemblies 1908, the waveguide facet 1945 of the planar waveguide layer 1905 of interposer 1901 is positioned such that a narrowed or otherwise focused beam is incident on the waveguide facet 1945 after reflection. Surface-mounted emitting device 1940$_{emit}$ is configured to provide suitable coupling between the aperture 1950 and the reflector structure 1906.

FIG. 19A(b) shows an embodiment of reflector structure 1906 in an assembly 1908 configured to receive an incoming optical signal 1970*a* from a surface-mounted emitting device 1940$_{emit}$ and to reflect the optical signal to a waveguide facet 1945 of planar waveguide 1944*a*. In the embodiment shown in FIG. 19A(b), reflected outgoing optical signal 1970*b* is coupled to the waveguide facet 1945 of the patterned planar waveguide 1844*a* and further coupled from the patterned planar waveguide 1944*a* to a cavity-mounted receiving device 1942$_{rec}$ optionally formed or otherwise mounted on alignment aids 1934 formed on the interposer 1901. An optical signal 1970*a* emitted from aperture 1950 of the surface-mounted emitting device 1940$_{emit}$ is coupled to the reflector structure 1906 and upon reflection, the optical signal is focused or otherwise narrowed. The narrowed reflected beam 1970*b* is incident on waveguide facet 1945 of the patterned planar waveguide 1944*a* and coupled through the patterned planar waveguide 1944*a* to the cavity-mounted receiving device 1942$_{rec}$. In some embodiments, the waveguide facet 1945 may be shaped to facilitate improved receptivity of the reflected optical signal 1970*b* into the waveguide 1944*a*. In other embodiments, the waveguide facet 1945 may be coated to improve the receptivity of the optical signal into the waveguide 1944*a*. And in yet other embodiments, the reflector cavity may be filled with an index-of-refraction-matching dielectric or other material to reduce reflection and to facilitate receptivity of the optical signal into the waveguide 1944*a*. Beam focusing of the outgoing signal 1970*b* from the reflector structure 1906 to the waveguide facet 1945 is illustrated in FIG. 19A(b). In some embodiments, the waveguide facet 1945 is positioned at or near a focal point of the reflected signal 1970*b*. In some assemblies 1908, the waveguide facet 1945 is positioned such that a narrowed or otherwise focused beam is incident on the waveguide facet 1945 after reflection. Surface-mounted emitting device 1940$_{emit}$ is configured to provide suitable coupling between the aperture 1950 and the reflector structure 1906. In some embodiments, the cavity-mounted receiving device 1942$_{rec}$ is mounted or otherwise formed on alignment aids 1934. In other embodiments, the alignment aids 1934 may not be present.

FIG. 19A(c) shows an embodiment of reflector structure 1906 in an assembly 1908 configured to receive an incoming optical signal 1970*a* from a surface-mounted emitting device $\mathbf{1940}_{emit}$ and to reflect the optical signal to a waveguide facet 1945 of planar waveguide 1944*a*. In the embodiment shown in FIG. 19A(c), reflected outgoing optical signal 1970*b* from the reflector structure 1906 is coupled to the waveguide facet 1945 of the patterned planar waveguide 1944*a* and further coupled from the patterned planar waveguide 1944*a* to all or a portion of PIC 1954 or an element of a PIC 1954 and further coupled to a cavity-mounted receiving device $\mathbf{1940}_{rec}$ optionally formed or otherwise mounted on alignment aids 1934 formed on the interposer 1901. An optical signal emitted from aperture 1950 of the surface-mounted emitting device $\mathbf{1940}_{emit}$ is coupled to the reflector structure 1906 and upon reflection, the optical signal is focused or otherwise narrowed. The narrowed beam is incident on waveguide facet 1945 of the patterned planar waveguide 1944*a* and coupled through the patterned planar waveguide 1944*a* to all or a portion of the PIC 1954 and to the cavity-mounted receiving device $\mathbf{1942}_{rec}$. In some embodiments, a portion of a PIC 1954 is a lens, detector, a waveguide, an arrayed waveguide, or other device, or all or a portion of a PIC or a component of a PIC. In embodiments, the waveguide facet 1945 may be shaped to facilitate improved receptivity of the optical signal into the waveguide 1944*a*. In other embodiments, the waveguide facet may be coated to improve the receptivity of the optical signal into the waveguide 1944*a*. And in yet other embodiments, the reflector cavity may be filled with an index-of-refraction-matching dielectric or other material to reduce reflection and to facilitate receptivity of the optical signal into the waveguide 1944*a*. Beam focusing of the outgoing signal 1970*b* from the reflector structure 1906 to the waveguide facet 1945 is illustrated in FIG. 19A(c). In some embodiments, the waveguide facet 1945 is positioned at or near a focal point of the reflected signal 1970*b* from the reflector structure 1906. In some assemblies 1908, the waveguide facet 1945 is positioned such that a narrowed or otherwise focused beam is incident on the waveguide facet 1945 after reflection. Surface-mounted emitting device $\mathbf{1940}_{emit}$ is configured to provide suitable coupling between the aperture 1950 and the reflector structure 1906. In some embodiments, the cavity-mounted receiving device $\mathbf{1942}_{rec}$ is mounted or otherwise formed on alignment aids 1934. In other embodiments, the alignment aids 1934 may not be present.

Additional assemblies configured with embodiments of reflector structure 1906 are shown in FIGS. 19B(a)-19B(c).

FIG. 19B(a) shows an embodiment of reflector structure 1906 in an assembly 1908 configured to receive an incoming optical signal 1970*a* from a surface-mounted emitting device $\mathbf{1940}_{emit}$ and to reflect the optical signal to a receiving aperture of a cavity-mounted receiving device $\mathbf{1942}_{rec}$ optionally mounted or otherwise formed on alignment aids 1934 on the interposer 1901. In the embodiment, the optical signal is coupled from surface-mounted emitting device $\mathbf{1940}_{emit}$, which may be, for example, a VCSEL, an LED, or other form of photoemitting device. The cavity-mounted receiving device $\mathbf{1942}_{rec}$ may be, for example, a photodiode or other form of photodetector, photosensor, or photoreceptive device, among other devices. In the embodiment shown in FIG. 19B(a), an optical signal 1970*a* from aperture 1950 of surface-mounted emitting device $\mathbf{1940}_{emit}$ is coupled to the reflector structure 1906 and upon reflection, the optical signal is focused or otherwise narrowed. The narrowed beam is incident on the receiving aperture of the cavity-mounted receiving device $\mathbf{1942}_{rec}$. In some embodiments, the receiving aperture of the cavity-mounted receiving device $\mathbf{1942}_{rec}$ may be shaped to facilitate improved receptivity of the optical signal into the receiving device $\mathbf{1942}_{rec}$. In other embodiments, the receiving aperture may be coated to improve the receptivity of the optical signal into receiving aperture. And in yet other embodiments, the reflector cavity may be filled with an index-of-refraction-matching dielectric or other material to reduce reflection and to facilitate receptivity of the optical signal into the receiving aperture of the cavity-mounted receiving device $\mathbf{1942}_{rec}$. Beam focusing of the outgoing signal 1970*b* from the reflector structure 1906 to the cavity-mounted receiving device $\mathbf{1942}_{rec}$ is illustrated in FIG. 19B(a). In some assemblies 1908, the surface-mounted emitting device $\mathbf{1940}_{emit}$ is positioned such that the aperture 1950 of the surface-mounted emitting device $\mathbf{1940}_{emit}$ is suitably coupled to the reflector structure 1906. The distance between the surface of reflector structure 1906 and the receiving aperture of the cavity-mounted receiving device $\mathbf{1942}_{rec}$ is configured to provide suitable coupling between the surface-mounted emitting device $\mathbf{1940}_{emit}$ and the cavity-mounted receiving device $\mathbf{1942}_{rec}$. The cavity-mounted receiving device $\mathbf{1942}_{rec}$ is positioned, in embodiments, at a distance at or near a focal point of the reflected outgoing signal 1970*b*. In some assemblies 1908, the receiving aperture of cavity-mounted receiving device $\mathbf{1942}_{rec}$ is positioned such that a narrowed or otherwise focused beam is incident on this receiving aperture after reflection from the reflector structure 1906. And in some embodiments, the cavity-mounted receiving device is positioned to receive a reflected optical signal 1970*b* that is narrowed or otherwise focused after reflection from reflector structure 1906 having beam-narrowing surface curvature.

FIG. 19B(b) shows an embodiment of reflector structure 1906 in an assembly 1908 configured to receive an incoming optical signal 1970*a* from a remotely mounted emitting device $\mathbf{1940}_{emit}$ and to reflect the optical signal to a receiving aperture of a cavity-mounted receiving device $\mathbf{1942}_{rec}$ optionally mounted or otherwise formed on alignment aids 1934 on the interposer 1901. In the embodiment, the optical signal is coupled from a remotely mounted emitting device $\mathbf{1941}_{emit}$, which may be, for example, a VCSEL, an LED, or other form of photoemitting device. Emitting device $\mathbf{1941}_{emit}$, may be remotely mounted, for example, as a component in a multichip assembly, an assembly for which the interposer 1901 is portion of a larger device or network of devices, and in an assembly used for device testing, among other assemblies. The cavity-mounted receiving device $\mathbf{1942}_{rec}$ may be, for example, a photodiode or other form of photodetector, photosensor, or photoreceptive device, among other devices. In the embodiment shown in FIG. 19(*b*), an optical signal 1970*a* from aperture 1950 of remotely mounted emitting device $\mathbf{1940}_{emit}$ is coupled to the reflector structure 1906 and upon reflection, the optical signal is focused or otherwise narrowed. The narrowed beam is incident on the receiving aperture of the cavity-mounted receiving device $\mathbf{1942}_{rec}$. In some embodiments, the receiving aperture of the cavity-mounted receiving device $\mathbf{1942}_{rec}$ may be shaped to facilitate improved receptivity of the optical signal into the receiving device $\mathbf{1942}_{rec}$. In other embodiments, the receiving aperture may be coated to improve the receptivity of the optical signal into receiving aperture. And in yet other embodiments, the reflector cavity may be filled with an index-of-refraction-matching dielectric or other material to reduce reflection and to facilitate receptivity of the optical signal into the receiving aperture of the cavity-mounted receiving device $\mathbf{1942}_{rec}$. Beam focusing of the outgoing signal 1970*b* from the reflector structure 1906 to cavity-mounted receiving device $\mathbf{1942}_{rec}$ is illustrated in FIG. 19B(a). In some assemblies 1908, the remotely mounted emitting device $\mathbf{1940}_{emit}$ is positioned such that the aperture 1950 is suitably coupled to the reflector structure 1906. The distance between the surface of reflector structure 1906 and the receiving aperture of the cavity-mounted receiving device $\mathbf{1942}_{rec}$ is configured to provide suitable coupling between the remotely mounted emitting device $\mathbf{1940}_{emit}$ and the cavity-mounted receiving device $\mathbf{1942}_{rec}$. The cavity-mounted receiving device is positioned, in embodiments, at a distance at or near a focal point of the reflected outgoing signal 1970*b*. In some assemblies 1908, the receiving aperture of cavity-mounted receiving device $\mathbf{1942}_{rec}$ is positioned such that a narrowed or otherwise focused beam is incident on the receiving aperture of the cavity-mounted receiving device $\mathbf{1942}_{rec}$ after reflection from the reflector structure 1906.

FIG. 19B(c) shows an embodiment of reflector structure 1906 in an assembly 1908 configured to receive an incoming optical signal 1970*a* from a surface-mounted emitting device $\mathbf{1940}_{emit}$ and to reflect the optical signal to all or a portion of a PIC 1954 or an element of a PIC 1954. In the embodiment shown in FIG. 19B(c), reflected optical signal 1970*a* is coupled to all or a portion of a PIC 1954 or an element of a PIC 1954, and further to a cavity-mounted receiving device $\mathbf{1942}_{rec}$ through optional patterned waveguide 1944*p*. Cavity-mounted receiving device $\mathbf{1942}_{rec}$ is optionally mounted or otherwise formed on alignment aids 1934 on the interposer 1901. The cavity-mounted receiving device $\mathbf{1942}_{rec}$ may be, for example, a photodiode or other form of photodetector, photosensor, or photoreceptive device. In the embodiment shown, an optical signal 1970*a* from the surface-mounted emitting device $\mathbf{1940}_{emit}$ is coupled to the reflector structure 1906 and upon reflection, to all or a portion of PIC 1954 and is further coupled through the all or a portion of a PIC 1954 to cavity-mounted receiving device $\mathbf{1942}_{rec}$. Some embodiments may include patterned waveguide 1944*p* to facilitate coupling to the cavity-mounted receiving device $\mathbf{1942}_{rec}$. Beam focusing of the outgoing signal 1970*b* from the reflector structure 1906 to all or a portion of PIC 1954 is illustrated in FIG. 19B(c). In some embodiments, the receiving portion of the PIC 1954 is positioned such that the receiving aperture of the receiving device in the PIC 1954 is at or near a focal point of the reflected outgoing signal 1970*b*. In some assemblies 1908, the receiving portion of the PIC 1954 is at a location at which the reflected beam is narrowed or otherwise focused after reflection from reflector structure 1906.

In other embodiments for which a cavity-mounted emitting device $\mathbf{1942}_{emit}$ is coupled through a PIC 1954 to reflector structure 1906, remotely mounted emitting device $\mathbf{1941}_{emit}$ may be used to provide an ingoing signal 1970*a* to the reflector structure 1906 rather than the surface-mounted receiving device in the configuration shown in FIG. 19B (c).

Additional Methods of Forming Embodiments and Assemblies

FIGS. 20-26 show methods of forming embodiments of reflectors and of forming assemblies within which embodiments of reflectors may be configured.

FIG. 20 shows a flowchart for Method 2020 of forming embodiments of a reflector structure having curvature in more than two cross-sectional planes. Method 2020 includes a forming step in which a reflector structure having curvature in more than two cross sectional planes is formed such that an optical signal reflected from the reflector is focused in three dimensions. Embodiments of reflector 206 having curvature in more than two cross sectional planes are illustrated, for example, in FIGS. 2C, 2D(c), 2E(c), and 2F. In these figures, the embodiments of reflector 206 are shown having curvature in the "x-z", "x-y", and "y-z" planes as referenced in each of the figures and as further described herein.

In some embodiments, the reflector structure described in Method 2020 is configured to face a waveguide and the optical signal exits from the waveguide as shown, for example, in FIGS. 18A(a)-18A(c). In other embodiments, the reflector structure is configured to face an emitting device, and the optical signal exits from the emitting device as shown, for example, in FIGS. 18B(a) and 18B(b). In yet other embodiments, the reflector structure is configured to face a surface-mounted emitting device and the optical signal exits from the surface-mounted emitting device as shown, for example, in FIGS. 19A(a)-19A(c) and FIGS. 19B(a) and 19B(c). In yet other embodiments, the reflector structure is configured to face a remotely positioned emitting device and the optical signal exits from the remotely positioned emitting device, as shown, for example, in FIG. 19B(b). In yet other embodiments, the reflector structure is configured to face a remotely positioned receiving device and the optical signal is received by the remotely positioned receiving device as shown, for example, in FIG. 18B(b). In yet other embodiments, the reflector structure is configured to face a surface-mounted receiving device and the optical signal is received by the surface-mounted receiving device as shown, for example, in FIGS. 18A(a)-18A(c) and FIGS. 18B(a) and 18B(c). In yet other embodiments, the reflector structure is configured to face a waveguide, lens, detector, other device, or all or a portion of a PIC or a component of a PIC, and the optical signal is received by the reflector from the waveguide, lens, detector, other device, or all or a portion of a PIC or a component of a PIC, as shown for example, in FIG. 18B(c). In yet other embodiments, the reflector structure is configured to face a waveguide, lens, detector, other device, or all or a portion of a PIC or a component of a PIC, and the optical signal is received from the reflector by the waveguide, lens, detector, other device, or all or a portion of a PIC or a component of a PIC, as shown for example, in FIG. 19B(c).

FIG. 21 shows a flowchart for a Method 2122 of forming embodiments of a reflector having three-dimensional surface curvature. Method 2122 includes a forming step in which a reflector structure having three-dimensional curvature is formed such that an outgoing beam upon reflection from the reflector structure is focused or otherwise narrowed in three dimensions.

Embodiments of a reflector structure 206 having three-dimensional curvature such that an outgoing optical beam 270*b* reflected from the reflector 206 is focused or otherwise narrowed in three dimensions are illustrated, for example, in FIGS. 2C, 2D(c), 2E(c), and 2F. In these figures, embodiments of reflector structure 206 are shown having curvature in the "x-z", "x-y", and "y-z" planes as referenced in each of the figures and further described herein. The embodiments of reflector structure 206 in FIGS. 2C and 2F(b) further illustrate three-dimensional beam narrowing of an outgoing optical beam 270*b* from a reflector structure 206 having curvature in three dimensions.

In some embodiments, the reflector structure described in Method 2122 is configured to face a waveguide and the optical signal exits from the waveguide as shown, for example, in FIGS. 18A(a)-18A(c). In other embodiments, the reflector structure is configured to face an emitting device, and the optical signal exits from the emitting device as shown, for example, in FIGS. 18B(a) and 18B(b). In yet other embodiments, the reflector structure is configured to face a surface-mounted emitting device and the optical signal exits from the surface-mounted emitting device as shown, for example, in FIGS. 19A(a)-19A(c) and FIGS. 19B(a) and 19B(c). In yet other embodiments, the reflector structure is configured to face a remotely positioned emitting device and the optical signal exits from the remotely positioned emitting device, as shown, for example, in FIG. 19B(b). In yet other embodiments, the reflector structure is configured to face a remotely positioned receiving device and the optical signal is received by the remotely positioned receiving device as shown, for example, in FIG. 18B(b). In yet other embodiments, the reflector structure is configured to face a surface-mounted receiving device and the optical signal is received by the surface-mounted receiving device as shown, for example, in FIGS. 18A(a)-18A(c) and FIGS. 18B(a) and 18B(c). In yet other embodiments, the reflector structure is configured to face a waveguide, lens, detector, other device, or all or a portion of a PIC or a component of a PIC, and the optical signal is received by the reflector from the waveguide, lens, detector, other device, or all or a portion of a PIC or a component of a PIC, as shown for example, in FIG. 18B(c). In yet other embodiments, the reflector structure is configured to face a waveguide, lens, detector, other device, or all or a portion of a PIC or a component of a PIC, and the optical signal is received from the reflector by the waveguide, lens, detector, other device, or all or a portion of a PIC or a component of a PIC, as shown for example, in FIG. 19B(c).

FIG. 22 shows a flowchart for a Method 2224 of forming a waveguide or emitting device on a substrate and further forming an embodiment of a reflector structure on the substrate such that the reflector structure faces the waveguide or emitting device. Step 2224*s*1 of Method 2224 is a forming step in which a waveguide or an emitting device is formed on a substrate. Step 2224*s*2 of Method 2224 is a forming step in which an embodiment of a reflector structure having a curved three-dimensional surface is formed on the substrate facing the waveguide or emitting device such that the cross section of the optical signal exiting the waveguide or emitting device is narrowed in two or more dimensions upon reflection from the reflector.

FIG. 2C shows a waveguide formed on a substrate with an embodiment of reflector structure 206 having three-dimensional curvature such that an optical beam from the waveguide or an emitting device in position in place of the waveguide is focused in three dimensions upon reflection from the reflector.

In some embodiments, the reflector structure described in Method 2224 is configured to face a waveguide and the optical signal exits from the waveguide as shown, for example, in FIGS. 18A(a)-18A(c). In other embodiments, the reflector structure is configured to face an emitting device, and the optical signal exits from the emitting device as shown, for example, in FIGS. 18B(a) and 18B(b). In yet other embodiments, the reflector structure is configured to face a surface-mounted emitting device and the optical signal exits from the surface-mounted emitting device as shown, for example, in FIGS. 19A(a)-19A(c) and FIGS. 19B(a) and 19B(c). In yet other embodiments, the reflector structure is configured to face a remotely positioned emitting device and the optical signal exits from the remotely positioned emitting device, as shown, for example, in FIG. 19B(b). In yet other embodiments, the reflector structure is configured to face a remotely positioned receiving device and the optical signal is received by the remotely positioned receiving device as shown, for example, in FIG. 18B(b). In yet other embodiments, the reflector structure is configured to face a surface-mounted receiving device and the optical signal is received by the surface-mounted receiving device as shown, for example, in FIGS. 18A(a)-18A(c) and FIGS. 18B(a) and 18B(c). In yet other embodiments, the reflector structure is configured to face a waveguide, lens, detector, other device, or all or a portion of a PIC or a component of a PIC, and the optical signal is received by the reflector from the waveguide, lens, detector, other device, or all or a portion of a PIC or a component of a PIC, as shown for example, in FIG. 18B(c). In yet other embodiments, the reflector structure is configured to face a waveguide, lens, detector, other device, or all or a portion of a PIC or a component of a PIC, and the optical signal is received from the reflector by the waveguide, lens, detector, other device, or all or a portion of a PIC or a component of a PIC, as shown for example, in FIG. 19B(c).

FIG. 23 shows a flowchart for a Method 2326 of forming a substrate having an embodiment of a reflector structure facing a waveguide or emitting device. Method 2326 includes a forming step in which a substrate having a reflector structure facing a waveguide or emitting device such that an optical signal from the waveguide or emitting device and incident on the reflector structure is narrowed in two or more dimensions upon reflection from the reflective structure.

FIG. 2C shows a substrate having an embodiment of a reflector structure 206. Reflector structure 206 has three-dimensional curvature such that an optical beam reflected from the waveguide or an emitting device in position in place of the waveguide facing the reflector structure 206 is focused in three dimensions. In FIG. 2C, an embodiment of reflector structure 206 is shown facing patterned planar waveguide 244 and having curvature in the "x-z", "x-y", and "y-z" planes as referenced in the figure and further described herein.

In some embodiments, the reflector structure described in Method 2326 is configured to face a waveguide and the optical signal exits from the waveguide as shown, for example, in FIGS. 18A(a)-18A(c). In other embodiments, the reflector structure is configured to face an emitting device, and the optical signal exits from the emitting device as shown, for example, in FIGS. 18B(a) and 18B(b). In yet other embodiments, the reflector structure is configured to face a surface-mounted emitting device and the optical signal exits from the surface-mounted emitting device as shown, for example, in FIGS. 19A(a)-19A(c) and FIGS. 19B(a) and 19B(c). In yet other embodiments, the reflector structure is configured to face a remotely positioned emitting device and the optical signal exits from the remotely positioned emitting device, as shown, for example, in FIG. 19B(b). In yet other embodiments, the reflector structure is configured to face a remotely positioned receiving device and the optical signal is received by the remotely positioned receiving device as shown, for example, in FIG. 18B(b). In yet other embodiments, the reflector structure is configured to face a surface-mounted receiving device and the optical signal is received by the surface-mounted receiving device as shown, for example, in FIGS. 18A(a)-18A(c) and FIGS. 18B(a) and 18B(c). In yet other embodiments, the reflector structure is configured to face a waveguide, lens, detector, other device, or all or a portion of a PIC or a component of a PIC, and the optical signal is received by the reflector from the waveguide, lens, detector, other device, or all or a portion of a PIC or a component of a PIC, as shown for example, in FIG. 18B(c). In yet other embodiments, the reflector structure is configured to face a waveguide, lens, detector, other device, or all or a portion of a PIC or a component of a PIC, and the optical signal is received from the reflector by the waveguide, lens, detector, other device, or all or a portion of a PIC or a component of a PIC, as shown for example, in FIG. 19B(c).

FIG. 24 shows a flowchart for Method 2428 of forming an interposer having an embodiment of a reflector structure. Method 2428 includes a forming step in which an interposer having a reflector structure is formed such an optical signal reflected from the reflector structure is narrowed in two or more dimensions upon reflection from the reflector structure on the interposer.

In some embodiments, the reflector structure in Method 2428 is configured to face a waveguide and the optical signal exits from the waveguide as shown, for example, in FIGS. 18A(a)-18A(c). In other embodiments, the reflector structure is configured to face an emitting device, and the optical signal exits from the emitting device as shown, for example, in FIGS. 18B(a) and 18B(b). In yet other embodiments, the reflector structure is configured to face a surface-mounted emitting device and the optical signal exits from the surface-mounted emitting device as shown, for example, in FIGS. 19A(a)-19A(c) and FIGS. 19B(a) and 19B(c). In yet other embodiments, the reflector structure is configured to face a remotely positioned emitting device and the optical signal exits from the remotely positioned emitting device, as shown, for example, in FIG. 19B(b). In yet other embodiments, the reflector structure is configured to face a remotely positioned receiving device and the optical signal is received by the remotely positioned receiving device as shown, for example, in FIG. 18B(b). In yet other embodiments, the reflector structure is configured to face a surface-mounted receiving device and the optical signal is received by the surface-mounted receiving device as shown, for example, in FIGS. 18A(a)-18A(c) and FIGS. 18B(a) and 18B(c). In yet other embodiments, the reflector structure is configured to face a waveguide, lens, detector, other device, or all or a portion of a PIC or a component of a PIC, and the optical signal is received by the reflector from the waveguide, lens, detector, other device, or all or a portion of a PIC or a component of a PIC, as shown for example, in FIG. 18B(c). In yet other embodiments, the reflector structure is configured to face a waveguide, lens, detector, other device, or all or a portion of a PIC or a component of a PIC, and the optical signal is received from the reflector by the waveguide, lens, detector, other device, or all or a portion of a PIC or a component of a PIC, as shown for example, in FIG. 19B(c).

FIG. 25 shows a flowchart for Method 2530 of forming an interposer having another embodiment of a reflector structure. Method 2530 includes a forming step in which an interposer having a reflector structure facing a waveguide or emitting device is formed such that an optical signal reflected from the reflector structure is narrowed or otherwise focused in two or more dimensions.

In some embodiments, the reflector structure in Method 2530 is configured to face a waveguide and the optical signal exits from the waveguide as shown, for example, in FIGS. 18A(a)-18A(c). In other embodiments, the reflector structure is configured to face an emitting device, and the optical signal exits from the emitting device as shown, for example, in FIGS. 18B(a) and 18B(b). In yet other embodiments, the reflector structure is configured to face a surface-mounted emitting device and the optical signal exits from the surface-mounted emitting device as shown, for example, in FIGS. 19A(a)-19A(c) and FIGS. 19B(a) and 19B(c). In yet other embodiments, the reflector structure is configured to face a remotely positioned emitting device and the optical signal exits from the remotely positioned emitting device, as shown, for example, in FIG. 19B(b). In yet other embodiments, the reflector structure is configured to face a remotely positioned receiving device and the optical signal is received by the remotely positioned receiving device as shown, for example, in FIG. 18B(b). In yet other embodiments, the reflector structure is configured to face a surface-mounted receiving device and the optical signal is received by the surface-mounted receiving device as shown, for example, in FIGS. 18A(a)-18A(c) and FIGS. 18B(a) and 18B(c). In yet other embodiments, the reflector structure is configured to face a waveguide, lens, detector, other device, or all or a portion of a PIC or a component of a PIC, and the optical signal is received by the reflector from the waveguide, lens, detector, other device, or all or a portion of a PIC or a component of a PIC, as shown for example, in FIG. 18B(c). In yet other embodiments, the reflector structure is configured to face a waveguide, lens, detector, other device, or all or a portion of a PIC or a component of a PIC, and the optical signal is received from the reflector by the waveguide, lens, detector, other device, or all or a portion of a PIC or a component of a PIC, as shown for example, in FIG. 19B(c).

FIG. 26 shows a flowchart for Method 2686 of forming an assembly comprising an interposer having alignment aids, a reflector structure having three-dimensional curvature, a receiving device mounted or otherwise formed on the alignment aids, and a surface-mounted or remotely mounted emitting device.

Step **2686*s*1 of Method 2686 is a forming step in which an interposer is formed comprising a planar waveguide layer and that optionally includes an electrical interconnect layer, and further comprising alignment aids for mounting one or more optical emitting devices. The optional electrical interconnect layer provides electrical interconnections, for example, between electrical devices mounted or otherwise formed on the interposer and enables connectivity to other devices, among other features. Step 2686*s*2 of Method 2686 is a forming step in which a reflector structure is formed on the interposer, wherein the reflector structure includes a surface having three-dimensional curvature. Step 2686*s*3 of Method 2686 is a forming step in which one or more optical emitting devices are mounted or otherwise formed on the alignment aids on the interposer. Step 2686*s*4 of Method 2686** is a forming step in which a surface-mounted or remotely mounted optical receiving device is mounted or otherwise formed facing the reflector structure such that an optical signal from the one or more optical emitting devices mounted or otherwise formed on the alignment aids on the interposer is reflected by the reflector structure and coupled to the surface-mounted or remotely mounted optical receiving device. The optical signal from the optical emitting device mounted or otherwise formed on the alignment aids on the interposer can be coupled to the reflector structure directly, coupled to the reflector structure through a waveguide, coupled to the reflector structure through all or a portion of an optical device, or coupled to the reflector structure through all or a portion of a PIC.

Embodiments described in Method 2686, can be used, for example, in an optical transmitting device or a transmitting portion of an optical transceiver, among other applications.

Figure 27:
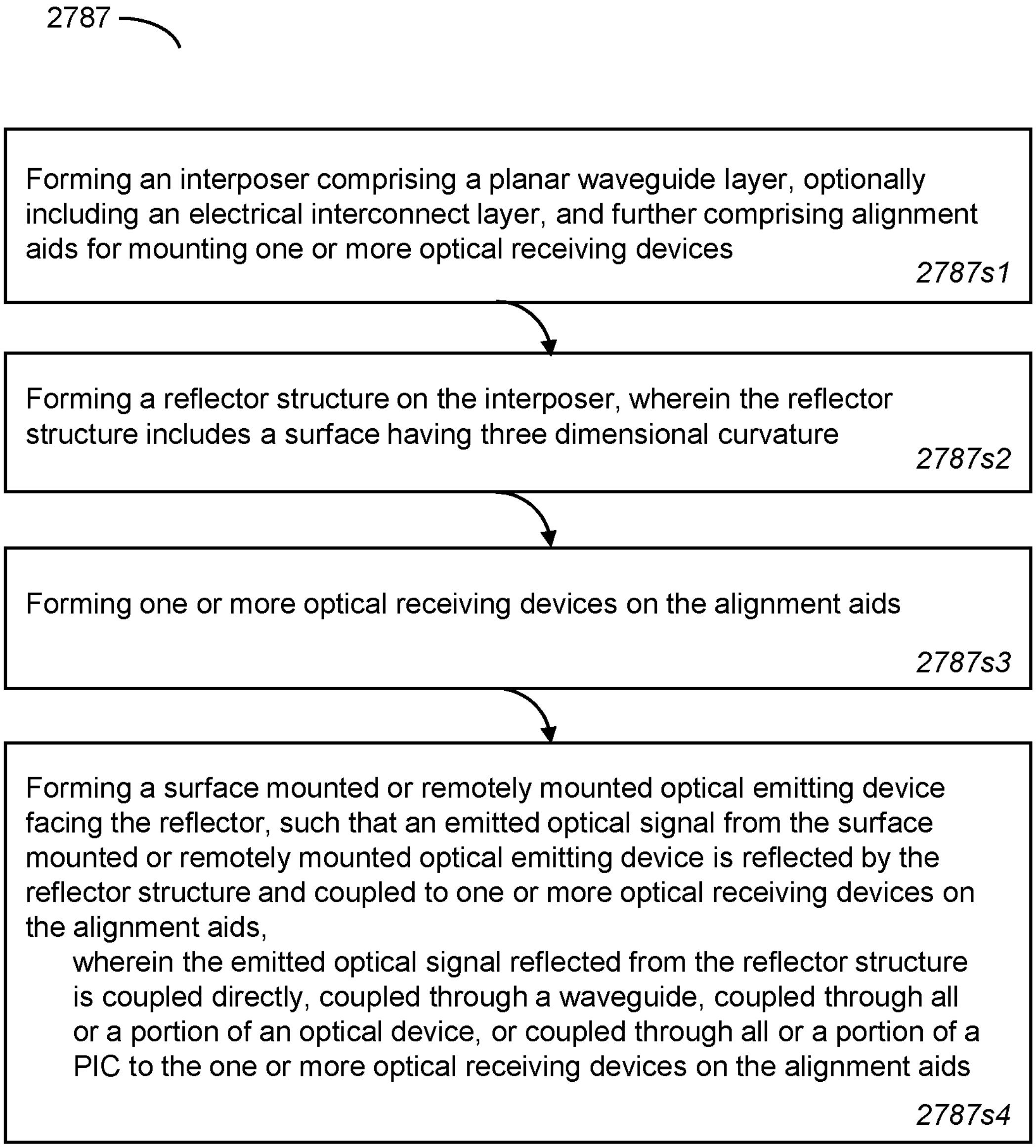
FIG. 27 shows a flowchart for a method of forming an assembly that includes an interposer having alignment aids, a reflector having three-dimensional curvature, an emitting device mounted or otherwise formed on the alignment aids, and a surface-mounted or remotely mounted receiving device.

FIG. 27 shows a flowchart for Method 2787 of forming an assembly that includes an interposer having alignment aids, a reflector structure having three-dimensional curvature, an emitting device mounted or otherwise formed on the alignment aids, and a surface-mounted or remotely mounted receiving device.

Step **2787*s*1 of Method 2787 is a forming step in which an interposer is formed comprising a planar waveguide layer and that optionally includes an electrical interconnect layer, and further comprising alignment aids for mounting one or more optical receiving devices. The optional electrical interconnect layer provides electrical interconnections, for example, between electrical devices mounted or otherwise formed on the interposer and enables connectivity to other devices, among other features. Step 2787*s*2 of Method 2787 is a forming step in which a reflector structure is formed on the interposer, wherein the reflector structure includes a surface having three-dimensional curvature. Step 2787*s*3 of Method 2787 is a forming step in which one or more optical receiving devices is mounted or otherwise formed on the alignment aids. Step 2787*s*4 of Method 2787** is a forming step in which a surface-mounted or remotely mounted optical emitting device is formed facing the reflector structure, such that an emitted optical signal from the surface-mounted or remotely mounted optical emitting device is reflected by the reflector structure and coupled to one or more optical receiving device mounted or otherwise formed on the alignment aids of the interposer. The optical signal reflected from the reflector structure can be coupled to the one or more optical receiving devices on the alignment aids directly, coupled from the reflector structure to the one or more optical receiving devices on the alignment aids through a waveguide, coupled from the reflector structure to the one or more optical receiving devices on the alignment aids through all or a portion of an optical device, or coupled from the reflector structure to the one or more optical receiving devices on the alignment aids through all or a portion of a PIC.

Assemblies that include embodiments of the reflector structure having three-dimensional surface curvature, described in Method 2787, can be used, for example, in an optical receiving device or a receiving portion of an optical transceiver, among other applications.

It should be noted that the methods 2686 and 2787 can be combined to form devices such as optical transceivers that include both transmitting and receiving functionality on a single device. Also, it should be noted that multiple reflector structures can be formed on an interposer, with each reflector structure coupled to one or more optical devices mounted on the alignment aids.

In an optical transceiver, for example, more than one cavity with alignment aids can be formed on an interposer with an emitting device mounted or otherwise formed in each of the cavities and each further coupled to a reflector structure and further coupled from each reflector structure to surface-mounted or remotely mounted receiving device in the transmitter portion of a transceiver and in other devices that require emitting devices to provide one or more optical signals.

In a receiving portion of an optical transceiver, for example, more than one cavity with alignment aids can be formed on an interposer with a receiving device mounted or otherwise formed in each of the cavities. Surface-mounted or remotely mounted emitting device in the receiving portion of the transceiver and in other devices that require receiving devices to receive one or more optical signals can be coupled each to a reflector structure, for example, and further coupled from each reflector structure to a receiving device mounted on alignment aids.

The foregoing descriptions of embodiments have been presented for purposes of illustration and description and are not intended to be exhaustive or to limit embodiments to the forms disclosed. Modifications to, and variations of, the disclosed embodiments will be readily apparent to those skilled in the art, and the general principles defined herein may be applied to other embodiments without departing from the spirit and scope of the embodiments disclosed herein. Thus, embodiments should not be limited to those specifically described but rather are to be accorded the widest scope consistent with the principles and features disclosed herein.

What is claimed is:

1. A method comprising forming an interconnection layer on a substrate:

forming a reflector structure on the interconnection layer, wherein the reflector structure is configured to transmit an optical signal between a first direction parallel to the substrate and a second direction forming an angle less than 60 degrees with a third direction perpendicular with the substrate, wherein the reflector structure comprises a curved surface, with the curved surface comprising curved intersecting lines between the curved surface and planes parallel and perpendicular to the substrate, wherein the curved surface configured to reflect an incoming optical signal to a reflected optical signal comprising a smaller cross section area, wherein the reflector structure comprises a reflective layer disposed on a cavity of the substrate, wherein the reflective layer is connected to an interconnect line of the interconnect laver;

wherein the reflective layer is connected to a terminal pad of an optical element disposed on the substrate.

2. A method as in claim 1, wherein the second direction is perpendicular to the substrate.

3. A method as in claim 1, wherein forming the reflector structure comprises forming the cavity in a layer on the substrate, with the cavity formed by patterning the layer using a gray scale mask having variable half tone patterns in at least two perpendicular directions.

4. A method as in claim 1, wherein forming the reflector structure comprises forming the cavity in a layer on the substrate, followed by forming a reflective layer having a variable thickness across at least the curved intersecting lines, wherein the cavity is formed by patterning the layer using a gray scale mask having half tone patterns in at least two perpendicular directions.

5. A method as in claim 1, further comprising forming a first device on the substrate aligned with the reflective structure, forming the second device on the reflector structure, wherein the reflector structure is configured to transmit or receive the optical signal between the first device and the second device.

6. A method comprising providing a substrate;

forming an interconnection layer on the substrate;

forming a first optical element on the substrate interconnection layer, with the optical element configured to transmit an optical signal or to receive the optical signal;

forming a reflector structure on the substrate and aligned with the optical element, wherein the reflector structure is configured to transmit or receive the optical signal between the first optical element and a second optical element disposed away from the reflector structure in a direction from the substrate to the reflector structure, wherein the reflector structure comprises a curved surface, with the curved surface comprising curved intersecting lines between the curved surface and planes parallel and perpendicular to the substrate, wherein the curved surface configured to reflect an incoming optical signal to a reflected optical signal comprising a smaller cross section area, wherein the reflector structure comprises a reflective layer disposed on a cavity of the substrate, wherein the reflective layer is connected to a first interconnect line of the interconnect layer;

forming the second optical element comprises an optoelectronic device comprising a terminal pad connected to the reflective layer.

7. A method as in claim 6, wherein the first optical element comprises a waveguide, wherein the second optical element comprises an optical or an optoelectronic surface-mount device.

8. A method as in claim 1, wherein forming the reflector structure comprises forming the cavity in a layer on the substrate, with the cavity formed by patterning the layer using a gray scale mask having variable half tone patterns in at least two perpendicular directions.

9. A method as in claim 6, further comprising forming an alignment aid element on the substrate, wherein the alignment aid element is configured to align the first optical element with an optical or optoelectrical device to be mounted on the substrate, wherein the optical or optoelectrical device is configured to be aligned to the first optical element with an accuracy of a lithography process due to a same mask used to form the first optical element and the alignment aid element.

10. A method as in claim 6, further comprising forming a first alignment aid element on the substrate, wherein the first alignment aid element is configured to align a first optical axis of the first optical element with a second optical axis of an optical or optoelectrical device to be mounted on the substrate in a plane parallel to the substrate;

forming a second alignment aid element on the substrate, wherein the second alignment aid element is configured to restrain the second optical axis from diverting from the first optical axis in a plane perpendicular to the substrate.

11. A method as in claim 6, further comprising forming mounting pads on a top layer on the substrate to receive the second optical element, wherein the top layer comprises the cavity on which a reflective layer is disposed to form the reflective structure.

12. A method as in claim 6, wherein the first optical element comprises an end facet facing the cavity, with the cavity configured to align the optical signal between the first optical element through the end facet and the cavity.

13. A method as in claim 6, further comprising forming the cavity and the first optical element at a same mask process to align the cavity with the first optical element, wherein the reflector structure comprises a reflective layer disposed on the cavity.

14. A method as in claim 6, wherein the interconnection layer comprises one or more interconnection lines disposed in one or more levels and connected by one or more vias.

15. A method as in claim 6, forming an optical or optoelectrical device on the substrate and aligned with the first optical element, wherein the optical or optoelectrical device is coupled to a second interconnect line in the interconnection layer.

16. A method as in claim 6, forming an alignment aid element on the substrate configured to align the first optical element with an optical or optoelectrical device to be mounted on the substrate, forming one or more bond pads on the substrate, with the bond pads connected to interconnect lines in the interconnection layer, and with the bond pads configured to be coupled to terminal pads of the optical or optoelectronic device.

17. A method comprising providing a substrate;

forming an interconnection layer on the substrate;

forming a waveguide on the interconnection layer;

forming a first device coupled to the waveguide, with the first device configured to transmit an optical signal to the waveguide or to receive the optical signal from the waveguide;

forming a reflector structure disposed in a layer on the substrate and aligned with the waveguide, wherein the reflector structure comprises a curved surface, with the curved surface comprising curved intersecting lines between the curved surface and planes parallel and perpendicular to the substrate, wherein the curved surface configured to reflect an incoming optical signal to a reflected optical signal comprising a smaller cross section area, wherein the reflector structure comprises a reflective layer disposed on a cavity of the substrate, wherein the reflective layer is connected to a first interconnect line of the interconnect layer;

forming a second device disposed on the layer above the reflector structure, wherein the second device is configured to receive or transmit the optical signal from or to the first device reflected by the reflector structure, wherein the second device comprises a terminal pad connected to the reflective layer.

18. A method as in claim 17, wherein the first device comprises an optical emitter device, wherein the second device comprises an optical receiver device, wherein the first device is configured to transmit the optical signal to the reflector structure, with the optical signal received by the second device after being reflected by the reflector structure.

19. A method as in claim 17, wherein the first device comprises an optical receiver device, wherein the second device comprises an optical emitter device, wherein the second device is configured to transmit the optical signal to the reflector structure, with the optical signal received by the first device after being reflected by the reflector structure.

* * * * *